US007552943B2

United States Patent
Pal et al.

(10) Patent No.: US 7,552,943 B2
(45) Date of Patent: Jun. 30, 2009

(54) VEHICLE PASSENGER RESTRAINING SYSTEM

(75) Inventors: Chinmoy Pal, Yokohama (JP); Izumi Kobayashi, Yokosuka (JP); Masashi Makita, Fujisawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 391 days.

(21) Appl. No.: 11/264,087

(22) Filed: Nov. 2, 2005

(65) Prior Publication Data

US 2006/0113782 A1 Jun. 1, 2006

(30) Foreign Application Priority Data

Nov. 30, 2004 (JP) ............................. 2004-346015
Jul. 21, 2005 (JP) ............................. 2005-211349

(51) Int. Cl.
B60R 21/04 (2006.01)
B60R 21/205 (2006.01)
(52) U.S. Cl. .................... 280/751; 280/730.1; 280/732; 280/752; 280/753
(58) Field of Classification Search ............. 280/730.1, 280/732, 733, 735, 801.1, 806–808, 751–753
See application file for complete search history.

(56) References Cited

U.S. PATENT DOCUMENTS

| 3,822,896 | A | * | 7/1974 | Hallberg | ..................... 280/733 |
| 3,871,470 | A | * | 3/1975 | Schwanz et al. | ............ 297/480 |
| 4,198,075 | A | | 4/1980 | Kob et al. | |
| 5,131,681 | A | * | 7/1992 | Wetzel et al. | ................ 280/753 |
| 5,295,709 | A | * | 3/1994 | Bell | ........................... 280/734 |
| 5,344,184 | A | * | 9/1994 | Keeler et al. | ............. 280/730.1 |
| 5,476,283 | A | | 12/1995 | Elton | |
| 6,283,508 | B1 | | 9/2001 | Nouwynck et al. | |
| 6,378,902 | B2 | * | 4/2002 | Unger et al. | ................. 280/753 |
| 6,641,166 | B2 | * | 11/2003 | Browne et al. | .............. 280/752 |
| 7,048,298 | B2 | * | 5/2006 | Arwood et al. | ........... 280/730.1 |
| 7,185,917 | B2 | * | 3/2007 | Nagata et al. | ................ 280/748 |
| 2004/0094943 | A1 | * | 5/2004 | Fukawatase et al. | ........ 280/753 |
| 2004/0227371 | A1 | * | 11/2004 | Okanda et al. | ............ 296/37.12 |

FOREIGN PATENT DOCUMENTS

| JP | H02-182553 A | | 7/1990 |
| JP | 04197847 A | * | 7/1992 |
| JP | H10-152019 A | | 6/1998 |
| WO | WO 2005/035322 A1 | | 4/2005 |

* cited by examiner

Primary Examiner—Paul N Dickson
Assistant Examiner—Laura Freedman
(74) Attorney, Agent, or Firm—Global IP Counselors, LLP

(57) ABSTRACT

A vehicle passenger restraining system comprises a knee bolster, a bolster movement structure, a collision detecting section and a control section. The knee bolster is disposed in a front portion of a seat in a vehicle. The bolster movement structure is coupled to the knee bolster to apply a rearwardly directed pulling force to each transverse end of the knee bolster. The collision detecting section is configured and arranged to detect information relating to a collision of the vehicle and a probability of a collision of the vehicle. The control section is configured to operate the bolster movement structure based on the information from the collision detecting section.

27 Claims, 40 Drawing Sheets

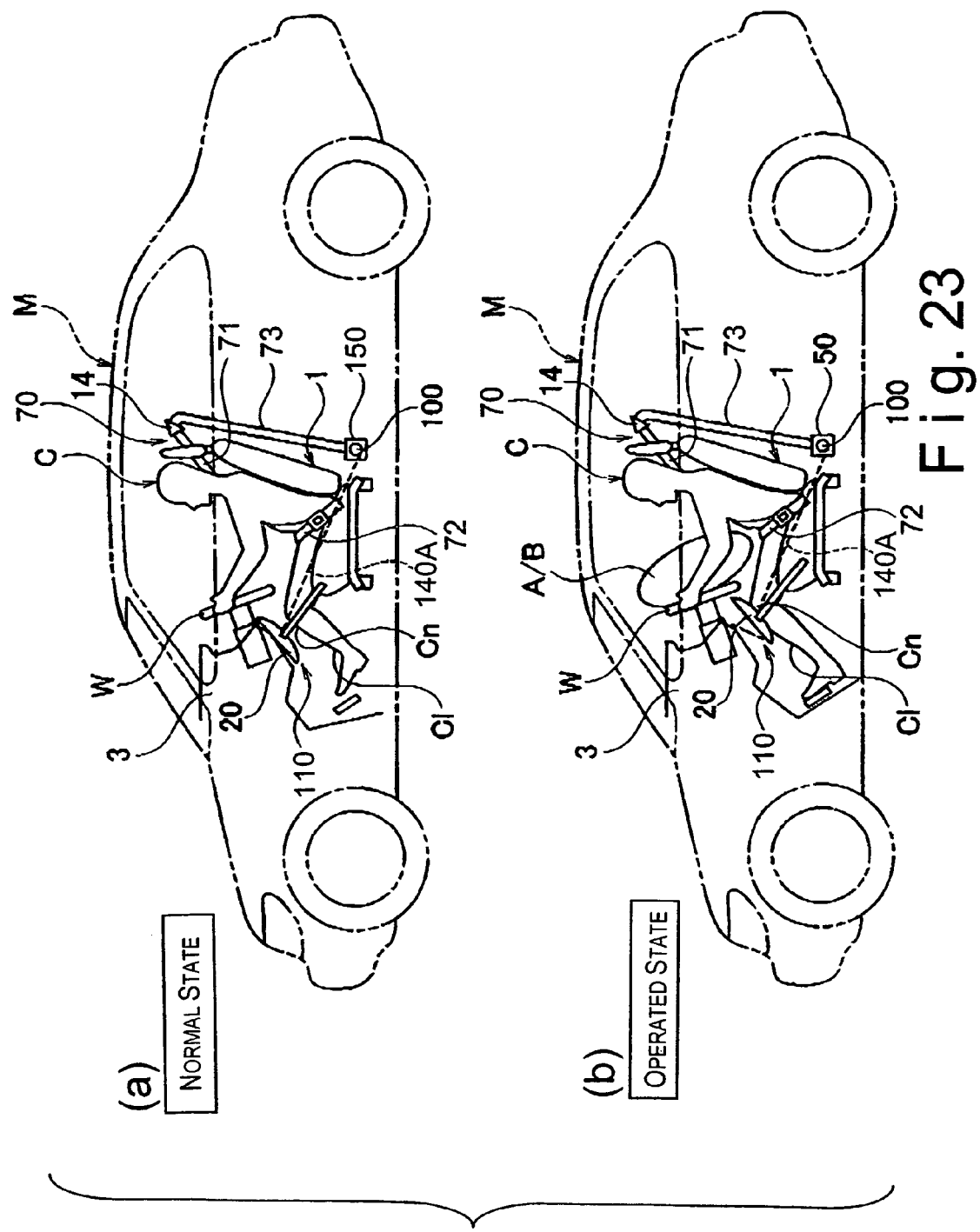

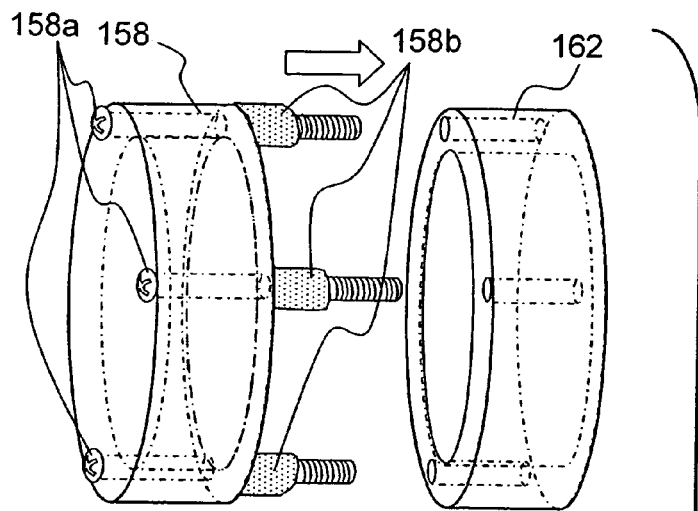
(a)
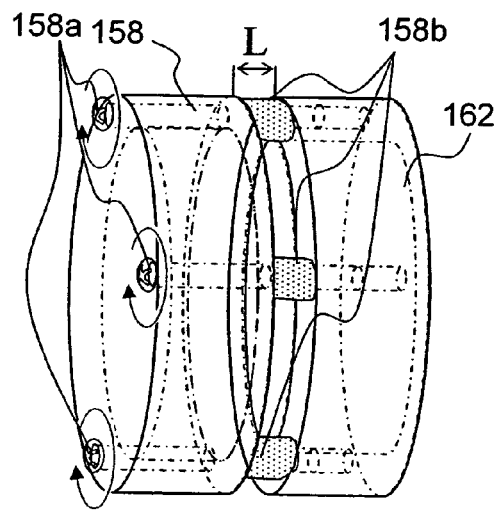
(b)
Fig. 24(B)

VEHICLE PASSENGER RESTRAINING SYSTEM

CROSS-REFERENCE TO RELATED APPLICATIONS

This application claims priority under 35 U.S.C. § 119 to Japanese Patent Application Nos. 2004-346015 and 2005-211349. The entire disclosures of Japanese Patent Application Nos. 2004-346015 and 2005-211349 are hereby incorporated herein by reference.

BACKGROUND OF THE INVENTION

1. Field of the Invention

The present invention relates to a vehicle passenger restraining system. More specifically, the present invention relates to a vehicle passenger restraining system having a knee bolster configured and arranged to restrain a forward movement of knees of a passenger during a collision.

2. Background Information

In a conventional vehicle passenger restraining system, when a vehicle undergoes a front collision, a forward movement of a passenger sitting in a passenger seat of the vehicle is restrained by a seat belt member including a lap belt and a shoulder belt. However, a portion of the passenger's body, i.e., a portion from a waist down (lower limbs) of the passenger, sometimes slips beneath the lap belt and moves forward during the front collision. To prevent the passenger's lower limbs from moving forward, Japanese Laid-Open Patent Publication No. H02-182553 discloses a conventional vehicle passenger restraining system having a knee bolster that restrains and presses against passenger's knees during a collision. More specifically, the above mentioned reference discloses the vehicle passenger restraining system in which the knee bolster is arranged in front of knees of the passenger sitting in a passenger seat of a vehicle. The knee bolster is configured and arranged to move rearward to suppress a forward motion of the passenger's knees when a front collision occurs.

In the above mentioned reference, a lower portion of the knee bolster is coupled to a vehicle body member such that the knee bolster can swing (pivot) freely about the coupling portion. An upper portion of the knee bolster is coupled to a cooling unit disposed adjacent to a dash panel of the vehicle by a rod member. As the dash panel collapses during a collision, the cooling unit moves rearward and causes the rod member to push the upper portion of the knee bolster rearward.

However, when the knee bolster restrains the knees of the passenger, slack (looseness) remaining in the lap belt flows from a tongue of the seat belt member to the shoulder belt. Japanese Laid-Open Patent Publication No. H10-152019 describes another conventional passenger restraining system in which a portion of the lap belt that passes through the tongue is locked during a collision in order to more reliably restrain an upper half of the passenger's body by preventing such a flow of slack from the lap belt.

In view of the above, it will be apparent to those skilled in the art from this disclosure that there exists a need for an improved vehicle passenger restraining system. This invention addresses this need in the art as well as other needs, which will become apparent to those skilled in the art from this disclosure.

SUMMARY OF THE INVENTION

With the conventional vehicle passenger restraining system described in Japanese Laid-Open Patent Publication No. H02-182553 as mentioned above, the upper portion of the knee bolster is pushed rearward while the lower portion of the knee bolster remains attached to the vehicle body member. Consequently, an amount of rearward movement of the knee bolster is small. Thus, the passenger's body must move forward by a larger amount in order to be restrained by the knee bolster than would be necessary if the knee bolster moved farther rearward. In short, with the conventional vehicle passenger restraining system disclosed in this reference, it is difficult to minimize an impact of a collision to the passenger because the knee bolster does not easily restrain the passenger's knees at a point in time when the amount of forward movement of the passenger is small immediately after the collision occurs.

Additionally, the passenger's lower limbs are not necessarily arranged within a prescribed transverse width of the knee bolster. Instead, the passenger's lower limbs may be spread apart, drawn close together, or in any of various other orientations. This is particularly true in the case of a passenger sitting in a seat other than a driver's seat because it is not necessary for a non-driver to place one's feet on an accelerator pedal or a footrest.

Consequently, when a collision occurs and the knee bolster moves rearward, the amount of contact between the passenger's knees and the knee bolster may decline depending on the orientation of the passenger's lower limbs, and it is possible for the passenger's knees to slip off the knee bolster. In such cases, the knee bolster cannot provide a sufficient restraining force with respect to the passenger's knees.

Also, if the timing at which the knee bolster is moved rearward is offset from the timing at which a seat belt retractor executes an emergency wind-in (retraction) of the seat belt member, there is a possibility that the amount of contact between the knees of the passenger and the knee bolster will be diminished when the knee bolster is moved rearward due to a collision. In such cases, the knee bolster cannot provide a sufficient restraining force with respect to the passenger's knees.

In view of the issues just described, one object of the present invention is to provide a vehicle passenger restraining system that is configured and arranged to advance the timing at which the passenger's knees are restrained during a collision by increasing the amount of rearward movement of the knee bolster to reliably restrain the passenger's knees regardless of the positioning of the passenger's lower limbs.

Also, another object of the present invention is to provide a vehicle passenger restraining system that can advance the timing at which the passenger's knees are restrained in a collision by increasing the amount of rearward movement of the knee bolster and can increase the retraining effect of the knee bolster with respect to the passenger's knees by synchronizing the timing of the rearward movement of the knee bolster and the timing of the restraining action of the seat belt member.

In order to achieve the above mentioned objects and other objects of the present invention, a vehicle passenger restraining system comprises a knee bolster, a bolster movement structure, a collision detecting section and a control section. The knee bolster is disposed in a front portion of a seat in a vehicle. The bolster movement structure is coupled to the knee bolster to apply a rearwardly directed pulling force to each transverse end of the knee bolster. The collision detecting section is configured and arranged to detect information relating to a collision of the vehicle and a probability of a collision of the vehicle. The control section is configured to operate the bolster movement structure based on the information from the collision detecting section.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 23 is a pair of diagrams (a) and (b) illustrating schematic side elevational views of the vehicle passenger restraining system in a normal state (the diagram (a)) and in an operated state (the diagram (b)) in accordance with the second embodiment of the present invention;

FIG. 24(B) is a pair of further enlarged perspective views of a cover member and a base member used in a retracting device in the vehicle passenger restraining system in accordance with the second embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
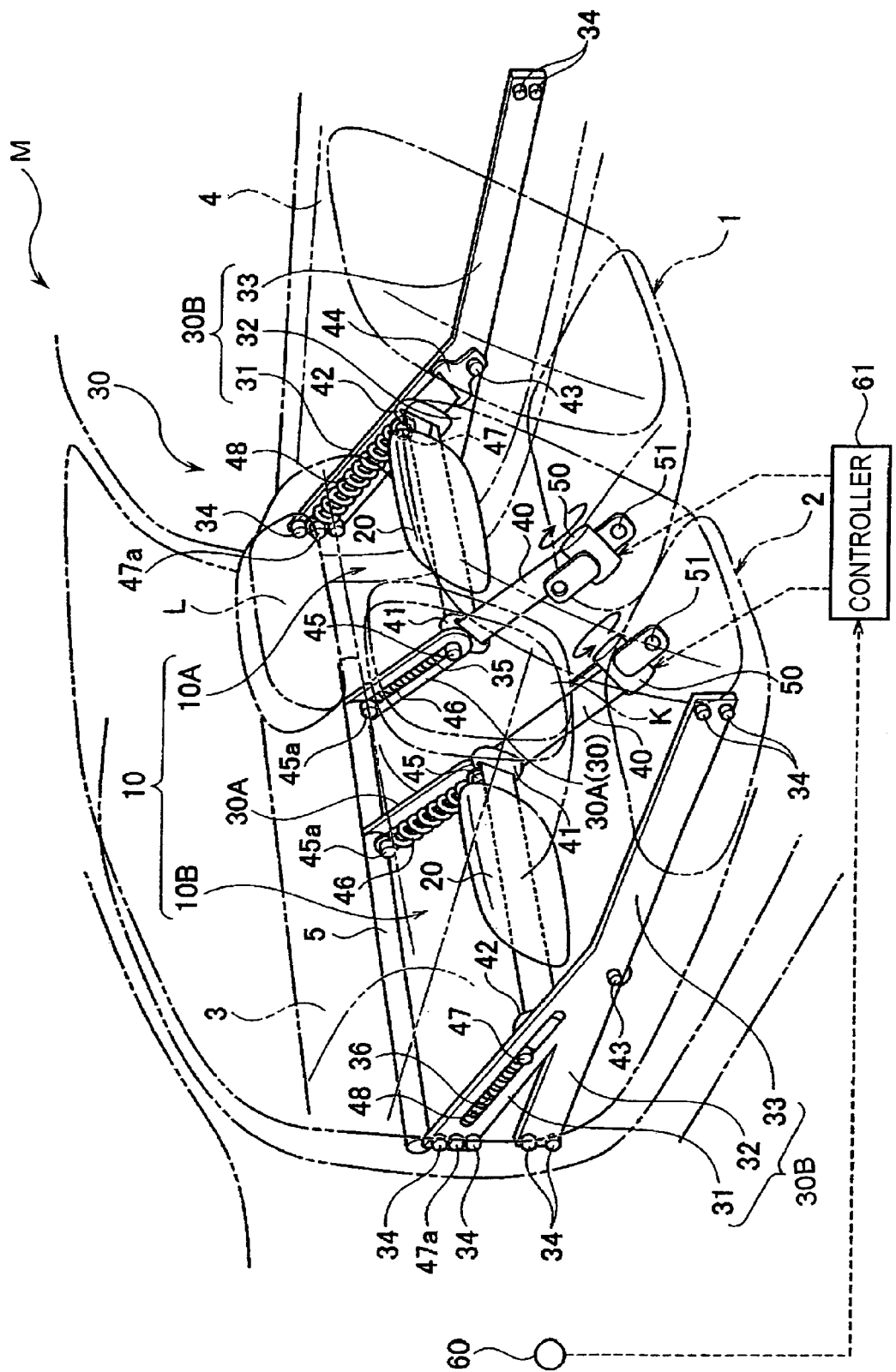
FIG. 1 is a rear perspective view of a vehicle passenger restraining system installed in a vehicle in accordance with a first embodiment of the present invention.

Referring initially to FIG. 1, a vehicle passenger restraining system is illustrated in accordance with a first embodiment of the present invention. FIG. 1 is a rear perspective view of the vehicle passenger restraining system installed in a vehicle M. As shown in FIG. 1, the vehicle passenger restraining system of the first embodiment includes a passenger knee restraining apparatus 10 that is configured and arranged to suppress a frontward movement of knees of a passenger or passengers sitting in a driver's seat 1 or/and a passenger seat 2.

More specifically, the passenger knee restraining apparatus 10 comprises a pair of knee restraining devices 10A and 10B disposed in a driver's seat side (e.g., the right hand side in this embodiment) and a passenger's seat side (i.e., the left hand side in this embodiment), respectively, as seen in FIG. 1. Each of the passenger knee restraining devices 10A and 10B includes a knee bolster 20 that is arranged in a front portion of the driver's seat 1 or the passenger's seat 2 such that the knees of a passenger sitting in the driver's seat 1 or the passenger's seat 2 would be disposed as being spaced apart rearward from the knee bolster 20 when the vehicle M is in a normal state. The knee bolsters 20 are configured to move in the rearward direction of the vehicle M to suppress the forward movement of the passenger's knees when the vehicle M undergoes a front collision.

Figure 2:
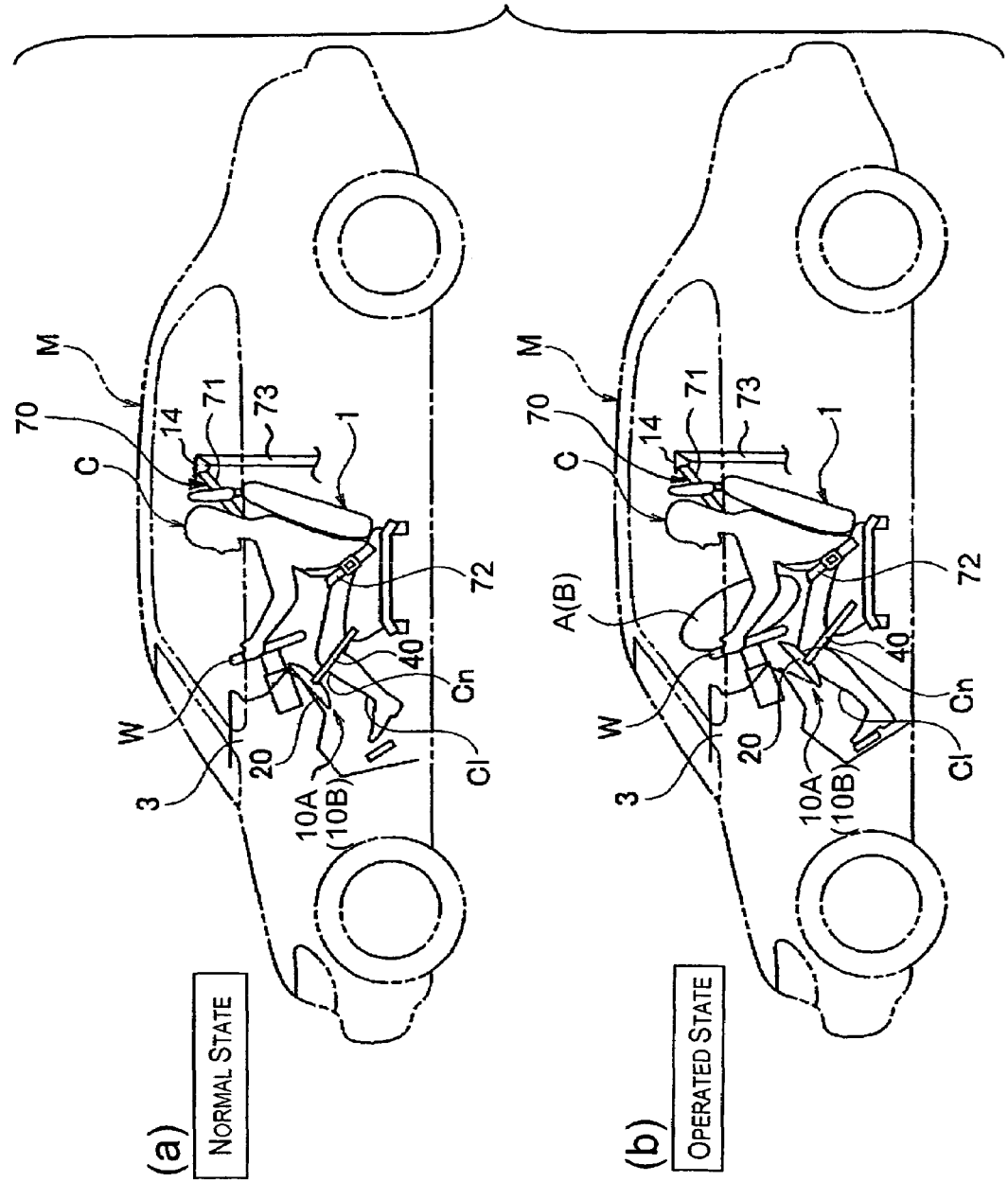
FIG. 2 is a pair of diagrams (a) and (b) illustrating schematic side elevational views of the vehicle passenger restraining system in a normal state (the diagram (a)) and in an operated state (the diagram (b)) in accordance with the first embodiment of the present invention.

FIG. 2 is a pair of diagrams (a) and (b) illustrating schematic side elevational views of the vehicle passenger restraining system in the normal state (the diagram (a)) and in an operated state (the diagram (b)) in accordance with the first embodiment of the present invention. Only the driver's seat knee restraining device 10A disposed in the driver's seat side is illustrated in the diagrams (a) and (b) of FIG. 2. As shown in the diagram (a) of FIG. 2, in the normal state (during normal driving), the knee bolster 20 is arranged at a prescribed distance toward the front of the vehicle M relative to the knees Cn of a sitting passenger C (i.e., a driver in FIG. 2). The knee bolster 20 is oriented to face toward the passenger's knees Cn. On the other hand, as shown in the diagram (b) of FIG. 2, when the vehicle M undergoes a front collision, the driver's seat knee restraining device 10A is configured and arranged to move the knee bolster 20 rearward to restrain the passenger's knees Cn by pressing the knee bolster 20 against the passenger's knees Cn. Thus, the front movement of the passenger's lower limbs Cl during the collision is suppressed by pressing the knee bolster 20 against the passenger's knees Cn.

In the first embodiment of the present invention, the vehicle passenger restraining system also includes a three-point seat belt member 70 provided in each of the driver's seat 1 and the passenger seat 2, as shown in the diagrams (a) and (b) of FIG. 2 (only the driver's seat side seat belt member 70 is shown in the diagrams (a) and (b) of FIG. 2). The seat belt member 70 is arranged as a webbing member that includes a shoulder belt portion 71, a lap belt portion 72 and an anchor portion 73. As shown in the diagrams (a) and (b) of FIG. 2, the anchor portion 73 is folded downward at a shoulder anchor 14 coupled to the vehicle cabin.

The seat belt member 70 is configured and arranged to restrain a passenger to the driver's seat 1 or the passenger's seat 2. Furthermore, a pair of right and left air bags A and B is provided in a steering wheel W and a right side front compartment, respectively, to restrain the passenger as shown in the diagram (b) of FIG. 2 (only the right air bag A is shown in the diagram (b) of FIG. 2).

As shown in FIG. 1, the arrangements of the constituent components of the driver's seat restraining device 10A and the passenger seat knee restraining device 10B are substantially symmetrical (mirror image) to each other with respect to the widthwise (transverse) middle of a vehicle cabin (passenger compartment) of the vehicle M. Thus, corresponding identical parts of the driver's seat knee restraining device 10A and the passenger seat knee restraining device 10B are indicated with the same reference numerals.

As seen in FIG. 1, each of the driver's seat knee restraining device 10A and the passenger seat knee restraining device 10B comprise the knee bolster 20, a guide member 30, a webbing member 40 and a retractor 50. Moreover, the vehicle passenger restraining system of the present invention is provided with a detection sensor 60 and a controller 61. The guide member 30 is configured and arranged to guide the rearward movement of the knee bolster 20 when a collision occurs.

The webbing member 40 preferably constitutes a pulling member of the present invention that is connected to both transverse (widthwise) sides of the knee bolster 20 and arranged to extend generally in the rearward direction of the vehicle M as passing by both transverse sides of a lower limbs area of the driver's seat 1 or the passenger seat 2. In the present invention, a lower limbs area of a seat is defined as an area adjacent to the driver's seat 1 or the passenger seat 2 where the lower limbs Cl of the passenger C will be disposed when the passenger is C sitting in the driver's seat 1 or the passenger seat 2. Thus, the webbing member 40 is preferably arranged to extend generally in the rearward direction of the vehicle M from the knee bolster 20 by passing by the left side of the left leg and the right side of the right leg of the passenger C when the passenger C is sitting in the driver's seat 1 or the passenger seat 2 as shown in the diagrams (a) and (b) of FIG. 2 (only the driver's seat 1 is illustrated in the diagrams (a) and (b) of FIG. 2.

The retractor 50 preferably constitutes a retracting device with a knee bolster winding section of the first embodiment of the present invention that is configured and arranged to pull or retract the webbing member 40 during the collision. The detection sensor 60 preferably constitutes a collision detecting section of the present invention that is configured and arranged to obtain information relating to a collision of the vehicle M and a probability of a collision of the vehicle M. The controller 61 is configured to predict and detect a collision of the vehicle M and to operate the retractor 50 based on a detection signal or information obtained from the detection sensor 60. It will be apparent to those skilled in the art from this disclosure that the controller 61 can be configured to operate the driver's seat knee restraining device 10A and the passenger seat knee restraining device 10B individually or in synchronized manner.

More specifically, the controller 61 preferably includes a microcomputer with a passenger restraining operation control program that controls the retractors 50 of the driver's seat knee restraining device 10A and the passenger seat knee restraining device 10B as discussed below. The controller 61 can also include other conventional components such as an input interface circuit, an output interface circuit, and storage devices such as a ROM (Read Only Memory) device and a RAM (Random Access Memory) device. The microcomputer of the controller 61 is programmed to control the operation of the retractors 50. The memory circuit stores processing results and control programs that are run by the processor circuit. The controller 61 is operatively coupled to the detection sensor 60 and the retractors 50 in a conventional manner. The internal RAM of the controller 61 stores statuses of operational flags and various control data. The internal ROM of the controller 61 stores the data for various operations. The controller 61 is capable of selectively controlling any of the components of the control system in accordance with the control program. It will be apparent to those skilled in the art from this disclosure that the precise structure and algorithms for the controller 61 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

In each of the driver's seat knee restraining device 10A and the passenger seat knee restraining device 10B of the present invention, the knee bolster 20 is moved in the rearward direction of the vehicle M to suppress the forward movement of the passenger's knees Cn when the vehicle M undergoes a front collision as shown in the diagram (b) of FIG. 2 (only the driver's seat knee restraining device 10A is shown in the diagram (b) of FIG. 2). In each of the driver's seat knee restraining device 10A and the passenger seat knee restraining device 10B, the rearward movement of the knee bolster 20 is guided by the guide member 30 and the transverse sides of the knee bolster 20 are pulled toward the rear of the vehicle M by the webbing member 40 when a front collision of the vehicle M is predicted or detected by the controller 61 based on the information obtained in the detection sensor 60. Thus, the guide member 30, the webbing member 40 and the retractor 50 preferably constitute a bolster movement structure for applying a rearwardly directed pulling force to each transverse end of the knee bolster.

Figure 3:
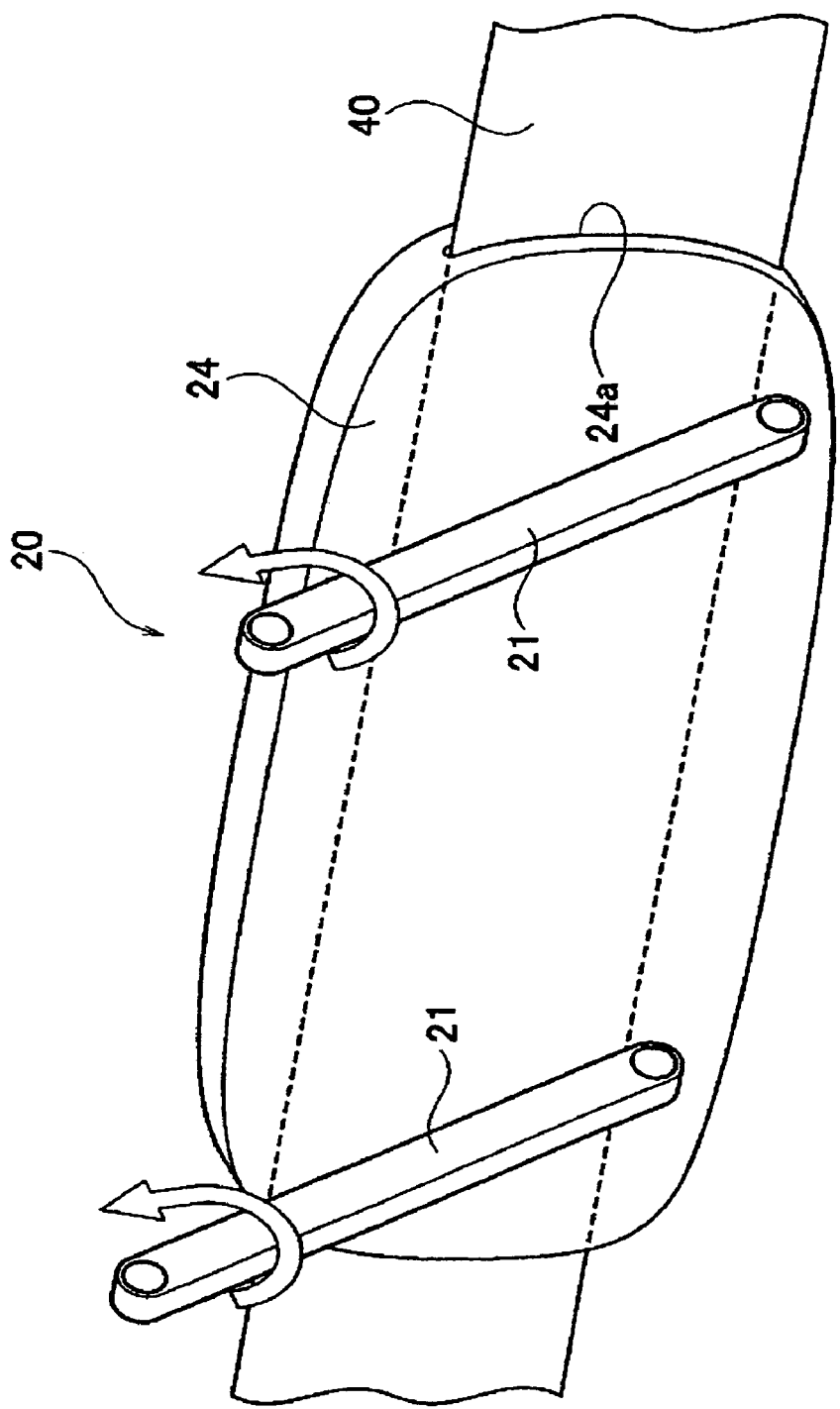
FIG. 3 is an enlarged front perspective view of a knee bolster of the vehicle passenger restraining system illustrating a plurality of link members coupled to the knee bolster in accordance with the first embodiment of the present invention.

FIG. 3 is an enlarged front perspective view of the knee bolster 20 illustrating in accordance with the first embodiment of the present invention. As shown in FIG. 3, the knee bolster 20 has a generally oval shape with the lengthwise dimension being generally aligned in the transverse direction of the vehicle M. The webbing member 40 is arranged to pass through the knee bolster 20 in the lengthwise direction thereof.

Figure 4:
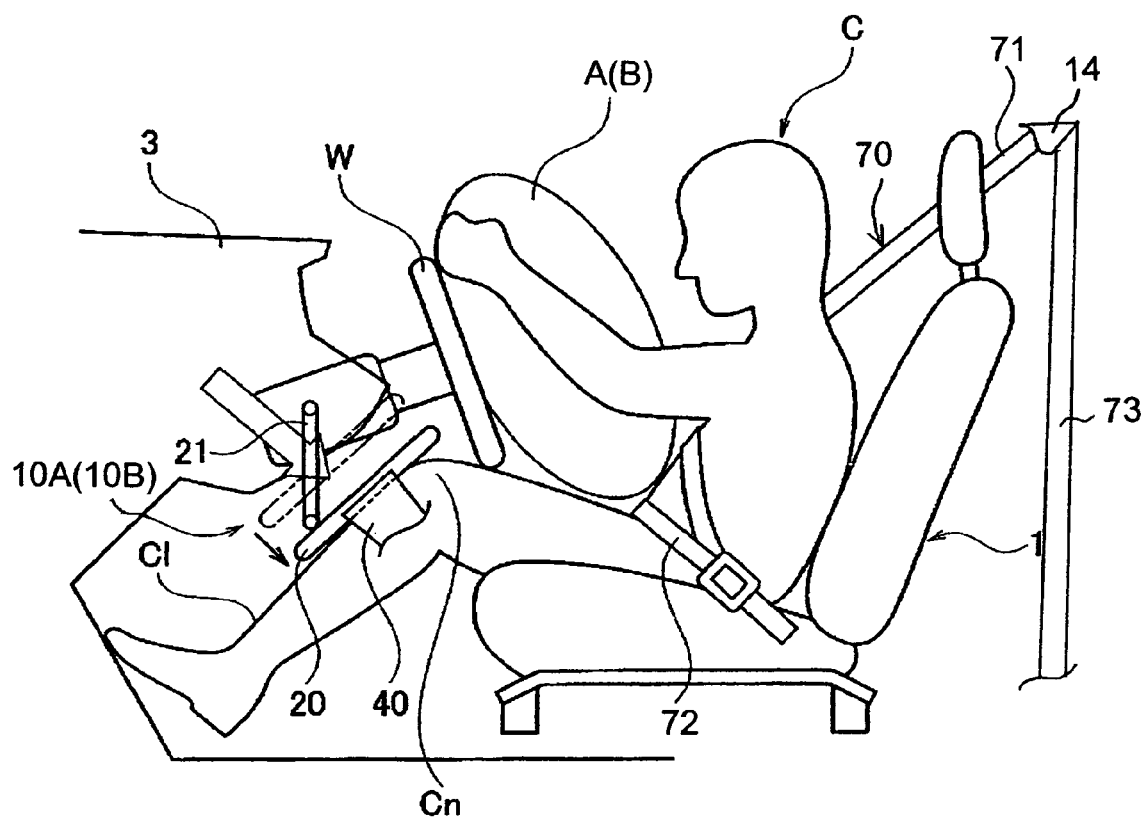
FIG. 4 is a schematic side elevational view of the vehicle passenger restraining system illustrating an operated state of the knee bolster in accordance with the first embodiment of the present invention.

The knee bolster 20 includes a pair of link members 21 coupled to a front side thereof (i.e., a front side with respect to the vehicle M). The link members 21 are configured and arranged to prevent the knee bolster 20 from being lifted upward to guide the knee bolster 20 so that the knee bolster 20 presses smoothly against the passenger's knees Cn. As shown in FIG. 3, the link members 21 are provided on lengthwise end portions of the knee bolster 20, respectively. A lower end of each of the link members 21 is mounted to a lower portion of the front side of the knee bolster 20 such that the knee bolster 20 can swing (pivot) freely with respect to the link members 21. As shown in FIG. 4, an upper end of each of the link members 21 is mounted to an internal framework of an instrument section 3 of the vehicle M such that the link members 21 can swing freely with respect to the instrument section 3.

FIG. 4 is a schematic side elevational view of the driver's seat knee restraining device 10A illustrating an operated state of the knee bolster 20 in accordance with the first embodiment of the present invention. Under normal driving conditions, the knee bolster 20 of each of the driver's seat knee restraining device 10A and the passenger seat knee restraining device 10B is stored adjacent to the instrument section 3 of the vehicle M as shown with a dashed line in FIG. 4 (only the driver's seat knee restraining device 10A is illustrated in FIG. 4). When a collision occurs and when the knee bolster 20 moves rearward, the link members 21 suppress the lower portion of the knee bolster 20 to prevent the knee bolster 20 to be lifted up while the knee bolster 20 is pressed against the knees Cn of the passengers C as shown in FIG. 4.

Figure 5:
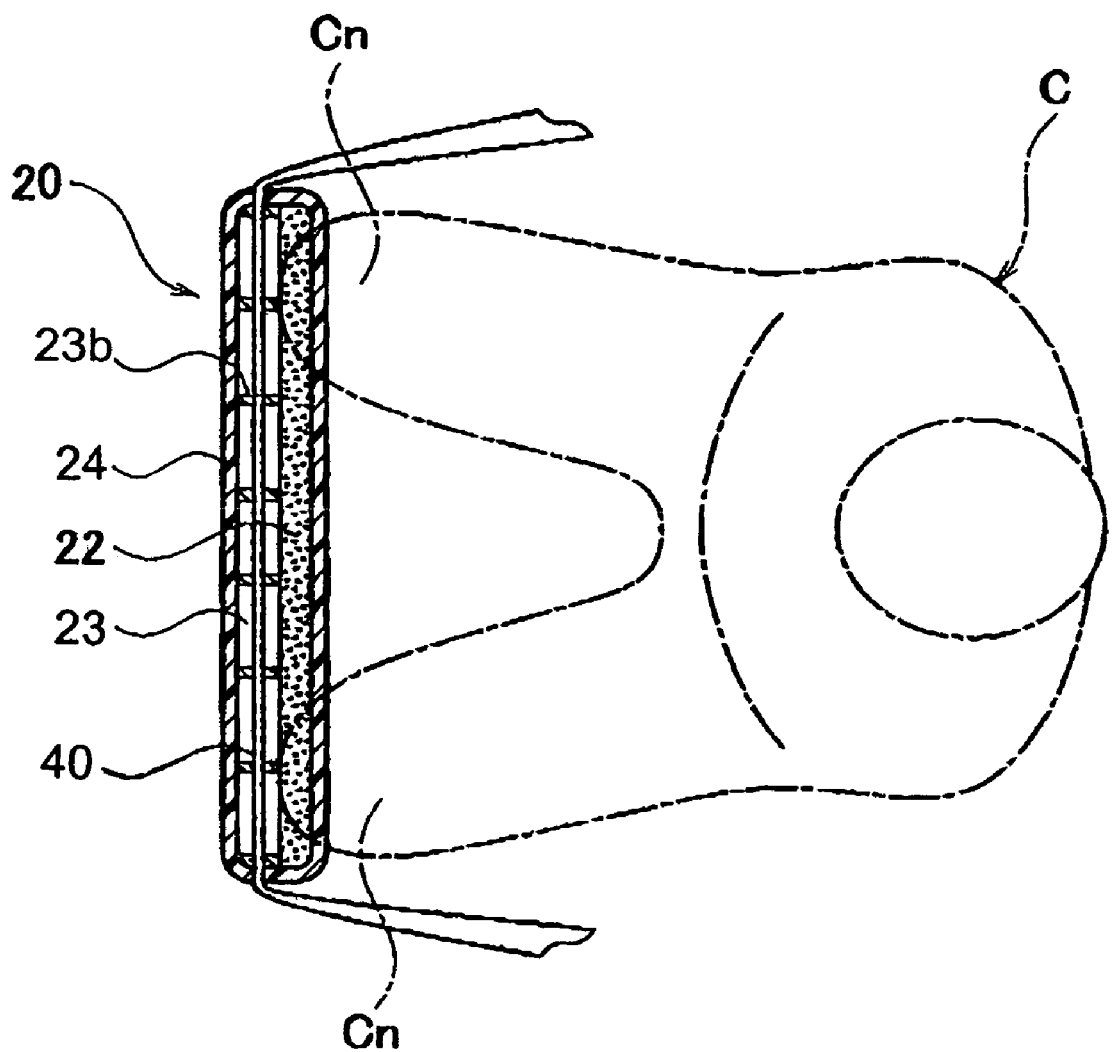
FIG. 5 is a cross sectional view of the knee bolster of the vehicle passenger restraining system as taken along a section line 5-5 of FIG. 3 in accordance with the first embodiment of the present invention.
Figure 6:
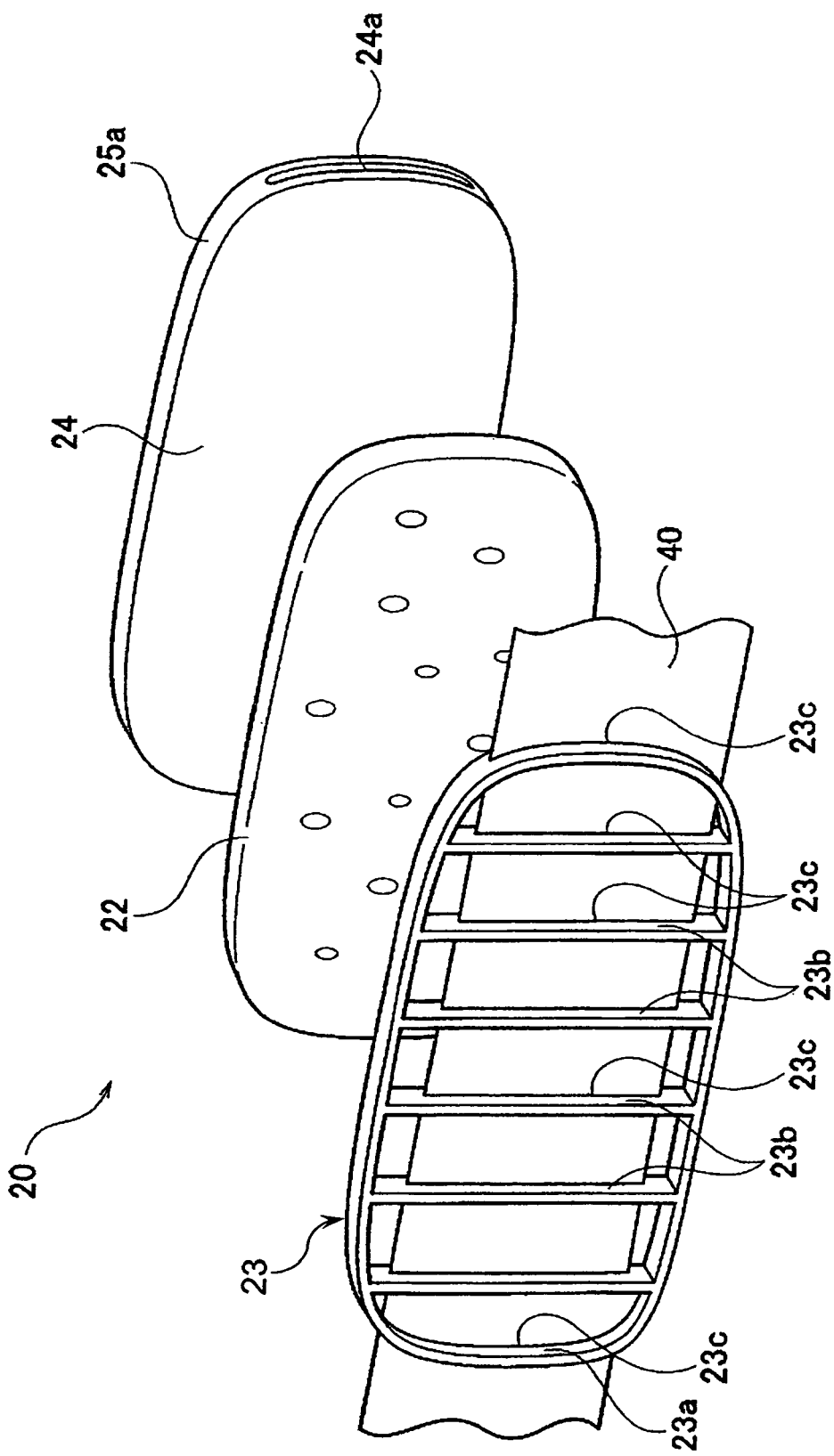
FIG. 6 is an enlarged exploded front perspective view of the knee bolster of the vehicle passenger restraining system in accordance with the first embodiment of the present invention.

FIG. 5 is a cross sectional view of the knee bolster 20 as taken along a section line 5-5 of FIG. 3 in accordance with the first embodiment of the present invention. FIG. 6 is an exploded front perspective view of the knee bolster 20 in accordance with the first embodiment of the present invention.

As shown in FIGS. 5 and 6, the knee bolster 20 preferably comprises a pad having a cushion member 22. More specifically, as shown in FIG. 6, the knee bolster 20 comprises a lattice-like core member 23 made of a synthetic resin or the like, the cushion member 22 arranged on one side (the side facing in the rearward direction of the vehicle M) of the core member 23, and a cover member 24 that covers the cushion member 22 and the core member 23 together. As shown in FIG. 5, the knee bolster 20 including the core member 23, the cushion member 22 and the cover member 24 is arranged to have a sufficient length to span across the knees Cn of the lower limbs Cl of the passenger C when the passenger C is sitting in the driver's seat 1 or the passenger seat 2.

As shown in FIG. 6, the core member 23 of the knee bolster 20 comprises an outer frame 23a and a plurality of rib sections 23b that span vertically across the outer frame 23a. The outer frame 23a and the rib sections 23b include a plurality of slits 23c for passing the webbing member 40 in the lengthwise direction of the core member 23. The cover member 24 is also provided with a pair of through openings 24a, one in each lengthwise end thereof for passing the webbing member 40. Thus, the webbing member 40 is passed through the slits 23c and the through openings 24a such that the webbing member 40 can slide freely with respect to the knee bolster 20.

Referring back to FIG. 1, the guide member 30 of the driver's seat knee restraining device 10A is arranged with respect to the driver's seat 1 such that the guide member 30 extends on both transverse sides of the lower limbs Cl of the passenger sitting in the driver's seat 1. Likewise, the guide member 30 of the passenger seat knee restraining device 10B is provided with respect to the passenger seat 2 such that the guide member 30 extends on both transverse sides of the lower limbs of the passenger sitting in the passenger seat 2. Each of the guide members 30 includes an inside guide section 30A positioned toward the inside in the transverse direction of the vehicle M with respect to the driver's seat 1 or the passenger seat 2, and an outside guide section 30B positioned toward the outside in the transverse direction of the vehicle M with respect to the driver's seat 1 or the passenger seat 2.

Referring now to FIGS. 7 to 15, the guide member 30 of the driver's seat knee restraining device 10A or the passenger seat knee restraining device 10B will be explained in detail. As mentioned above, the structures of the driver's seat knee restraining device 10A and the passenger seat knee restraining device 10B are substantially symmetrical with each other with respect to the transverse middle of the vehicle M. Thus, the guide member 30 of the driver's seat knee restraining device 10A and the guide member 30 of the passenger seat knee restraining device 10B are also symmetrically arranged with each other with respect to the transverse middle of the vehicle M. Accordingly, only the guide member 30 of the passenger seat knee restraining device 10B will be explained in detail herein for the sake of brevity.

Figure 7:
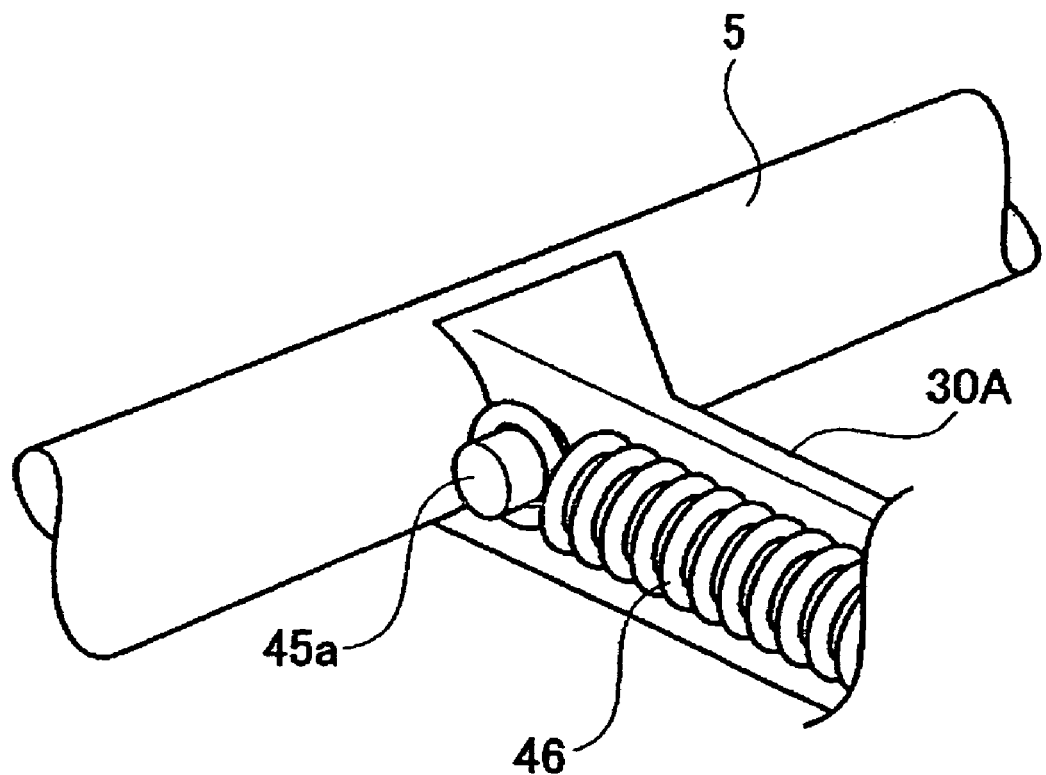
FIG. 7 is an enlarged partial perspective view of a mounting structure of an inside guide section of the vehicle passenger restraining system in accordance with the first embodiment of the present invention.
Figure 8:
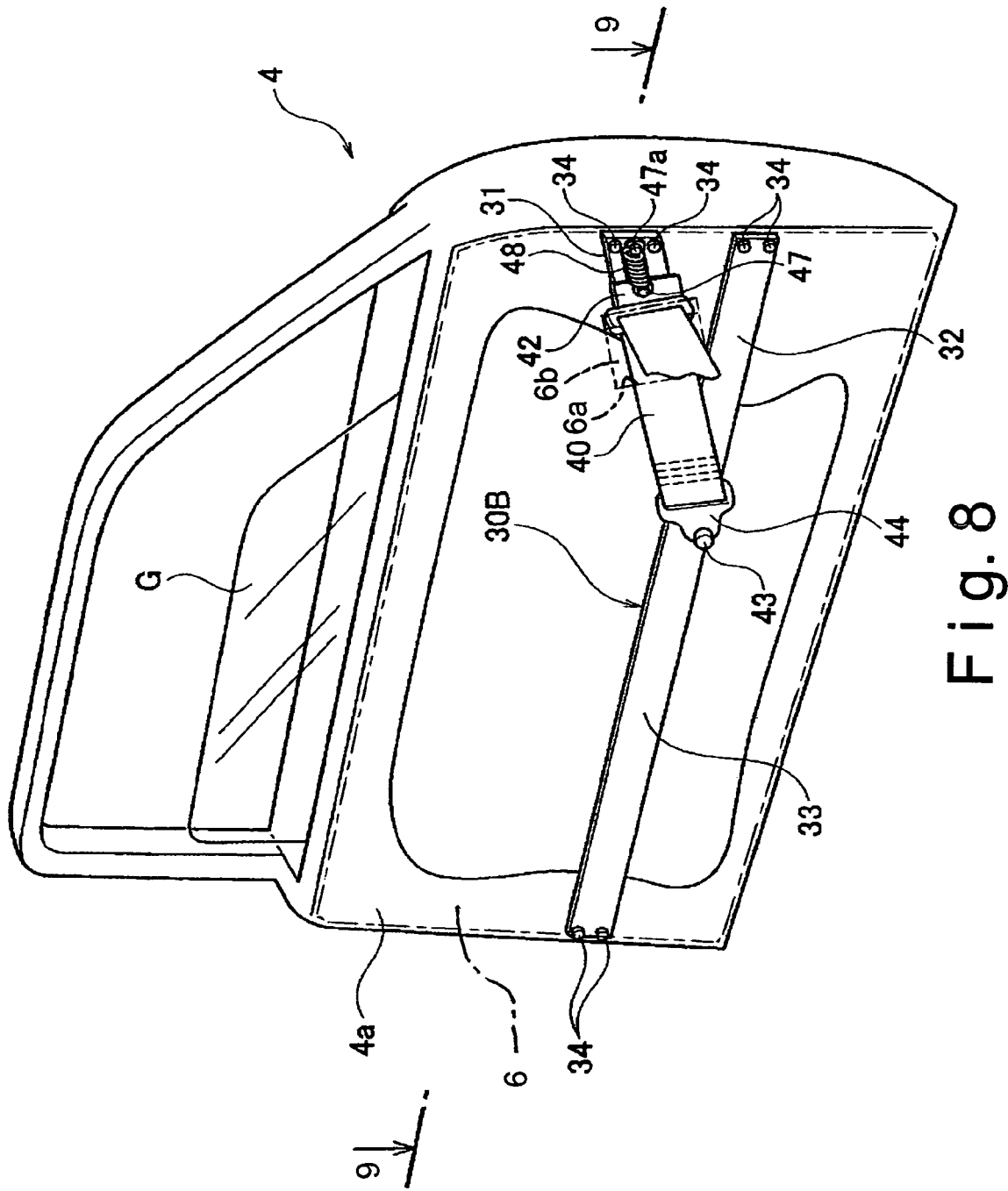
FIG. 8 is a perspective view of an outside guide section of the vehicle passenger restraining system coupled to a front door illustrating a normal state of the vehicle passenger restraining system in accordance with the first embodiment of the present invention.

FIG. 7 is an enlarged partial perspective view of a mounting structure of the inside guide section 30A of the guide member 30 of the passenger seat knee restraining device 10B in accordance with the first embodiment of the present invention. FIG. 8 is a perspective view of the outside guide section 30B of the guide member 30 of the passenger seat knee restraining device 10A illustrating the normal state of the vehicle passenger restraining system in accordance with the first embodiment of the present invention.

As shown in FIG. 1, the inside guide section 30A is preferably made of a rectangular strip-shaped flat plate having a prescribed thickness. The inside guide section 30A is arranged such that the lengthwise direction thereof is aligned generally with the longitudinal direction of the vehicle M. A frontward end (an end closer to the front of the vehicle M) of the inside guide section 30A is connected to a steering member 5 as shown in FIGS. 1 and 7. The steering member 5 is mounted inside the instrument section 3, and configured and arranged to support a steering column (not shown) of the steering wheel.

As shown in FIG. 8, the outside guide section 30B is preferably coupled to a front door 4 of the vehicle M. More specifically, the outside guide section 30B of the driver's seat knee restraining device 10A is provided on the front door 4 on the driver's side of the vehicle M and the outside guide section 30B of the passenger seat knee restraining device 10B is provided on the front door 4 of the passenger's side of the vehicle M (FIG. 1).

The outside guide section 30B is preferably made of a flat plate having a prescribed thickness that branches into a generally Y-shape at a forward portion thereof, as shown in FIGS. 1 and 8. More specifically, as shown in FIG. 8, the outside guide section 30B includes a main guide portion 31 formed in an upper Y-shaped branched end thereof, a lower portion 32 formed in a lower Y-shaped branched end thereof, and a rear end portion 33. The lower portion 32 and the rear end portion 33 are arranged to extend in a substantially straight line generally along the longitudinal direction of the vehicle M as seen in FIGS. 1 and 8.

Figure 9:
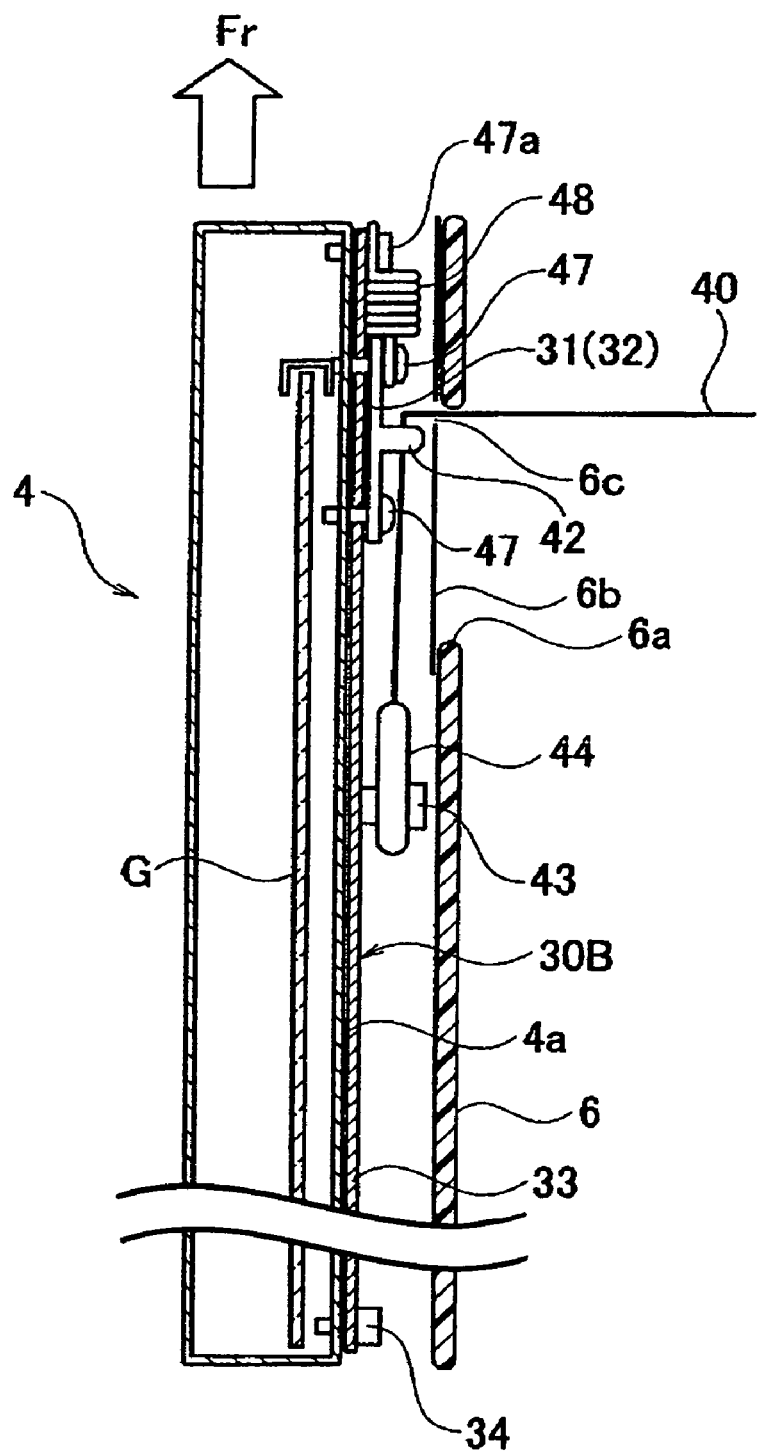
FIG. 9 is a cross sectional view of the outside guide section coupled to the front door taken along a section line 9-9 of FIG. 8 in accordance with the first embodiment of the present invention.

FIG. 9 is a cross sectional view of the outside guide section 30B coupled to the front door 4 taken along a section line 9-9 of FIG. 8 in accordance with the first embodiment of the present invention. As shown in FIGS. 8 and 9, the main guide portion 31, the lower portion 32, and the rear end portion 33 of the outside guide section 30B are each fastened to an inner panel 4a of the front door 4 with a plurality of bolts 34. Moreover, an inner side of the front door 4 that faces the vehicle cabin is covered by a trim member 6 (shown in a chain dash line in FIG. 8) so that the outside guide section 30B is disposed between the trim member 6 and the front door 4.

As shown in FIG. 9, the trim member 6 has an opening 6a formed in a portion of the trim member 6 where the webbing member 40 is drawn out toward the vehicle cabin. The opening 6a is formed to have a shape and cross sectional area that is sufficient to cover a full range of motion through which the webbing member 40 moves when the passenger seat knee restraining device 10B operates. Moreover, the trim member 6 includes a sliding door 6b coupled to the opening 6a, and configured and arranged to slide freely back and forth along the inside surface of the trim member 6. The sliding door 6b has a slit 6c through which the webbing member 40 passes, so that the sliding door 6b blocks the opening 6a in portions other than where the webbing member 40 is drawn out. As seen in FIG. 9, the front door 4 includes a window glass G.

The sliding door 6b is normally spring loaded toward the frontward direction of the vehicle M so that the opening 6a is substantially closed as shown in FIG. 9. As mentioned above, the webbing member 40 is routed into the vehicle cabin through the slit 6c formed in the sliding door 6b.

Figure 10:
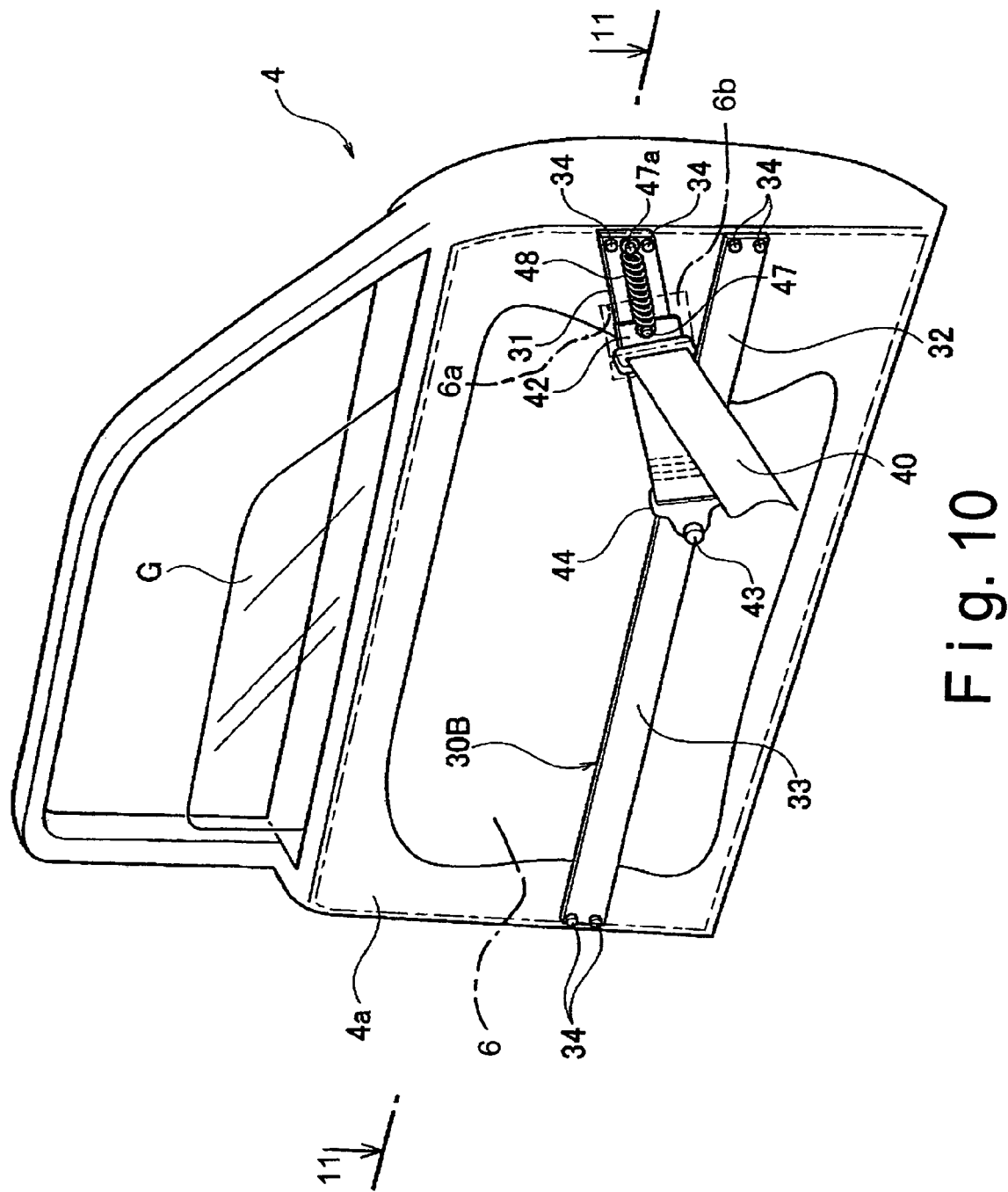
FIG. 10 is a perspective view of the outside guide section of the vehicle passenger restraining system coupled to the front door illustrating an operated state of the vehicle passenger restraining system in accordance with the first embodiment of the present invention.
Figure 11:
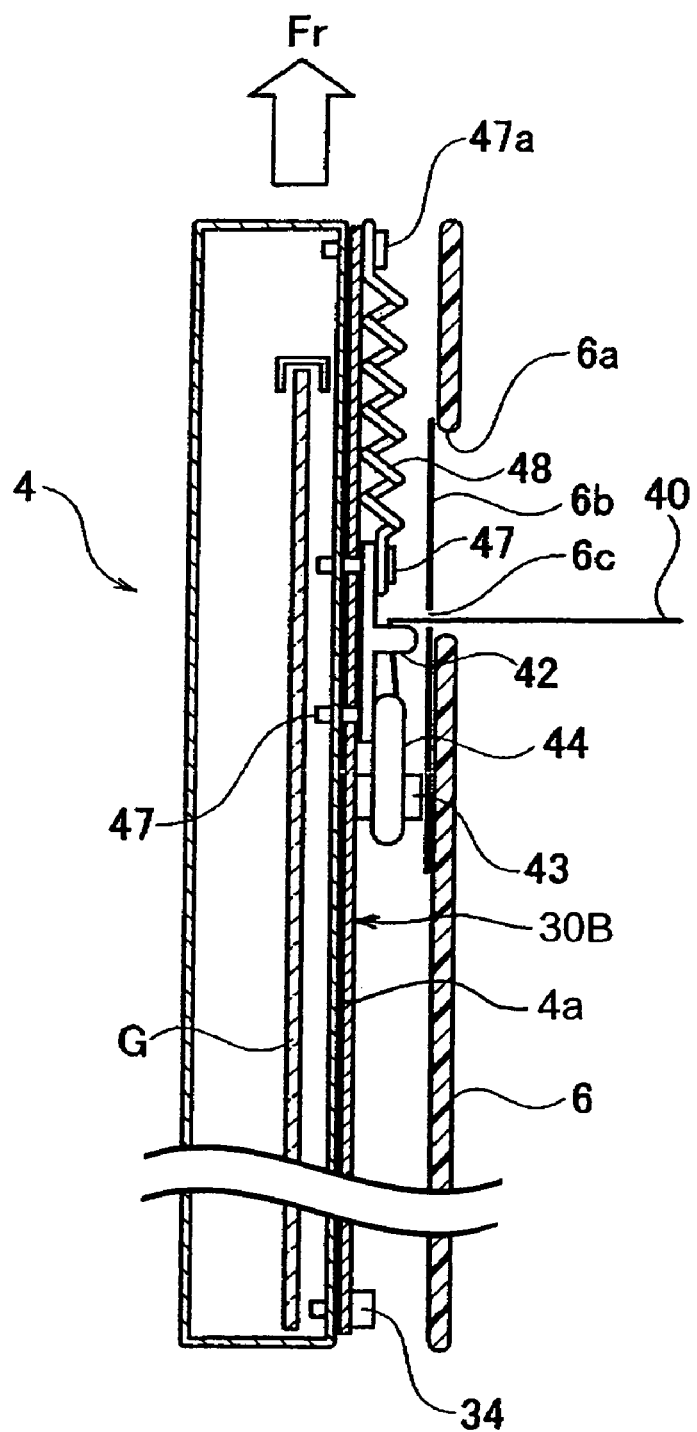
FIG. 11 is a cross sectional view of the outside guide section coupled to the front door taken along a section line 11-11 of FIG. 10 in accordance with the first embodiment of the present invention.

FIG. 10 is a perspective view of the outside guide section 30B of the passenger seat knee restraining device 10B coupled to the front door 4 illustrating the operated state of the passenger seat knee restraining device 10B in accordance with the first embodiment of the present invention. FIG. 11 is a cross sectional view of the outside guide section 30B coupled to the front door 4 taken along a section line 11-11 of FIG. 10 in accordance with the first embodiment of the present invention.

When the passenger seat knee restraining device 10B operates, the webbing member 40 is pulled rearward and the sliding door 6b slides rearward inside the opening 6a, as illustrated in FIG. 11. Even though the webbing member 40 has moved, the opening 6a remains substantially closed by the sliding door 6b. As a result, external appearance of the trim member 6 is preserved and the intrusion of dust and other contaminants into the inside of the trim member 6 (i.e., inside of the front door 4) can be prevented.

In the first embodiment of the present invention, the webbing member 40 is preferably made of an elongated pliable member that is conventionally used for seat belts of a vehicle to restrain a passenger in a seat of the vehicle.

Figure 12:
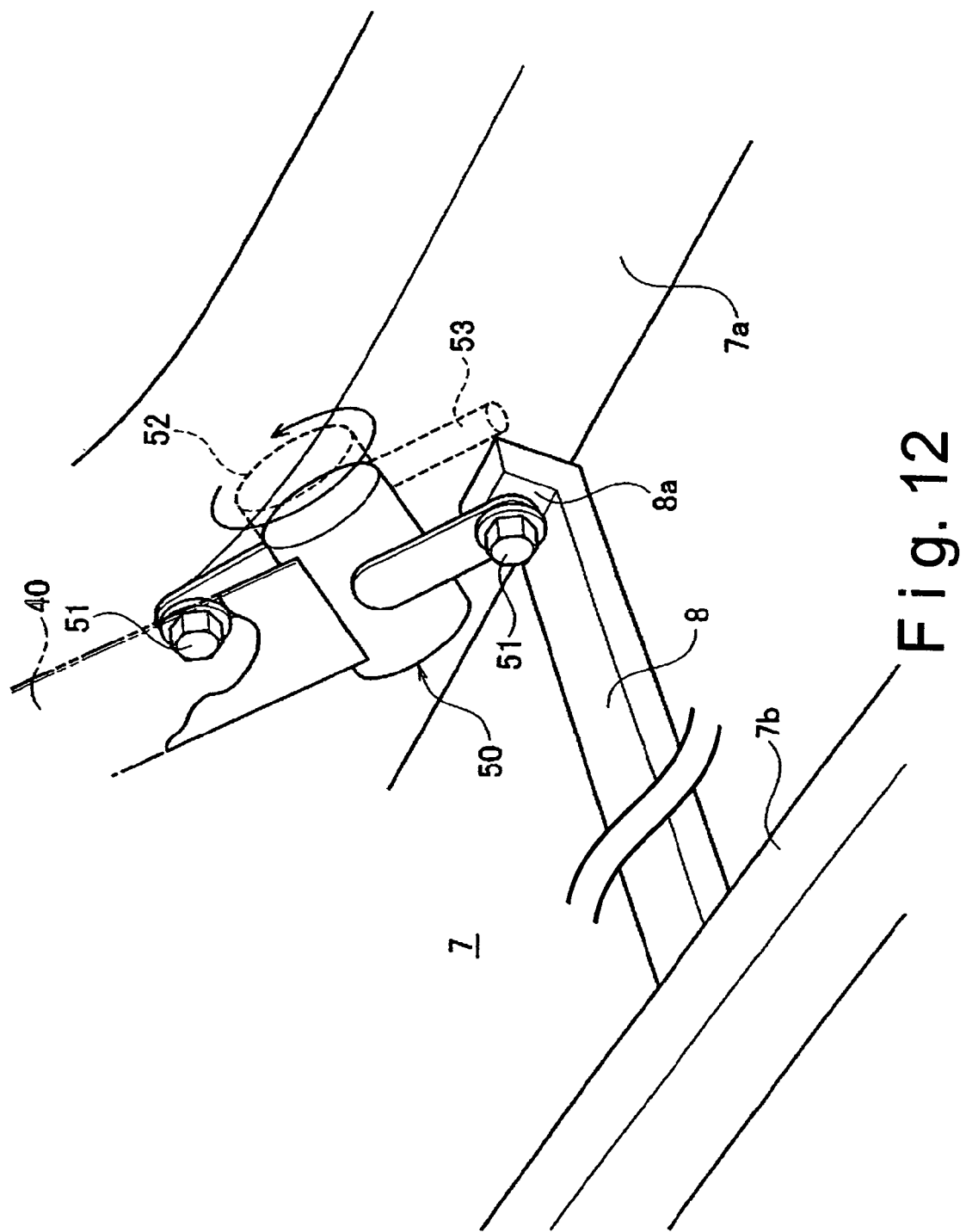
FIG. 12 is an enlarged perspective view of a mounting structure of a rearward end portion of a pulling member coupled to a retracting device of the vehicle passenger restraining system in accordance with the first embodiment of the present invention.

FIG. 12 is an enlarged perspective view of a mounting structure of a rearward end portion of the webbing member 40 coupled to the retractor 50 of the passenger seat knee restraining device 10B in accordance with the first embodiment of the present invention. As shown in FIG. 12, one end of the webbing member 40 is coupled to the retractor 50 of the passenger seat knee restraining device 10B so that the webbing member 40 is wound in and out by the retractor 50.

As shown in FIG. 1, the retractor 50 of the passenger seat knee restraining device 10B is arranged substantially along an extension line of the inside guide section 30A on an inner side of the passenger seat 2 that are closer to the transverse (widthwise) middle of the vehicle M. As shown in FIG. 12, a cross member 8 extending along a floor panel 7 in the transverse direction of the vehicle M is connected between a tunnel section 7a and a body side sill 7b of the vehicle M. The retractor 50 is fastened to a transversely inward end 8a of the cross member 8 and an upper edge of a side face of the tunnel section 7a with a pair of bolts 51.

As shown in FIG. 12, the retractor 50 includes a torque limiter (not shown) and an electric motor 52 that is configured and arranged to execute a preparatory pulling against the webbing member 40 (i.e., a preparatory winding-in of the webbing member 40) when the controller 61 predicts that a front collision will occur based on the detection signals from the detection sensor 60.

The retractor 50 also includes an explosive-based gas generating device 53 configured to operate and execute a main pulling of the webbing member 40 (i.e., a full-fledged winding-in of the webbing member 40) when the controller 61 detects a front collision based on the detection signals from the detection sensor 60. The explosive-based gas generating device 53 is preferably provided with an igniter (not shown) that is configured and arranged to ignite the explosive when the explosive-based gas generating device 53 receives an ignition signal from the controller 61. When the igniter of the explosive-based gas generating device 53 ignites the explosive, the explosive-based gas generating device 53 explodes and generates a gas pressure that operates the retractor 50 such that the webbing member 40 is wound in substantially instantaneously.

When the retractor 50 winds in the webbing member 40 by using the electric motor 52 or the explosive-based gas generating device 53, the torque limiter of the retractor 50 takes effect and prevents the webbing member 40 from being drawn in with excessive force. The retractor 50 having the torque limiter, the electric motor 52 and the explosive-based gas generating device 53 as used in the first embodiment of the present invention is a conventional component that is well known in the art. Since such retractor is well known in the art, these structures of the retractor 50 will not be discussed or illustrated in detail herein. Rather, it will be apparent to those skilled in the art from this disclosure that the component can be any type of structure and/or programming that can be used to carry out the present invention.

As shown in FIG. 1, the webbing member 40 drawn out from the retractor 50 passes through an inside sliding anchor 41 that is mounted to the inside guide section 30A. The inside sliding anchor 41 is coupled to the inside guide section 30A such that the inside sliding anchor 41 can move freely back and forth with respect to the inside guide section 30A. Then, the webbing member 40 extends transversely outward from the inside sliding anchor 41 to an outside sliding anchor 42 mounted to the main guide portion 31 of the outside guide section 30B. The outside sliding anchor 42 is coupled to the outside guide section 30B such that the outside sliding anchor 42 can move freely back and forth with respect to the outside guide section 30B as shown in FIG. 8. The webbing member 40 passes through the outside sliding anchor 42, and is directed rearward along the main guide portion 31 of the outside guide section 30B. The rearward end portion of the webbing member 40 that is directed rearward at the outside sliding anchor 42 is coupled to a stationary anchor 44 that is fixedly coupled to a rearward end portion of the main guide portion 31 with a bolt 43 as shown in FIG. 8.

Figure 13:
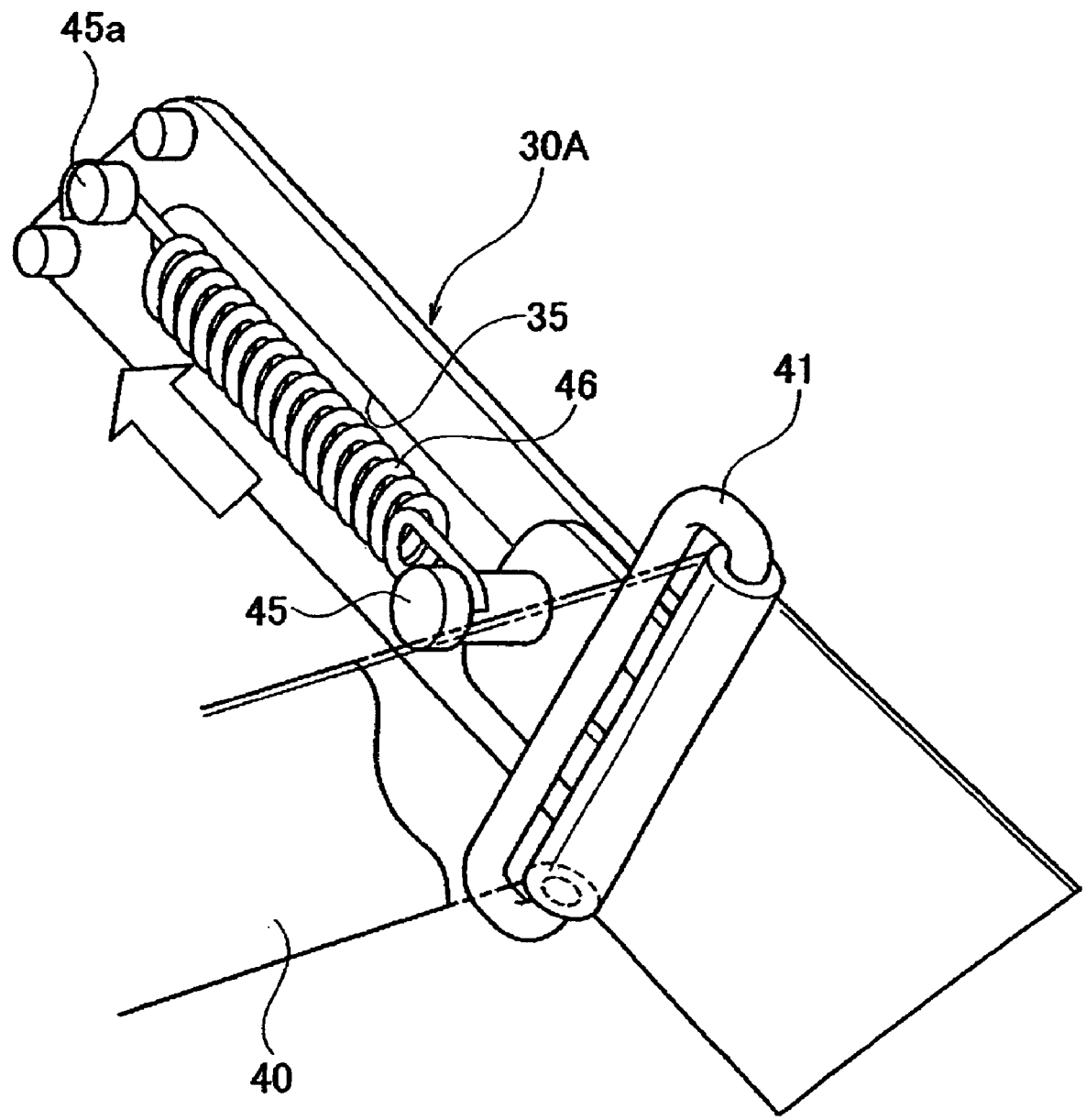
FIG. 13 is an enlarged perspective view of a mounting structure between the pulling member and the inside guide section of the vehicle passenger restraining system in accordance with the first embodiment of the present invention.

FIG. 13 is an enlarged perspective view of a mounting structure between the webbing member 40 and the inside guide section 30A of the passenger seat knee restraining device 10B in accordance with the first embodiment of the present invention. As shown in FIG. 13, the inside sliding anchor 41 is coupled to the inside guide section 30A in a freely sliding manner with a bolt 45 that passes through an elongated hole 35 formed in the inside guide section 30A. The elongated hole 35 of the inside guide section 30A extends in the lengthwise direction along the widthwise middle of the inside guide section 30A as shown in FIG. 13. A compression spring 46 is coupled in a tensioned or biased state between the bolt 45 and a pin 45a provided on a frontward end portion of the inside guide section 30A. The compression spring 46 spring loads (applies biasing force to) the inside sliding anchor 41 toward the front of the vehicle M.

Figure 14A:
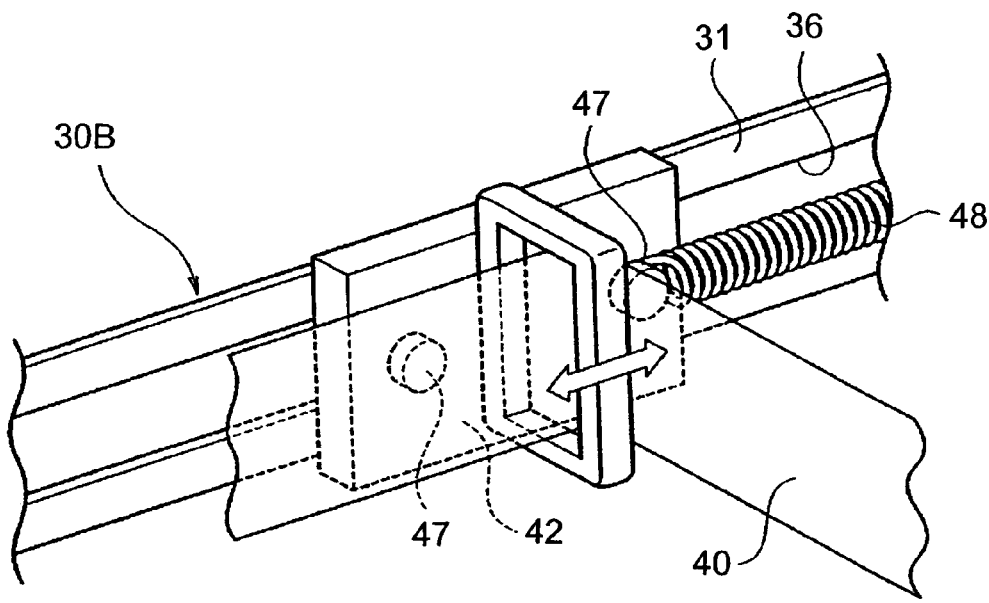
FIG. 14(A) is an enlarged perspective view of a mounting structure between the pulling member and the outside guide section of the vehicle passenger restraining system illustrating a vehicle cabin side in accordance with the first embodiment of the present invention.
Figure 14B:
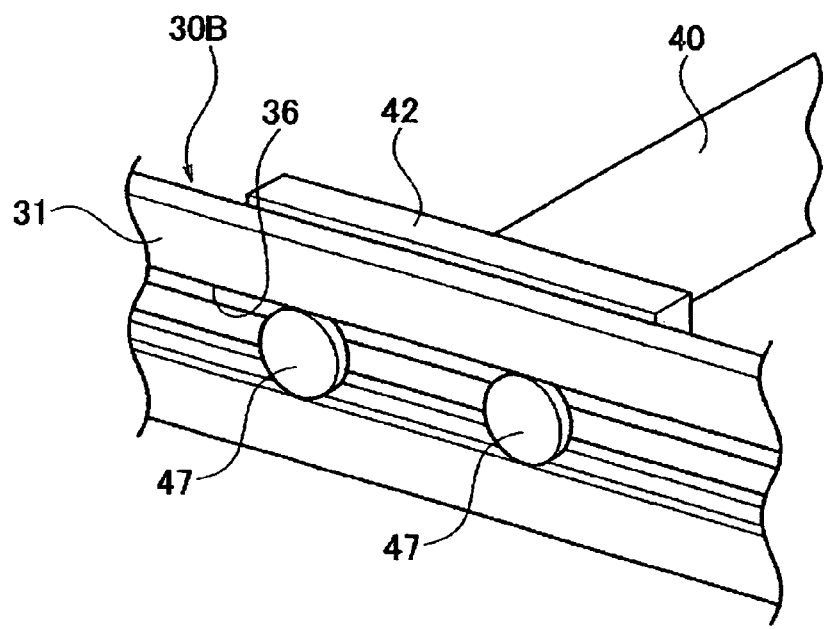
FIG. 14(B) is an enlarged perspective view of the mounting structure between the pulling member and the outside guide section of the vehicle passenger restraining system illustrating a vehicle outer side in accordance with the first embodiment of the present invention.

FIG. 14(A) is an enlarged perspective view of a vehicle cabin side of a mounting structure between the webbing member 40 and the outside guide section 30B of the passenger seat knee restraining device 10B in accordance with the first embodiment of the present invention. FIG. 14(B) is an enlarged perspective view of a vehicle outer side of the mounting structure between the webbing member 40 and the outside guide section 30B of the passenger seat knee restraining device 10B in accordance with the first embodiment of the present invention.

As shown in FIG. 14(A), the outside sliding anchor 42 is coupled to the outside guide section 30B in a freely sliding manner with a bolt 47 that passes through an elongated hole 36 formed in the main guide portion 31 of the outside guide section 30B. The elongated hole 36 of the main guide portion 31 extends in the lengthwise direction along the widthwise middle of the main guide portion 31. As shown in FIGS. 8 and 14(A), a compression spring 48 is coupled in a tensioned state between the bolt 47 and a pin 47a provided on a frontward end portion of the main guide portion 31. The compression spring 48 spring loads (applies biasing force to) the outside sliding anchor 42 toward the front of the vehicle M.

Referring back to FIG. 1, a portion of the webbing member 40 that spans between the inside sliding anchor 41 and the outside sliding anchor 42 is slideably coupled to the knee bolster 20. More specifically, as shown in FIG. 6, the portion of the webbing member 40 that spans between the inside sliding anchor 41 and the outside sliding anchor 42 passes through the through holes 24a and the slits 23c formed inside of the knee bolster 20. Also, as explained previously with reference to FIG. 4, the knee bolster 20 is supported on the internal framework of the instrument section 3 by the link members 21 arranged on the front side of the knee bolster 20 (only the driver's seat knee restraining device 10A is shown in FIG. 4).

Figure 15:
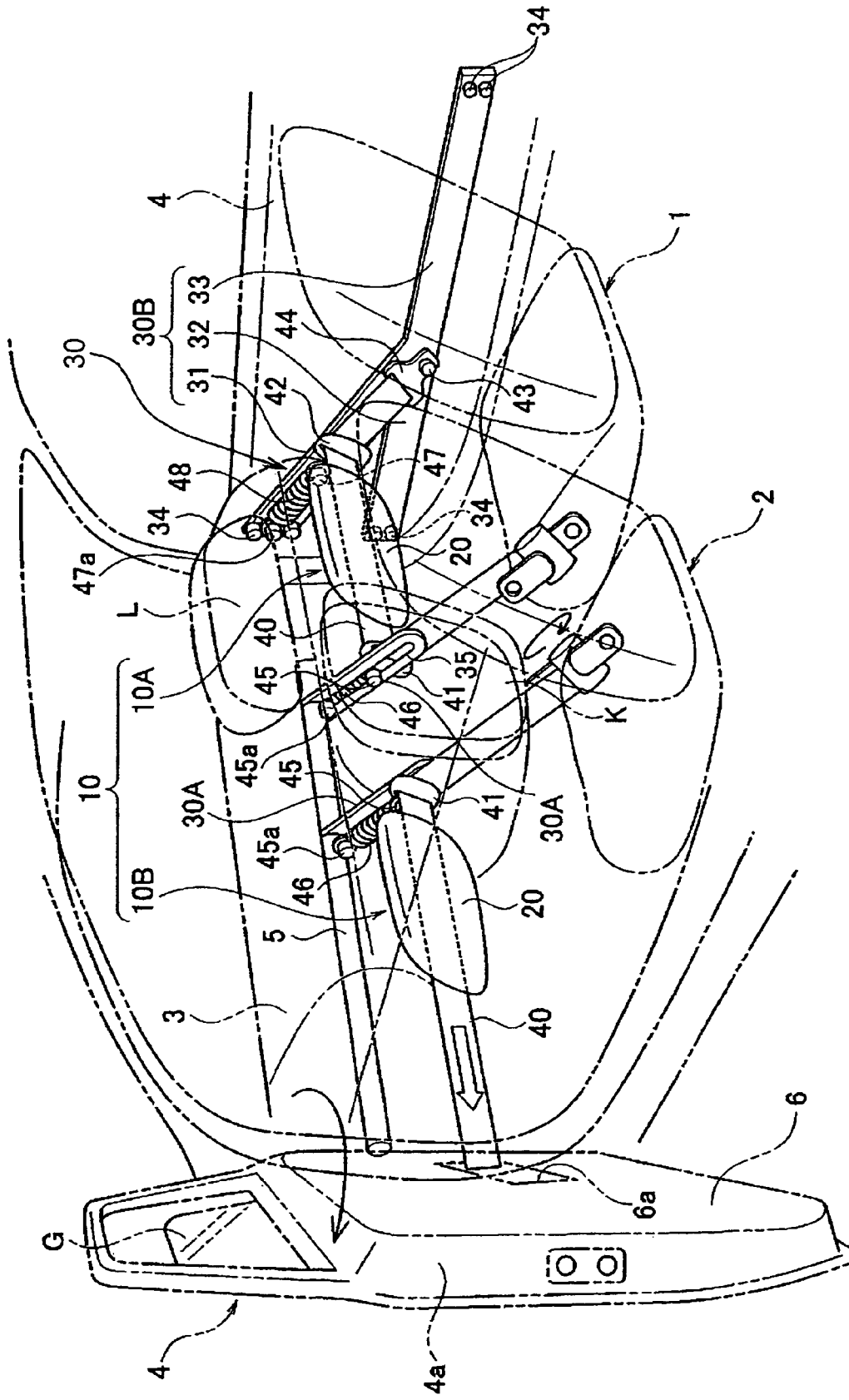
FIG. 15 is a rear perspective view of the vehicle passenger restraining system illustrating a state in which the front door is open in accordance with the first embodiment of the present invention.

FIG. 15 is a rear perspective view of the vehicle passenger restraining system illustrating a state in which the front door 4 on the passenger seat side is opened in accordance with the first embodiment of the present invention. When the front door 4 on the passenger seat side is opened, the outside guide section 30B of the passenger seat knee restraining device 10B moves to the outside of the vehicle cabin together with the front door 4, as shown in FIG. 15. In such case, a portion of the webbing member 40 located transversely toward the outside of the vehicle M relative to the lower limbs area (where the lower limbs Cl of the passenger C will be disposed when the passenger C is sitting in the passenger seat 2) also moves outside the vehicle cabin.

As shown in FIGS. 1 and 15, the vehicle cabin includes a console section K located between the knee bolster 20 of the driver's seat 1 and the knee bolster 20 of the passenger seat 2, and an instrument cluster section L located in front of the driver's seat 1 where the instrument cluster (gauges) is arranged.

Figure 16:
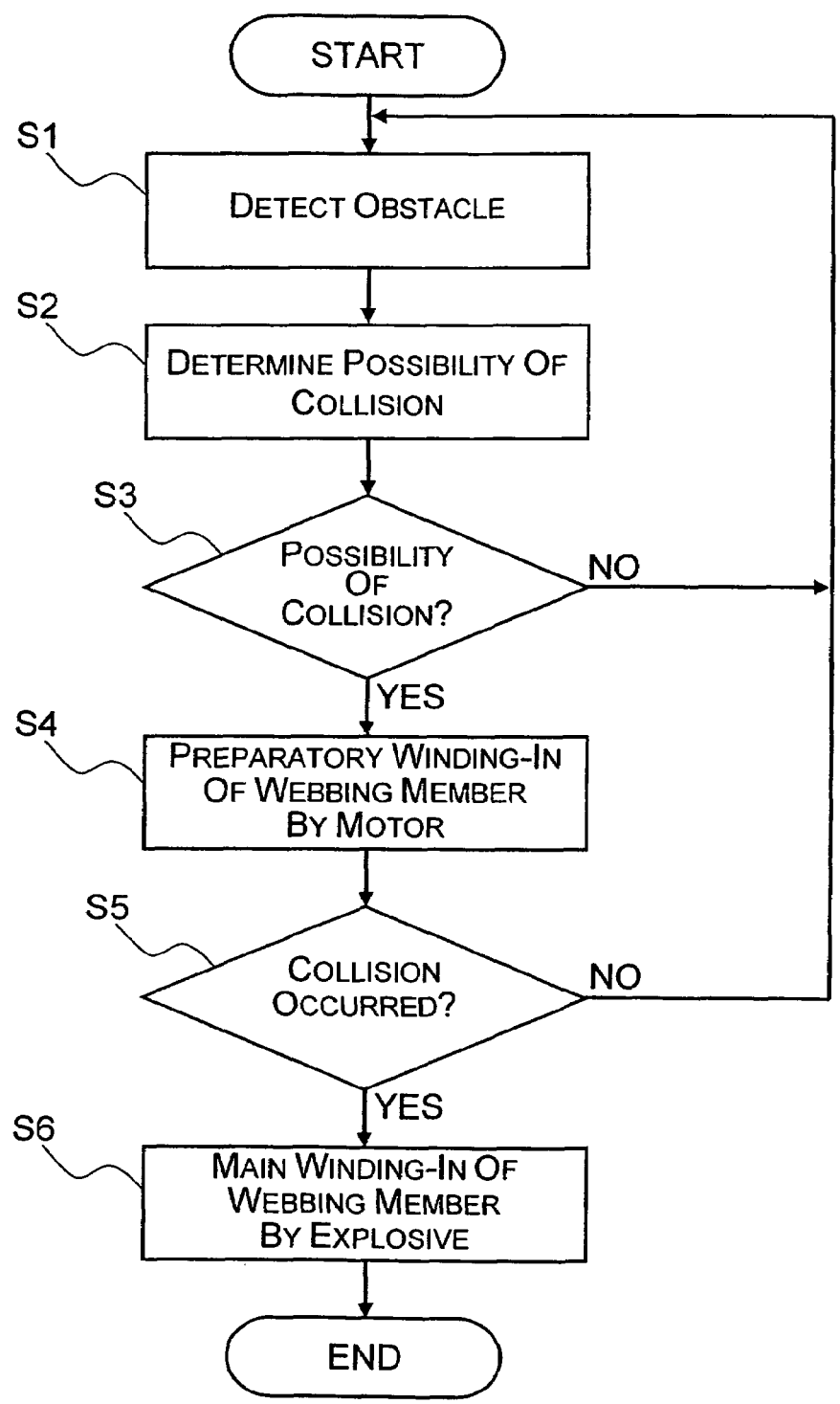
FIG. 16 is a flowchart describing control steps executed in a controller of the vehicle passenger restraining system for controlling operation of the retracting device in accordance with the first embodiment of the present invention.
Figure 17:
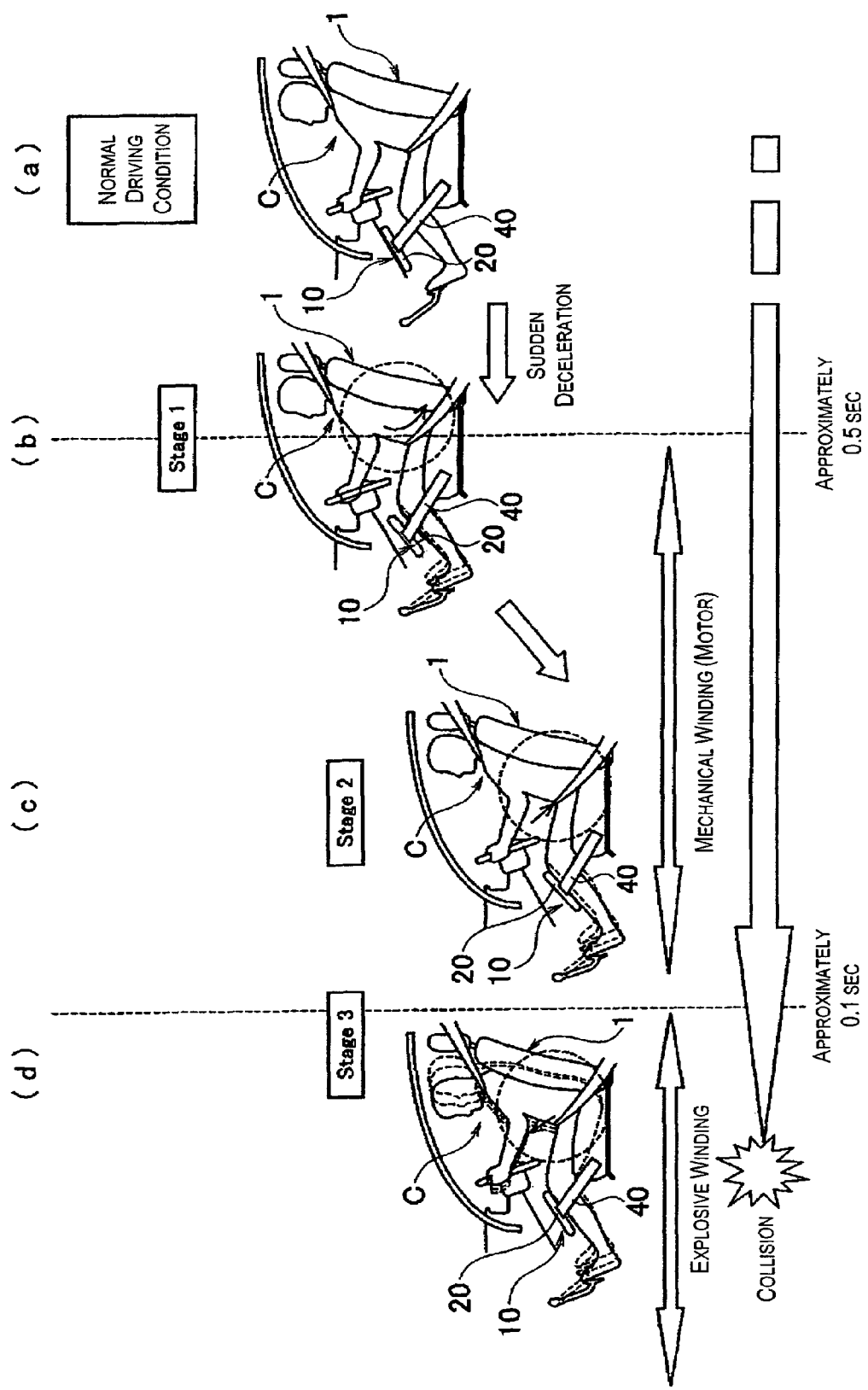
FIG. 17 is a series of diagrams (a) to (d) illustrating operation of the vehicle passenger restraining system in sequence from a normal driving state (the diagram (a)) to a final restraining state (the diagram (d)) in accordance with the first embodiment of the present invention.

FIG. 16 is a flowchart describing control steps executed in the controller 61 of the vehicle passenger restraining system for controlling operation of the retractors 50 of the driver's seat knee restraining device 10A and the passenger seat knee restraining device 10B in accordance with the first embodiment of the present invention. FIG. 17 is a series of diagrams (a) to (d) illustrating the operation of the driver's seat knee restraining device 10A in sequence from a normal driving state (the diagram (a)) to a final restraining state (the diagram (d)) in accordance with the first embodiment of the present invention. The operational control of the knee bolster 20 of the driver's seat knee restraining device 10A will now be explained with reference to the flowchart shown in FIG. 16. The behavior of the knee bolster 20 will be explained with reference to the diagrams (a) to (d) of FIG. 17.

In step S1 of FIG. 16, the controller 61 is configured to receive a detection signal from the detection sensor 60 while the driving conditions are normal and the knee bolster 20 is positioned in a rest position as shown in the diagram (a) of FIG. 17. In step S2, the controller 61 is configured to use the information contained in the detection signal from the detection sensor 60 to determine if there is an obstacle in front of the vehicle M. Also, in step S2, the controller 61 is configured to calculate a relative distance and a relative speed of the vehicle M with respect to the obstacle.

In step S3, the controller 61 is configured to determine (predict) if there is a possibility that the vehicle M will undergo a front collision based on the information obtained in step S2. If the controller 61 determines there is no possibility that the vehicle M will undergo a front collision (NO in step S3), the controller 61 is configured to return to step S1. If the controller 61 determines there is a possibility that the vehicle M will undergo a front collision (YES in step S3), the controller 61 proceeds to step S4 where the controller 61 is configured to drive the electric motor 52 of the retractor 50 to pretension the webbing member 40 (preparatory winding-in).

The diagram (b) of FIG. 17 shows a state of the knee bolster 20 during step S4 of FIG. 16. As shown in the diagram (b) of FIG. 17, the webbing member 40 is partially wound in by the retractor 50 such that the knee bolster 20 is pulled rearward (preparatory wind-in). The diagram (c) of FIG. 17 shows a state of the knee bolster 20 after step S4 of FIG. 16. As shown in the diagram (c) of FIG. 17, when the preparatory winding-in by the electric motor 52 is performed, the knee bolster 20 is positioned in an extended position. More specifically, the knee bolster 20 is disposed with respect to the passenger's knees Cn such that the knee bolster 20 just touches the passenger's knees Cn. However, the retractor 50 is configured and arranged to set the retracting force of the webbing member 40 during and after the preparatory winding-in so that the knee bolster 20 does not hamper a movement of the passenger's knees Cn when the passenger wishes to operate a brake.

Next, in step S5, the controller 61 is configured to determine if a front collision has actually occurred based on a detection signal from the detection sensor 60. If the controller 61 determines in step S5 that a collision did no occur (NO in step S5), the controller 61 is configured to return to step S1. If the controller 61 determines in step S5 that a collision did occur (YES in step S5), the controller 61 proceeds to step S6 and to issue an ignition signal to the igniter of the explosive-based gas generating device 53, thereby operating the explosive-based gas generating device 53. The diagram (d) of FIG. 17 illustrates a state of the knee bolster 20 in step S6 of FIG. 16. The retractor 50 executes a full fledged (main) winding in of the webbing member 40 such that the passenger's knees Cn are securely restrained. As a result, the thighs of the passengers C are prevented from sliding beneath the lap belt 72 of the seat belt member 70 and moving forward. In the example shown in FIG. 17, the preparatory winding-in of the webbing member 40 is performed between approximately 0.5 second and approximately 0.1 second prior to the actual collision occurs.

If an actual collision is ultimately avoided and the result of step S5 is NO, the electric motor 52 is rotated in a reverse direction (wind off direction) to loosen the webbing member 40 and to return the knee bolster 20 to its original position (rest position) as shown in the diagram (a) of FIG. 17.

More specifically, when the webbing member 40 is loosened by the retractor 50, the compression springs 46 and 48 provided in the inside guide section 30A and the outside guide section 30B, respectively, pull the inside sliding anchor 41 and the outside sliding anchor 42 in the forward direction of the vehicle M. As a result, the webbing member 40 is pulled out toward the front of the vehicle M and the knee bolster 20 is returned to its original position as shown in the diagram (a) of FIG. 17.

Figure 18:
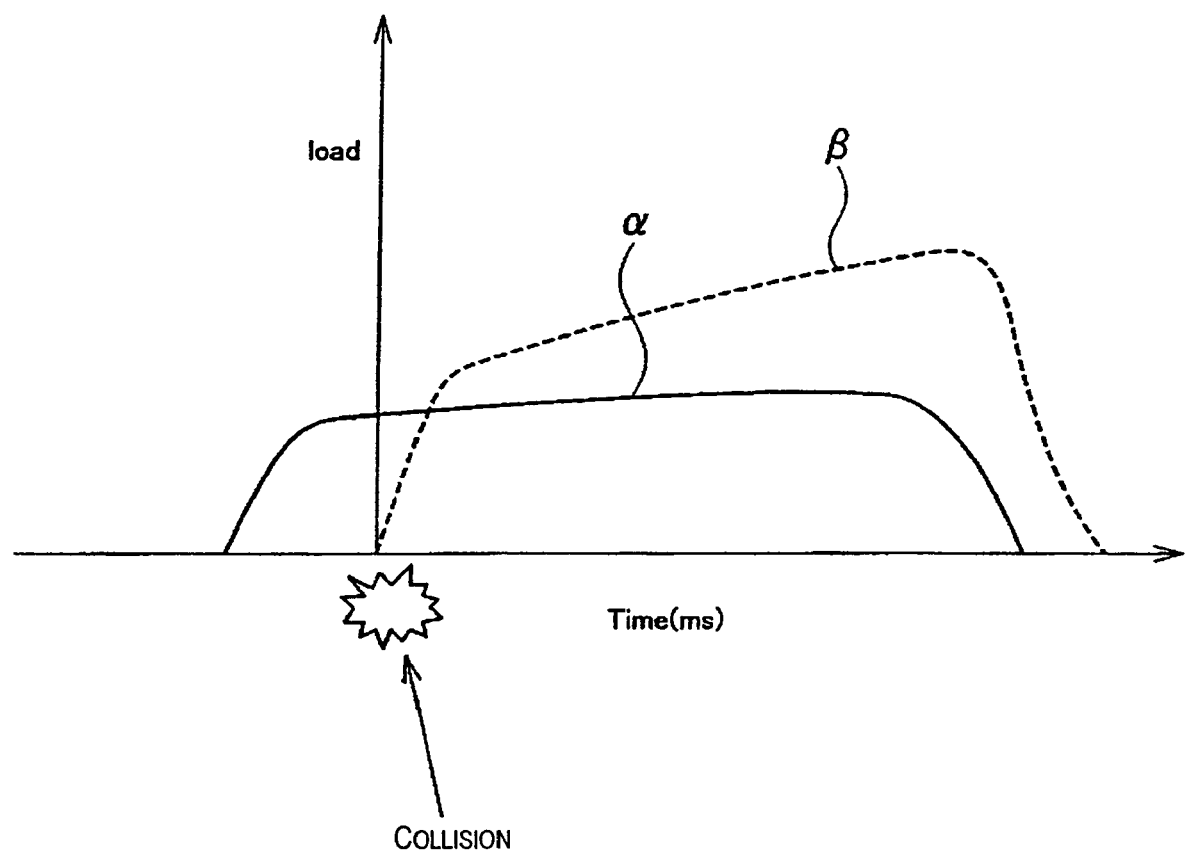
FIG. 18 is a diagrammatic chart illustrating a time characteristic of a restraining load that the knee bolster exerts against passenger's knees in accordance with the first embodiment of the present invention.

FIG. 18 is a diagrammatic chart illustrating a time characteristic of a restraining load that the knee bolster 20 exerts against passenger's knees Cn in accordance with the first embodiment of the present invention.

In the first embodiment of the present invention, the electric motor 52 is operated to preload the webbing member 40 at a stage when the controller 61 predicts that a front collision might occur, and the explosive-based gas generating device 53 is operated at a stage when an actual collision is detected. As a result, the amount of time over which a load is applied to the webbing member 40 is long, as indicated by the characteristic curve α (solid line) shown in FIG. 18. Therefore, the amount of time over which the knee bolster 20 is pressed against the passenger's knees Cn is longer than in the case of a conventional passenger knee restraining device. The characteristic curve β (broken line) in FIG. 18 indicates the load characteristic of the conventional passenger knee restraining device.

Furthermore, as shown in FIG. 18, in the first embodiment of the present invention, the torque limiter of the retractor 50 is preferably adjusted such that the load applied to the webbing member 40 is lower than in conventional passenger knee restraining devices.

With the features of the first embodiment described heretofore, the vehicle passenger restraining system of the present invention is configured to predict and detect a front collision of the vehicle M and to move the knee bolster 20 in a guided manner along the inside guide section 30A and the outside guide section 30B by pulling the webbing member 40 (which is arranged to extend in the rearward direction of the vehicle M to pass by both transverse sides of the passenger's lower limbs Cl) rearward with the retractor 50. As a result, the knee bolster 20 can be made to undergo a larger amount of rearward movement and the passenger's knees Cn can be restrained at a more rearward position comparing to conventional knee restraining devices. Consequently, the passenger's knees Cn can be restrained at an earlier timing when a collision occurs.

Since the webbing member 40 is arranged to extend toward the rear of the vehicle M on both transverse sides of the passenger's lower limbs Cl, the passenger's lower limbs Cl are positioned between both sides of the webbing member 40 regardless of the orientation of the passenger's lower limbs Cl and the knee bolster 20 can be guided reliably to the passenger's knees Cn. Therefore, the restraining effect of the knee bolster 20 is increased.

Moreover, in the first embodiment of the present invention, the vehicle passenger restraining system is configured to minimize the damage inflicted on the passenger C because the knee bolster 20 is made of a pad with the cushion member 22 that functions to soften the impact that occurs when the knee bolster 20 is moved rearward and makes contact with the passenger's knees Cn.

Additionally, each of the driver's seat knee restraining device 10A and the passenger seat knee restraining device 10B includes the guide member 30 comprising the inside guide section 30A and the outside guide section 30B arranged as a pair spaced apart from each other in the transverse direction of the vehicle M such that the passenger's lower limbs Cl are disposed therebetween. The outside guide section 30B is provided on the front door 4 of the vehicle M. Consequently, when the front door 4 is opened, the outside guide section 30B moves to the outside of the vehicle cabin together with the portion of the webbing member 40 arranged therein. As a result, the guide member 30 does not hinder the passenger C when he or she gets in and out of the vehicle M.

Also, since the webbing member 40 serving as the elongated pliable member is wound in and out by the retractor 50, the webbing member 40 can be stored in a compact and reliable manner and operated properly without malfunctioning when a collision occurs.

Since the retractor 50 is provided with the electric motor 52 configured to execute a preparatory pulling (preparatory wind-in) of the webbing member 40 at a stage when a collision is predicted, the knee bolster 20 can be moved rearward by the preparatory pull such that the knee bolster 20 contacts or comes in close proximity to the passenger's knees Cn before the actual collision occurs. As a result, when the actual collision occurs, the passenger's knees Cn can be restrained by the knee bolster 20 very quickly.

Since the retractor 50 is provided with an explosive-based gas generating device 53 configured to execute a main pulling (main wind-in) of the webbing member 40 at a stage when a collision is detected, the webbing member 40 can be wound in very quickly when the actual collision occurs and the passenger's knees Cn can be restrained at a more rearward position. As a result, the forward movement of the passenger C can be suppressed more efficiently.

Figure 19:
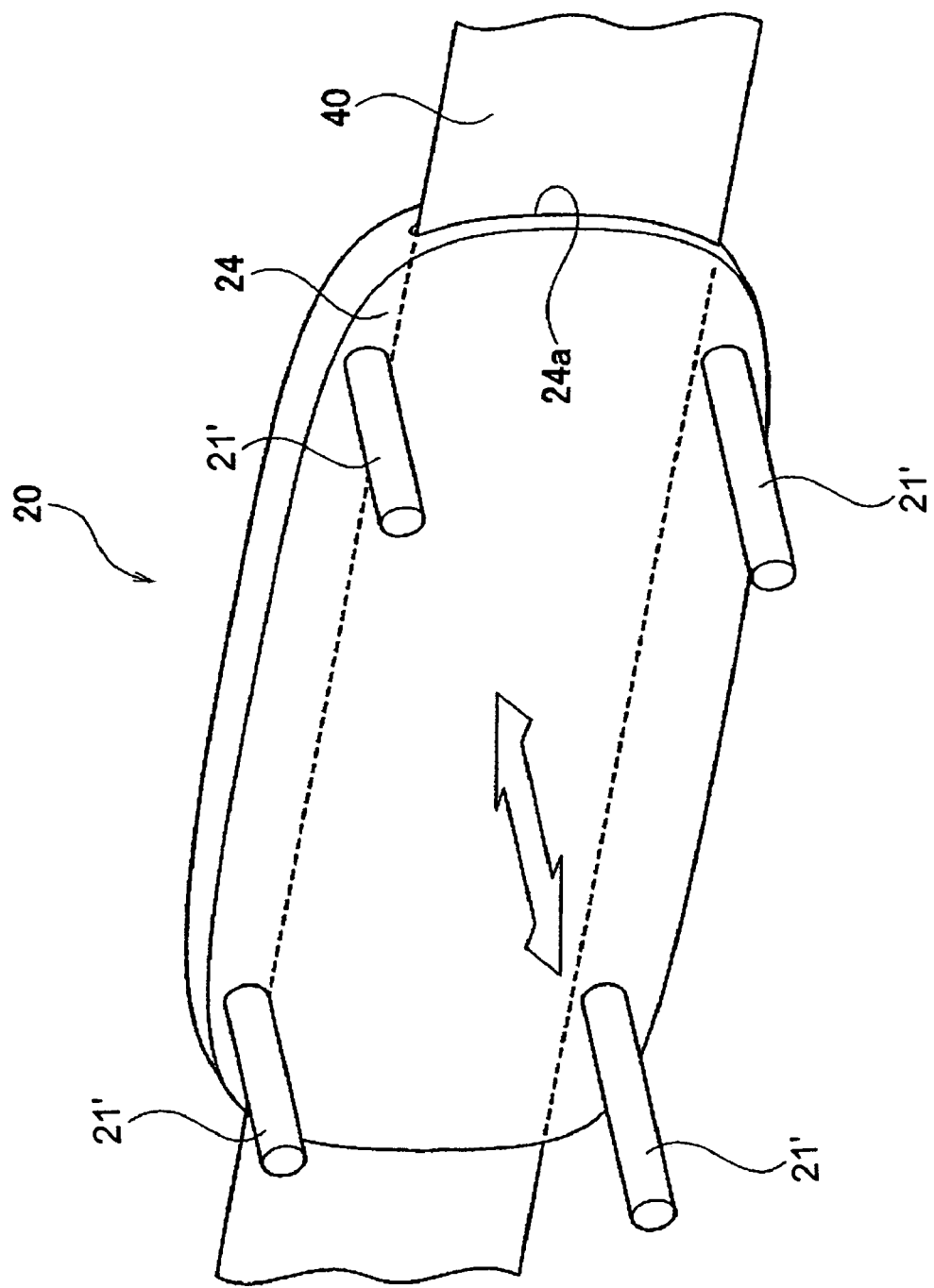
FIG. 19 is an enlarged front perspective view of the knee bolster of the vehicle passenger restraining system illustrating a first alternative structure of a plurality of link members coupled to the knee bolster in accordance with the first embodiment of the present invention.
Figure 20:
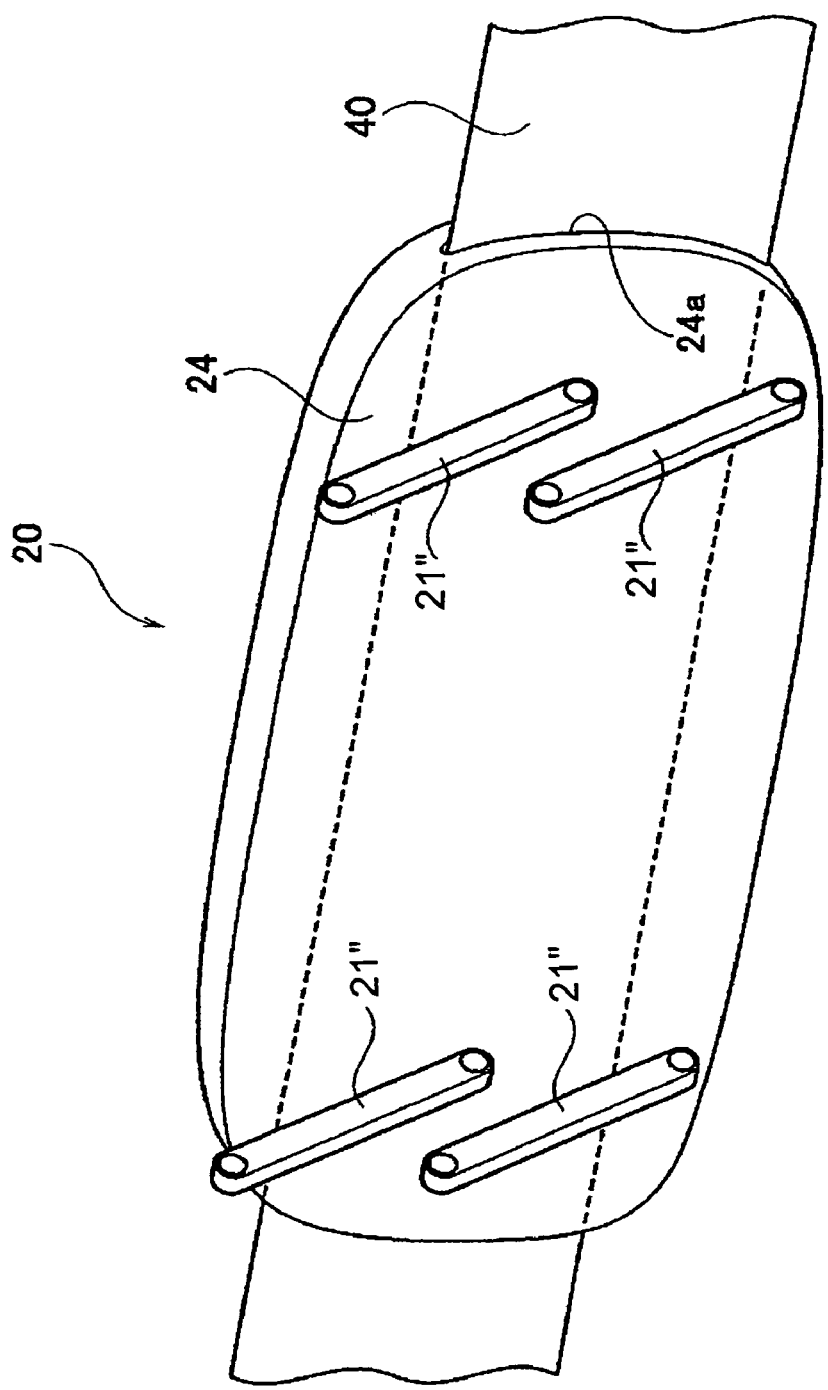
FIG. 20 is an enlarged rear perspective view of the knee bolster of the vehicle passenger restraining system illustrating a second alternative structure of a plurality of link members coupled to the knee bolster in accordance with the first embodiment of the present invention.

Although the first embodiment presents a case in which the link members 21 are provided on the front side of the knee bolster 20 to prevent the knee bolster 20 from being lifted upward, the present invention is not limited to such arrangements for preventing the knee bolster 20 from being lifted up. For example, FIG. 19 is an enlarged front perspective view of the knee bolster 20 illustrating a first alternative structure of a plurality of link members 21' in accordance with the first embodiment of the present invention. As seen in FIG. 19, the link members 21' are arranged as four protruding guide bars on the four corner portions, respectively, of the front side of the knee bolster 20. The link members 21' are configured and arranged to be inserted in a freely sliding manner into a lower portion of the instrument section 3, thereby preventing the knee bolster 20 to be lifted upward when the knee bolster 20 is moved rearward. Also, FIG. 20 is an enlarged front perspective view of the knee bolster 20 illustrating a second alternative structure of a plurality of link members 21" in accordance with the first embodiment of the present invention. As seen in FIG. 20, it is also possible to restrict the behavior of the knee bolster 20 by providing four of the link members 20" that are configured and arranged to be mounted in a freely swinging manner to the instrument section 3.

Figure 21:
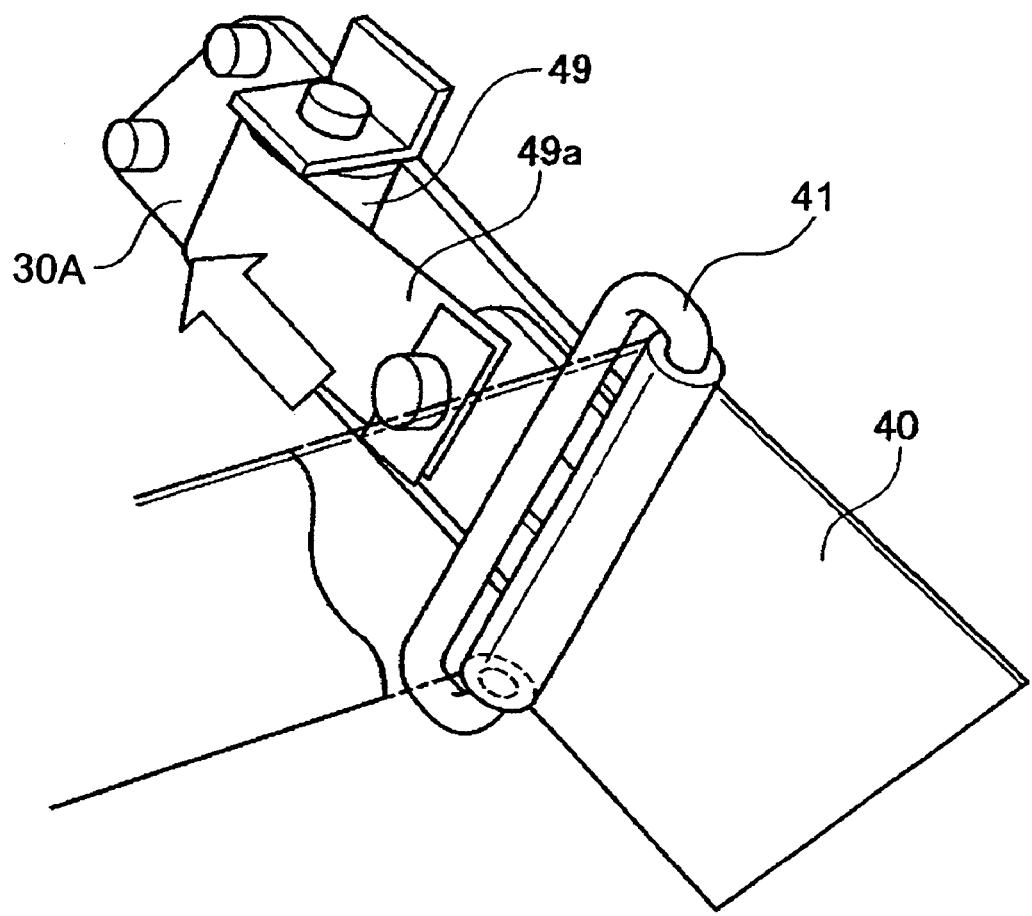
FIG. 21 is an enlarged perspective view of an alternative mounting structure between the pulling member and the inside guide member of the vehicle passenger restraining system in accordance with the first embodiment of the present invention.

Also, although the first embodiment presents a case in which the inside sliding anchor 41 and the outside sliding anchor 42 mounted in a freely sliding manner to the inside guide section 30A and the outside guide section 30B, respectively, are spring loaded toward the front of the vehicle M by a biasing mechanism including the compression springs 46 and 48, respectively, the present invention is not limited to such arrangements for spring loading the sliding anchors 41 and 42. For example, FIG. 21 is an enlarged perspective view of an alternative mounting structure between the webbing member 40, the inside sliding anchor 41 and the inside guide member 30A in accordance with the first embodiment of the present invention. As seen in FIG. 21, a retractor 49, which is configured and arranged to wind in and wind out a webbing section 49a connected to the inside sliding anchor 41, can be used instead of the compression spring 46. The inside sliding anchor 41 can then be applied with biasing force toward the front of the vehicle M by the force that results when the retractor 49 apply a force on the webbing section 49a in the direction of winding in. Of course, it will be apparent to those skilled in the art from this disclosure that the retractor 49 shown in FIG. 21 can also be used instead of the compression spring 48 provided in the outside guide section 30B.

Accordingly, with the vehicle passenger restraining system of the first embodiment, when a front collision of the vehicle M is predicted or detected, the knee bolster 20 is pulled toward the rear of the vehicle M by the webbing member 40 that is arranged to extend generally in the rearward direction of the vehicle M to pass by both transverse sides of the passenger's lower limbs Cl and the rearward movement of the knee bolster 20 is guided by the guide member 30. Consequently, the knee bolster 20 can be made to undergo a large amount of rearward movement and the passenger's knees Cn can be restrained at a more rearward position. As a result, the passenger's knees Cn can be restrained at an earlier timing when a collision occurs.

Additionally, since the webbing member 40 is arranged to extend toward the rear of the vehicle M and pass by both transverse sides of the passenger's lower limbs Cl, the passenger's lower limbs are positioned between the webbing member 40 arranged on both sides regardless of the orientation of the passenger's lower limbs Cl. As a result, the knee bolster 20 is reliably guided to the passenger's knees Cn and the restraining effect can be improved.

Second Embodiment

Referring now to FIGS. 22 to 29, a vehicle passenger restraining system in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The vehicle passenger restraining system of the second embodiment differs from the vehicle passenger restraining system of the first embodiment in that a retractor 150 of the second embodiment is further coupled to the seat belt member 70 so that the rearward movement of the knee bolster 20 is substantially synchronized with retraction of the seat belt member 70 during a collision in the second embodiment of the present invention. Moreover, the webbing member 40 of the first embodiment is substituted by a wire member 140A coupled to the retractor 150 and a belt member 140B coupled to the knee bolster 20 in the second embodiment of the present invention.

Figure 22:
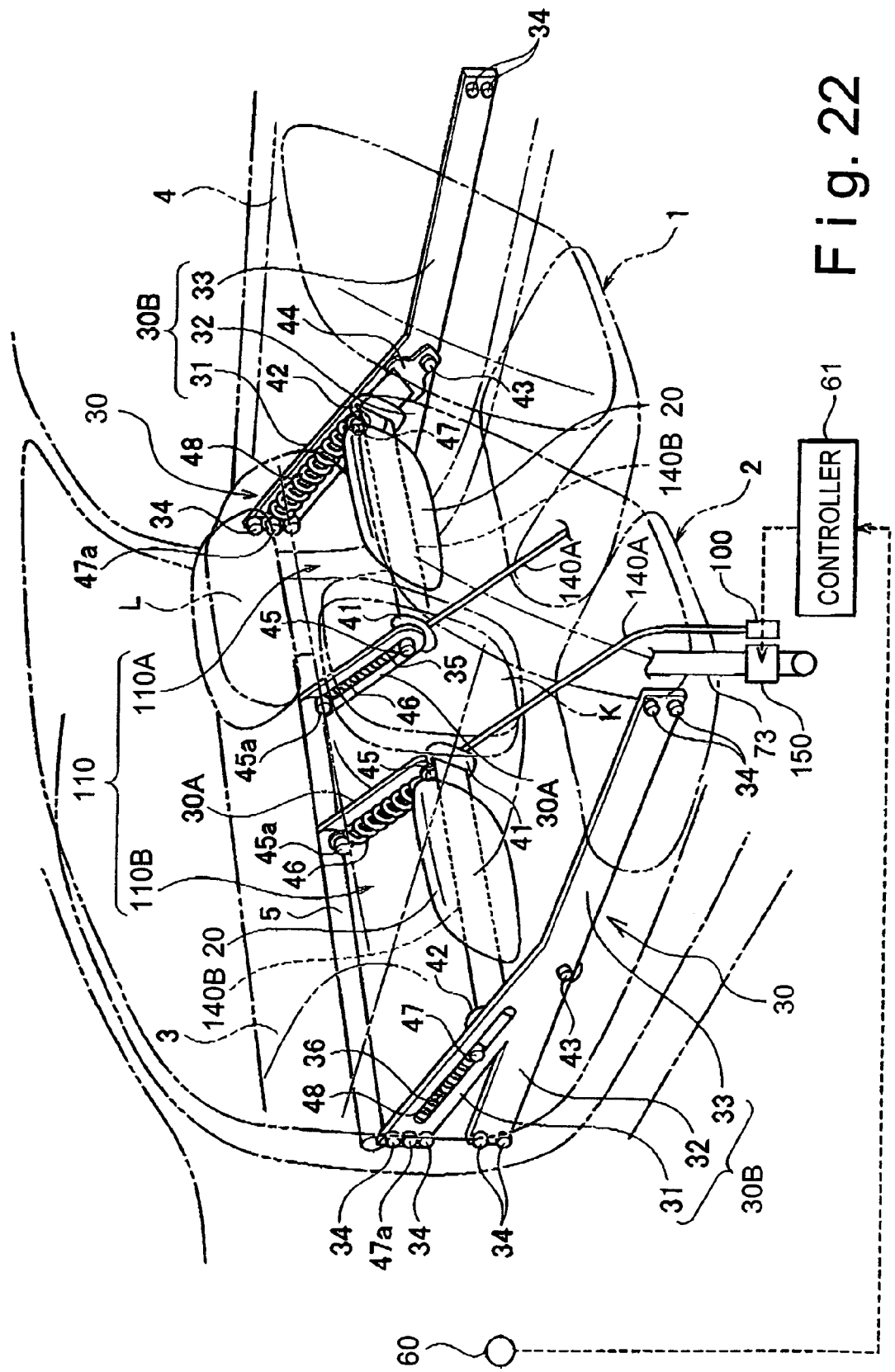
FIG. 22 is a rear perspective view of a vehicle passenger restraining system installed in a vehicle in accordance with a second embodiment of the present invention.

FIG. 22 is a rear perspective view of the vehicle passenger restraining system installed in the vehicle M in accordance with the second embodiment of the present invention. FIG. 23 is a pair of diagrams (a) and (b) illustrating schematic side elevational views of the vehicle passenger restraining system in a normal state (the diagram (a)) and in an operated state (the diagram (b)) in accordance with the second embodiment of the present invention.

As shown in FIG. 22, a passenger knee restraining device 110 in accordance with the second embodiment includes a driver's seat knee restraining device 110A and a passenger seat knee restraining device 110B. Similarly to the first embodiment explained above, the driver's seat knee restraining device 110A and the passenger seat knee restraining device 110B are substantially symmetrical (mirror images) to each other with respect to the widthwise (transverse) middle of the vehicle cabin (passenger compartment).

In the second embodiment of the present invention, the anchor portion 73 of the seat belt member 70 of each of the driver's seat knee restraining device 110A and the passenger seat knee restraining device 110B is folded downward at the shoulder anchor 14 and a tip end of the anchor portion 73 is wound onto respective one of the retractors 150 of the driver's seat knee restraining device 110A and the passenger seat knee restraining device 110B as shown in the diagrams (a) and (b) of FIG. 22 (only the driver's seat knee restraining device 110A is shown in the diagrams (a) and (b) of FIG. 23). Each of the retractors 150 of the driver's seat knee restraining device 110A and the passenger seat knee restraining device 110B is preferably mounted on a lower portion of a center pillar (not shown) of the vehicle body disposed in the rearward of the guide member 30 on respective transverse side (right or left) of the vehicle M.

Each of the retractors 150 is configured and arranged to wind in (retract) the anchor portion 73 of respective one of the seat belt member 70 to increase a restraining force exerted on the passenger when a collision or other emergency situation occurs. As shown in FIG. 22, each of the retractors 150 includes a pulley 100 that is operatively coupled to the wire member 140A of respective one of the driver's seat knee restraining device 110A and the passenger seat knee restraining device 110B (only the retractor 150 of the passenger seat knee restraining device 110B is shown in FIG. 22). Each of the retractors 150 is configured and arranged to rotate the pulley 100 and wind in the respective one of the wire member 140A in synchronization with an emergency wind-in of the respective one of the seat belt member 70 during a collision or the like.

Thus, with the vehicle passenger restraining system in accordance with the second embodiment, when the vehicle M undergoes a front collision, the knee bolster 20 arranged in front of the knees Cn of the passenger C is pulled toward the rear of the vehicle M in synchronization with an emergency wind-in of the seat belt member 70 such that the forward movement of the passenger's knees Cn is suppressed by the knee bolster 20. As in the first embodiment, the guide member 30, the wire member 140A and the belt member 140B and the retractor 150 preferably constitute the bolster movement structure of the present invention.

As mentioned above, in the second embodiment, the wire member 140A and the belt member 140B constitutes a pulling member of the present invention that is operatively coupled to the knee bolster 20 and the guide member 30, and extend generally in the rearward direction of the vehicle M from the knee bolster 20 toward both transverse sides of the lower limbs area where the lower limbs Cl of the passenger C will be disposed when the passenger C is sitting in the driver's seat 1 or the passenger seat 2. The belt member 140B is preferably slideably coupled to the knee bolster 20 (i.e., the belt member 140B passes through the knee bolster 20) in the same manner as the webbing member 40 passes through the knee bolster 20 in the first embodiment of the present invention.

In the second embodiment, one end of the belt member 140B that is located farther inward in the transverse direction of the vehicle M with respect to the knee bolster 20 is fixedly coupled to the inside sliding anchor 41 that is mounted to the inside guide section 30A. Similarly to the first embodiment, the inside sliding anchor 41 is coupled to the inside guide section 30A in a freely slideable manner with respect to the inside guide section 30A.

On the other hand, the other end of the belt member 140B that is located closer to the outside of the vehicle M in the transverse direction is passed through an outside sliding anchor 42 that is slideably coupled to the main guide portion 31 of the outside guide section 30B. Similarly to the first embodiment, the outside sliding anchor 42 is coupled to the main guide portion 31 of the outside guide section 30B in a freely slideable manner with respect to the main guide portion 31.

After passing through the outside sliding anchor 42, the other end of the belt member 140B is directed rearward and connected to the stationary anchor 44 that is fixedly coupled to the base portion of the main guide portion 31 with the bolt 43. The arrangements between the belt member 140B and the outside guide section 30B in the second embodiment are substantially identical to the arrangements between the webbing member 40 and the outside guide section 30B in the first embodiment as explained above.

In the second embodiment of the present invention, a forward end portion of the wire member 140A that constitutes a part of the pulling member is fixedly coupled to the inside sliding anchor 41. Thus, the wire member 140A is configured and arranged to pull the inside sliding anchor 41 when the retractor 150 is operated, thereby causing the knee bolster 20 to move rearward to suppress the forward movement of the passenger's knees Cn.

Although, the second embodiment, the wire member 140A and the belt member 140B together constitute the pulling member of the present invention, it is also acceptable to use a single belt or elongated pliable member (without using a wire) or separate belt members or elongated pliable members as the pulling member instead of the wire member 140A and the belt member 140B.

Figure 24A:
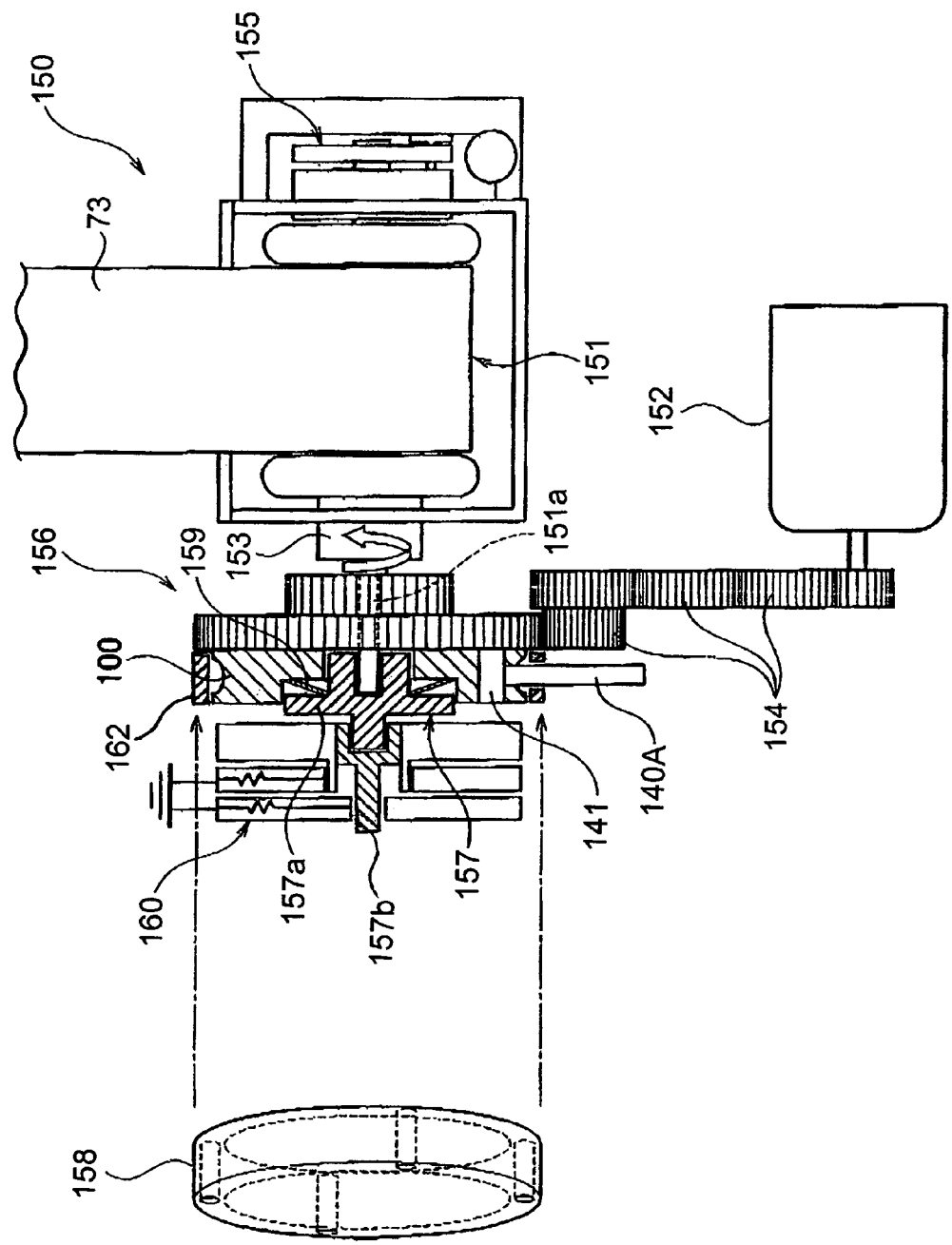
FIG. 24(A) is an enlarged partial cross sectional view of a retracting device used in the vehicle passenger restraining system in accordance with the second embodiment of the present invention.
Figure 25:
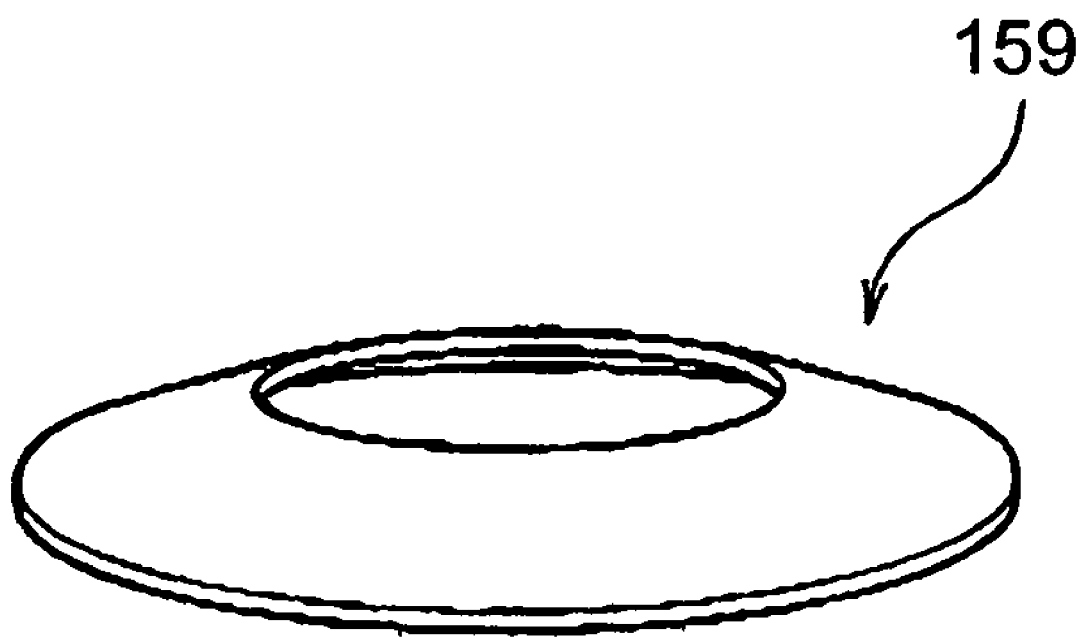
FIG. 25 is a perspective view of a belleville spring used in a clutch of the retracting device of the vehicle passenger restraining system in accordance with the second embodiment of the present invention.
Figure 26:
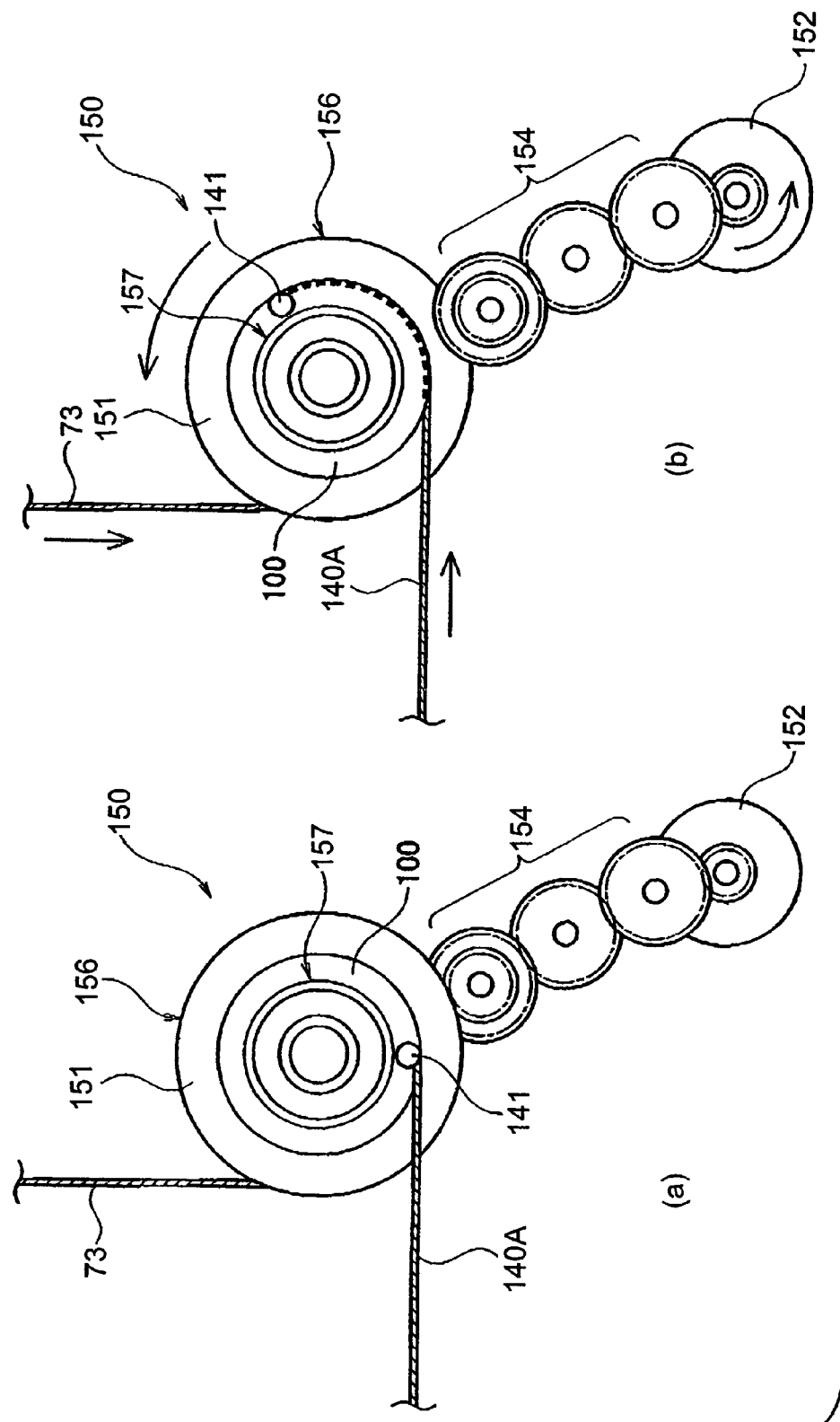
FIG. 26 is a pair of diagrams (a) and (b) illustrating schematic side views of the retracting device in a default state (the diagram (a)) of a drive mechanism of the retracting device and in a wound-in state (the diagram (b)) of the drive mechanism of the retracting device in accordance with the second embodiment of the present invention.

Referring now to FIGS. 24 to 26, the retractor 150 of the vehicle passenger restraining system in accordance with the second embodiment will be explained in detail. FIG. 24(A) is an enlarged partial cross sectional view of the retractor 150 used in the vehicle passenger restraining system in accordance with the second embodiment of the present invention.

As shown in FIG. 24(A), the retractor 150 is provided with an electric motor 152 configured to start and execute a preparatory wind-in of the seat belt member 70 and the wire member 140A at a stage when a collision is predicted.

More specifically, the retractor 150 comprises a seat belt winding section or seat belt webbing winding unit 151, an ELR (emergency locking retractor) unit 155 configured to lock the webbing winding unit 151 during a collision or emergency (sudden) braking, a seat belt length memory unit 160 configured to store an amount of seat belt member 70 drawn out by the passenger, a wind-in drive unit 156 configured to transfer the rotational torque of the electric motor to a winding shaft 151a of the webbing winding unit 151 through a gear cluster 154. The retractor 150 is also provided with an explosive-based gas generating device 153.

In the second embodiment, the retractor 150 also includes the pulley 100 that winds in the wire member 140A. The pulley 100 is attached to the winding shaft 151a of the webbing winding unit 151. The pulley 100 constitutes a knee bolster winding section of the present invention.

As seen in FIG. 24(A), the winding shaft 151a of the retractor 150 protrudes from the webbing winding unit 151, and the wind-in drive unit 156 and the seat belt length memory unit 160 are arranged on the protruding winding shaft 151a in order as listed. The pulley 100 is arranged between the wind-in drive unit 156 and the seat belt length memory unit 160 to be concentric with the winding shaft 151a.

The retractor 150 further includes a clutch 157 to regulate the amount of torque transmitted between the pulley 100 and the winding shaft 151a. The clutch 157 is arranged between the pulley 100 and the winding shaft 151a. Thus, if the torque of the electric motor 152 is too high relative to the resistance from the wire member 140A, then the clutch 157 will begin to slip, i.e., the pulley 100 will rotate relative to the winding shaft 151a. Preferably, the torque transmitting amount is adjustable in the clutch 157 as explained below.

In the second embodiment of the present invention, the clutch 157 preferably has a belleville spring 159 (torque adjusting spring) that is arranged between the pulley 100 and a flange member 157a fitted onto a tip portion of the winding shaft 151a as shown in FIG. 24(A). The flange member 157a is further coupled to an abutment member 157b. FIG. 25 is a perspective view of the belleville spring 159 used in the clutch 157 of the retractor 150 in accordance with the second embodiment of the present invention. The belleville spring 159 is arranged such that the amount of torque transmitted can be adjusted in accordance with the amount by which a cover member 158, which abuts against the abutment member 157b to push the flange member 157a, is tightened to a base member 162. The cover member 158 covers the outside of the pulley 100 and the flange member 157a. More specifically, as seen in FIG. 24(B), the cover member 158 preferably includes a plurality of screws 158a and a plurality of resilient members 158b coupled to the screws 158a. As the screws 158a are tightened into the based member 162, a distance L between the cover member 158 and the base member 162 is adjusted while the resilient members 158b being flexibly disposed therebetween. When the distance L between the cover member 158 and the base member 162 decreases, the belleville spring 159 is deformed to increase the torque required to cause the clutch 157 to slip. Thus, the torque transmitted from the winding shaft 151a to the pulley 100 can be adjusted by changing the distance L between the cover member 158 and the base member 162. Instead of the resilient members 158b shown in FIG. 24(B), a plurality of springs can be coupled to the screws 158a of the cover member 158 so that the springs are flexibly disposed between the cover member 158 and the base member 162 while the distance L is adjusted.

FIG. 26 is a pair of diagrams (a) and (b) illustrating schematic side views of the retractor 150 in a default state (the diagram (a)) of a drive mechanism of the retractor 150 and in a wound-in state (the diagram (b)) of the drive mechanism of the retractor 150 in accordance with the second embodiment of the present invention. As shown in the diagram (a) of FIG. 26, a rearward end of the wire member 140A is connected to the lower edge of an external circumferential groove formed in the pulley 100 by a pin 141. When the retractor 150 executes an emergency wind-in, the electric motor 152 operates and rotates the pulley 100 as shown in the diagram (b) of FIG. 26. As a result, the wire member 140A is wound onto the pulley 100.

When the wire member 140A is wound onto the pulley 100, a tensile force develops in the wire member 140A and, as shown in FIG. 22, the inside sliding anchor 41 to which the forward end of the wire member 140A is connected is pulled rearward against the tensile force of the compression spring 46. As the inside sliding anchor 41 moves rearward, a transversely inner end portion of the belt member 140B that is fastened to the inside sliding anchor 41 is also pulled rearward.

On the other hand, since the rearward end of the transversely outer end portion of the belt member 140B is connected to the stationary anchor 44, when the belt member 140B is pulled, the outside sliding anchor 42 is moved rearward against the force of the compression spring 48. As a result, the inside sliding anchor 41 and the outside sliding anchor 42 move simultaneously in a diagonally rearward and downward direction along directions in which the inside guide section 30A and the outside guide section 30B are arranged, respectively. Thus, the knee bolster 20 coupled to the belt member 140B and positioned between the inside sliding anchor 41 and the outside sliding anchor 42 moves reward toward the passenger's knees Cn.

Since the knee bolster 20 can slide freely with respect to the belt member 140B and is supported to the internal framework of the instrument section 3 through the link members 21, the knee bolster 20 moves rearward toward the passenger's knees Cn in a proper manner without being pulled off course by the movement of the belt member 140B.

As mentioned above, the wind-in drive unit 156 of the retractor 150 is also provided with the explosive-based gas generating device 153 configured and arranged to operate and execute a main wind-in of the anchor portion 73 of the seat belt member 70 and the wire member 140A at a stage when a collision is detected.

The explosive-based gas generating device 153 is provided with an igniter (not shown) that is configured to ignite the explosive when the vehicle M undergoes a front collision. When the igniter ignites the explosive, the explosive-based gas generating device 153 explodes and generates a gas pressure that operates the retractor 150 in a substantially instantaneous manner.

Thus, when the explosive-based gas generating device 153 operates, the pulley 100 winds in the wire member 140A substantially instantaneously and thereby moves the knee bolster 20 rapidly rearward such that the knee bolster 20 presses against the passenger's knees Cn.

The retractor 150 is configured and arranged such that when the electric motor 152 and the explosive-based gas generating device 153 wind in the anchor portion 73, a torque limiter works to prevent excessive tightening of the anchor portion 73 (i.e., the seat belt member 70). On the other hand, the clutch 157 provides a torque limiting function that prevents the pulley 100 from pulling the knee bolster 20 too tightly against the passenger's knees Cn.

FIG. 22 illustrates the driver's seat knee restraining device 110A and the passenger seat knee restraining device 110B in a state in which the knee bolsters 20 have been moved rearward and the compression springs 46 and 48 of the inside guide sections 30A and the outside guide sections 30B are stretched.

In the vehicle passenger restraining system in accordance with the second embodiment, the operation of the retractor 150 is controlled by the controller 61 based on the detection signal from the collision detection sensor 60, as shown in FIG. 22.

Figure 27:
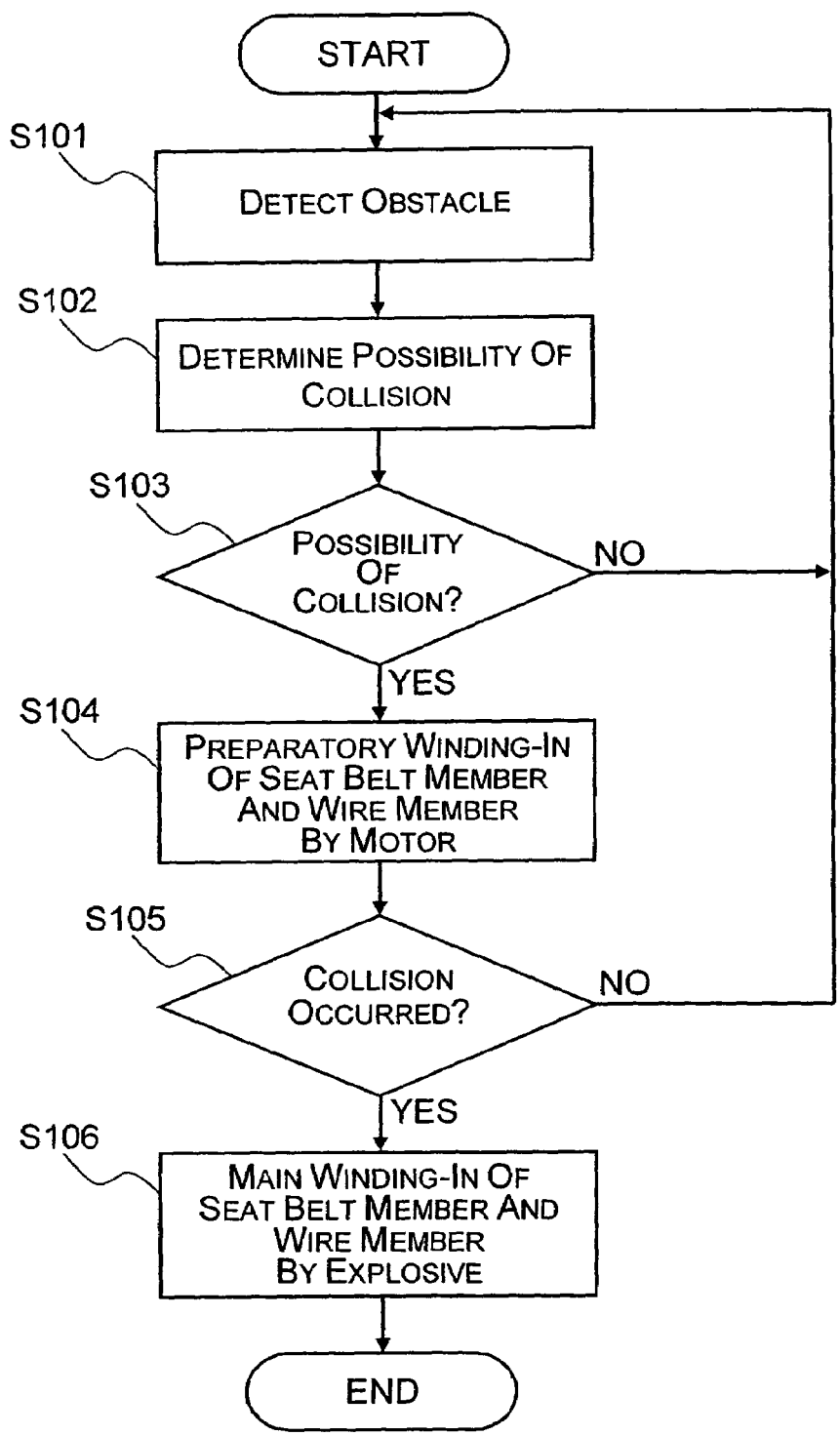
FIG. 27 is a flowchart describing control steps executed in the controller of the vehicle passenger restraining system for controlling operation of the retracting device in accordance with the second embodiment of the present invention.
Figure 28:
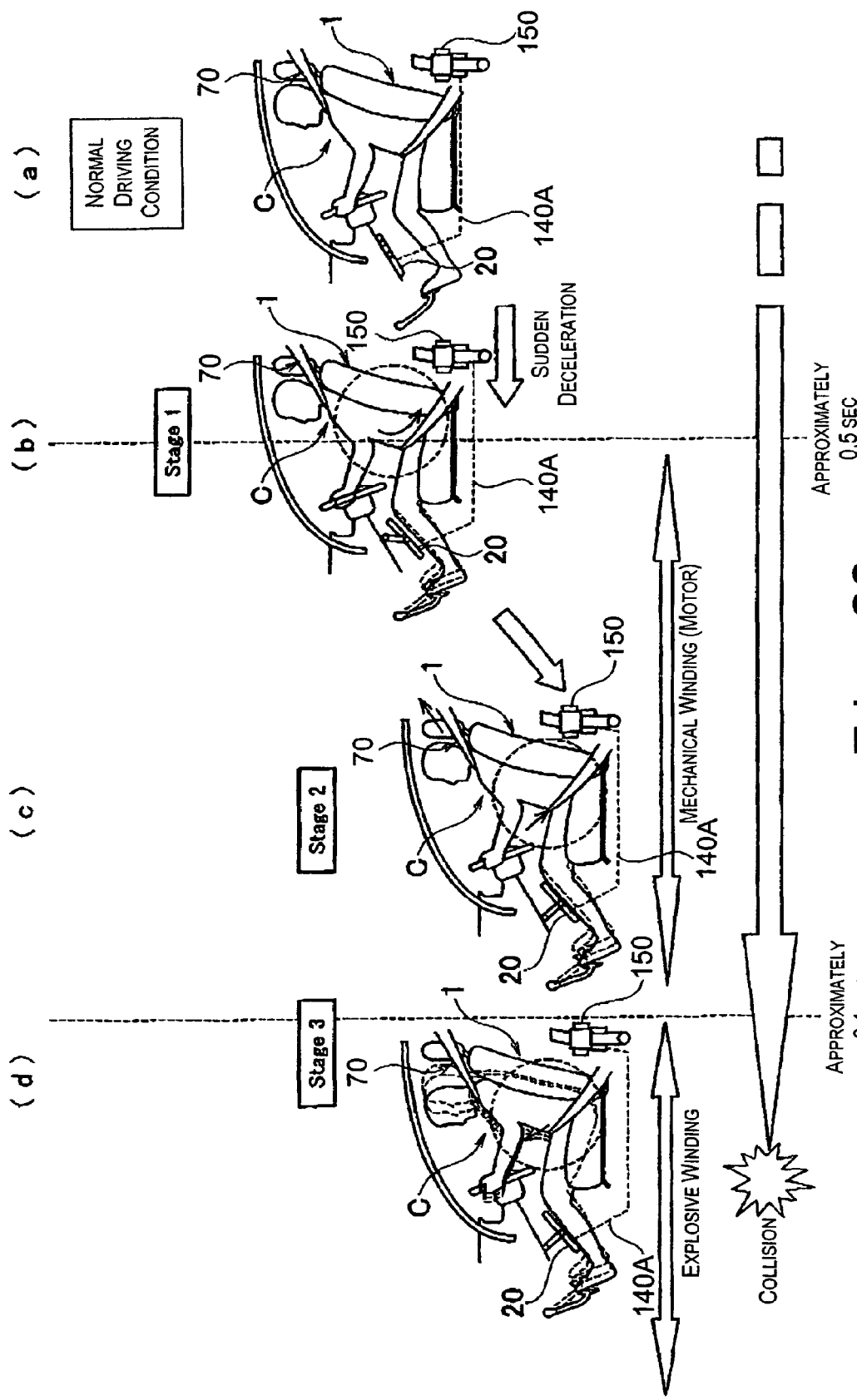
FIG. 28 is a series of diagrams (a) to (d) illustrating operation of the vehicle passenger restraining system in sequence from a normal driving state (the diagram (a)) to a final restraining state (the diagram (d)) in accordance with the second embodiment of the present invention.
Figure 29:
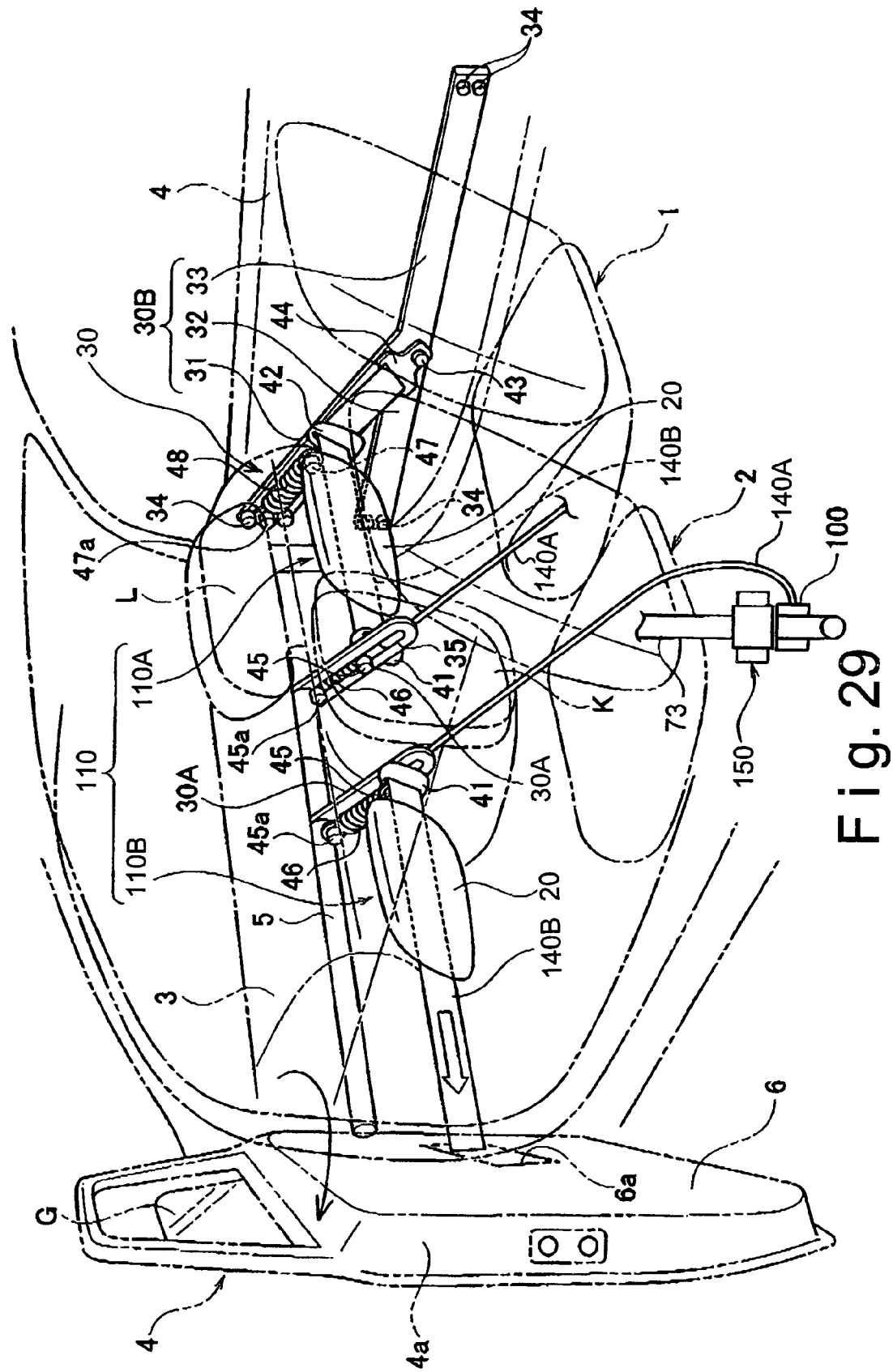
FIG. 29 is a rear perspective view of the vehicle passenger restraining system illustrating a state in which the front door is open in accordance with the second embodiment of the present invention.

FIG. 27 is a flowchart describing control steps executed in the controller 61 of the vehicle passenger restraining system for controlling operation of the retractor 150 in accordance with the second embodiment of the present invention. FIG. 28 is a series of diagrams (a) to (d) illustrating operation of the vehicle passenger restraining system in sequence from a normal driving state (the diagram (a)) to a final restraining state (the diagram (d)) in accordance with the second embodiment of the present invention. The control steps executed by the controller 61 will now be explained with reference to the control flowchart of FIG. 27 and the behavior of the knee bolsters 20 will be explained with reference to the diagrams (a) to (d) of FIG. 28.

In step S101 of the flowchart of FIG. 28, the controller 61 is configured to receive a detection signal from the detection sensor 60 while the driving conditions are normal and the knee bolster 20 is positioned in a rest position as shown in the diagram (a) of FIG. 28. In step S102, the controller 61 uses the information contained in the detection signal from the detection sensor 60 to determine if there is an obstacle in front of the vehicle M. Also, the controller 61 is configured to calculate a relative distance and a relative speed of the vehicle M with respect to the obstacle.

In step S103, the controller 61 is configured to determine (predict) if there is a possibility that the vehicle M will undergo a front collision based on the information obtained in step S102. If the controller 61 determines there is no possibility that the vehicle M will undergo a front collision (NO in step S103), the controller 61 is configured to return to step S101. If the controller 61 determines there is a possibility that the vehicle M will undergo a front collision (YES in step S103), the controller 61 proceeds to step S104 where the controller 61 is configured to drive the electric motors 152 of the retractors 150 to pretension or preload the anchor portions 73 and the wire members 140.

The diagram (b) of FIG. 28 illustrates a state of the seat belt members 70 and the knee bolsters 20 during step S104 (only the driver's seat side is shown in the diagram (b) of FIG. 28). As shown in the diagram (b) of FIG. 28, the anchor portion 73 is partially wound in by the retractor 150 such that restraining force exerted against the passenger C is increased and the wire member 140A is partially wound in by the pulley 100 such that the knee bolster 20 is pulled rearward (preparatory wind-in). The diagram (c) of FIG. 28 illustrates the state of the seat belt members 70 and the knee bolsters 20 after step S104 (only the driver's seat side is shown in the diagram (b) of FIG. 28). As shown in the diagram (c) of FIG. 28, when the preparatory winding-in by the electric motor 152 is performed, the knee bolster 20 is position in an extended position. More specifically, the knee bolster 20 is disposed with respect to the passenger's knees Cn such that the knee bolster 20 just touches the passenger's knees Cn. However, the retractor 150 is configured and arranged to set the retracting force of the anchor portion 73 and the wire member 140A during and after the preparatory winding-in so that the knee bolster 20 does not hamper a movement of the passenger's knees Cn when the passenger wishes to operate a brake.

Next, in step S105, the controller 61 is configured to determine if a front collision has actually occurred based on the detection signal from the detection sensor 60. If the controller 61 determines that a collision did not occur (NO in step S105), the controller 61 is configured to return to step S101. If the controller 61 determines that a collision did occur (YES in step S105), the controller 61 proceeds to step S106 where the controller 61 is configured to issue an ignition signal to the igniter of the retractors 150, thereby operating the explosive-based gas generating devices 153. The diagram (d) of FIG. 28 illustrates a state of the knee bolsters 20 and the seat belt members 70 in step S106 (only the driver's seat side is shown in the diagram (c) of FIG. 28). As shown in the diagram (d) of FIG. 28, the retractor 150 executes a full fledged (main) winding in of the anchor portion 73 of the seat belt member 70 such that the passenger C is securely restrained. At the same time, a main wind-in of the wire member 140A is executed such that the passenger's knees Cn are securely restrained by the knee bolster 20. As a result, the thighs of the passenger C are prevented from sliding beneath the lap belt portion 72 of the seat belt member 70 and moving forward. In the example shown in FIG. 28, the preparatory winding-in of the anchor portion 73 and the webbing member 140A is performed between approximately 0.5 second and approximately 0.1 second prior to the actual collision occurs.

If an actual collision is ultimately avoided and the result of step S105 is NO, the electric motors 152 are rotated in reverse to loosen the anchor portions 73 and the wire members 140A and release the pull against the knee bolsters 20, thereby allowing the compression springs 46 and 48 to return the knee bolsters 20 to their original positions (rest positions).

In the second embodiment of the present invention, the electric motors 152 are operated and the wire members 140A are preloaded at a stage when the controller 61 predicts that a front collision might occur, and the explosive-based gas generating devices 153 are operated at a stage when an actual collision is detected. As a result, the characteristic curve of the load applied to the wire members 140A is similar to the characteristic curve shown in FIG. 18 of the first embodiment. More specifically, in the present invention, the amount of time over which a load is applied to the wire members 140A is long, as indicated by the characteristic curve α (solid line) shown in FIG. 18, and thus, the amount of time over which the knee bolsters 20 are pressed against the passenger's knees Cn is longer than in the case of a conventional passenger knee restraining device.

Furthermore, in the second embodiment of the present invention, the load limiter of the retractor 150 is adjusted such that the load applied to the wire member 140A is lower than in conventional passenger knee restraining devices.

With the features described heretofore, the vehicle passenger restraining system in accordance with the second embodiment of the present invention is configured to predict and detect a front collision and to move the knee bolsters 20 in a guided manner along inside and outside guide sections 30A and 30B by operating the retractors 150 and winding the wire members 140A onto the pulleys 100 of the retractors 150.

Since the retractors 150 are arranged rearward with respect to the inside guide sections 30A and the outside guide sections 30B of the guide members 30, when the pulleys 100 of the retractors 150 wind in the wire members 140A, the knee bolsters 20 can be made to undergo a larger amount of rearward movement and the passenger's knees Cn can be restrained at a more rearward position. Consequently, the passenger's knees Cn can be restrained at an earlier timing when a collision occurs.

Also, since the pulley 100 of the retractor 150 rotates in synchronization with the emergency wind-in of the seat belt member 70, the restraining of the passenger C by the seat belt member 70 and the restraining of the passenger's knees Cn by the knee bolster 20 can be executed in a synchronized manner for each of the driver's seat knee restraining device 110A and the passenger seat knee restraining device 110B. Therefore, the restraining effect of the knee bolsters 20 with respect to the passenger's knees Cn can be increased.

In the second embodiment of the present invention, each of the guide members 30 comprises the inside guide section 30A and the outside guide section 30B arranged as a pair spaced apart from each other in the transverse direction of the vehicle M such that the passenger's lower limbs Cl are disposed therebetween. The outside guide section 30B is provided on the door 4 of the vehicle M. Consequently, when the door 4 is opened, the outside guide section 30B moves to the outside of the vehicle cabin together with the portion of the belt member 140B arranged therein. As a result, in addition to the operational effects described above, the guide member 30 does not hinder a passenger C when he or she gets in and out of the vehicle M.

Since the wire member 140A and the belt member 140B are arranged to extend toward the rear of the vehicle M on both transverse sides of the passenger's lower limbs Cl, the passenger's lower limbs Cl are positioned between the wire member 140A and the belt member 140B regardless of the orientation of the passenger's lower limbs Cl. Thus, the knee bolster 20 can be guided reliably to the passenger's knees Cn, thereby increasing the restraining effect.

The inside guide section 30A and the outside guide section 30B are provided with the compression springs 46 and 48 serving as a biasing mechanism that spring load the knee bolster 20 toward the front of the vehicle M. Therefore, the knee bolster 20 is arranged in a forward position so that the knee bolster 20 does not disturb the passenger C during normal conditions in which the wire member 140A is not being pulled. Moreover, the knee bolster 20 has good return performance when the wire member 140A is released after having been pulled.

Moreover, in the first embodiment of the present invention, the vehicle passenger restraining system is configured to minimize the damage inflicted on the passenger C because the knee bolster 20 is made of a pad with the cushion member 22 that functions to soften the impact that occurs when the knee bolster 20 is moved rearward and makes contact with the passenger's knees Cn.

Since the pulling member used to pull the knee bolster 20 rearward is formed with the wire member 140A and the belt member 140B in the second embodiment, the layout of the pulling member can be simplified.

Since the pulley 100 of the retractor 150 that is used to wind in the wire member 140A is attached to the winding shafts 151a of the retractors 150, the pulley 100 can be arranged in a compact manner and the synchronization of the pulley 100 with the retraction of the seat belt member 70 can be accomplished more easily.

Since the clutch 157 configured to adjust the amount of torque transmitted is provided between the pulley 100 and the winding shaft 151a, mechanical damage resulting from excessive torque during emergency winding (particularly during the main wind-in executed by the explosive-based gas generating device 153) can be avoided and the exertion of an excessive retraining force against the passenger C can be prevented.

Since the clutch 157 comprises the belleville spring 159 that is arranged between the pulley 100 and the flange member 157a fitted onto a tip portion of the winding shaft 151a and configured such that the amount of torque transmitted can be adjusted in accordance with the amount by which the cover member 158 covering the outside of these components is tightened, the structure of the clutch 157 is simplified and the amount of torque transmitted can be adjusted simply and easily by adjusting the tightness of the cover member 158.

Since each of the retractors 150 is configured to execute a preparatory wind-in using the electric motor 152 that operates at a stage when a collision is predicted, the knee bolster 20 can be moved rearward by the preparatory wind-in such that the knee bolster 20 contacts or comes in close proximity to the passenger's knees Cn before the actual collision occurs. As a result, when the actual collision occurs, the passenger's knees Cn can be restrained very quickly.

Since the wind-in drive unit 156 of each of the retractors 150 is provided with the explosive-based gas generating device 153 configured to execute a main wind-in at a stage when a collision is detected, the wire member 140A and the anchor portion 73 of the seat belt member 70 can be wound in very quickly when the actual collision occurs and the passenger's knees Cn can be restrained at a more rearward position. As a result, the forward movement of the passenger C can be suppressed more efficiently.

Accordingly, with a vehicle passenger restraining system in accordance with the second embodiment of the present invention, when a front collision of the vehicle M occurs, the knee bolster 20 is pulled toward the rear of the vehicle M along the guide member 30 that is configured and arranged to guide the rearward movement of the knee bolster 20. The pulling of the knee bolster 20 is accomplished by winding in the pulling member (i.e., the wire member 140A and the belt member 140B) with the retractor 150 disposed rearward of the guide member 30. Consequently, the knee bolster 20 can be made to undergo a large amount of rearward movement and the passenger's knees Cn can be restrained at a more rearward position. As a result, the passenger's knees Cn can be restrained at an earlier timing when a collision occurs.

Additionally, since the pulley 100 rotates in synchronization with the emergency wind-in of the seat belt member 70 executed by the retractor 150, the restraining of the passenger C by the seat belt member 70 and the restraining of the passenger's knees Cn by the knee bolster 20 can be executed in a synchronized manner and the restraining effect of the knee bolster 20 with respect to the passenger's knees Cn can be increased.

Third Embodiment

Figure 30:
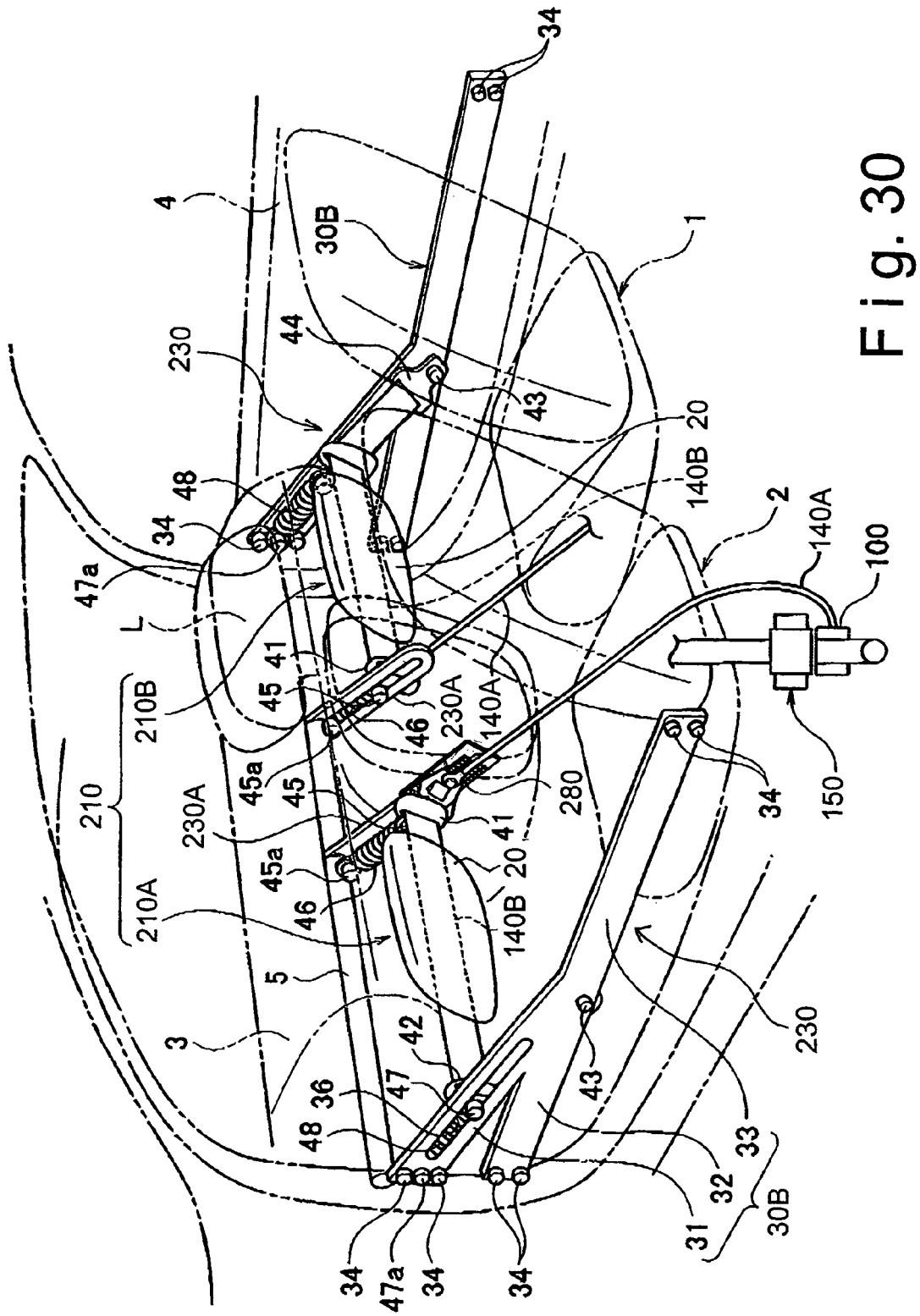
FIG. 30 is a rear perspective view of a vehicle passenger restraining system installed in a vehicle in accordance with a third embodiment of the present invention.
Figure 31:
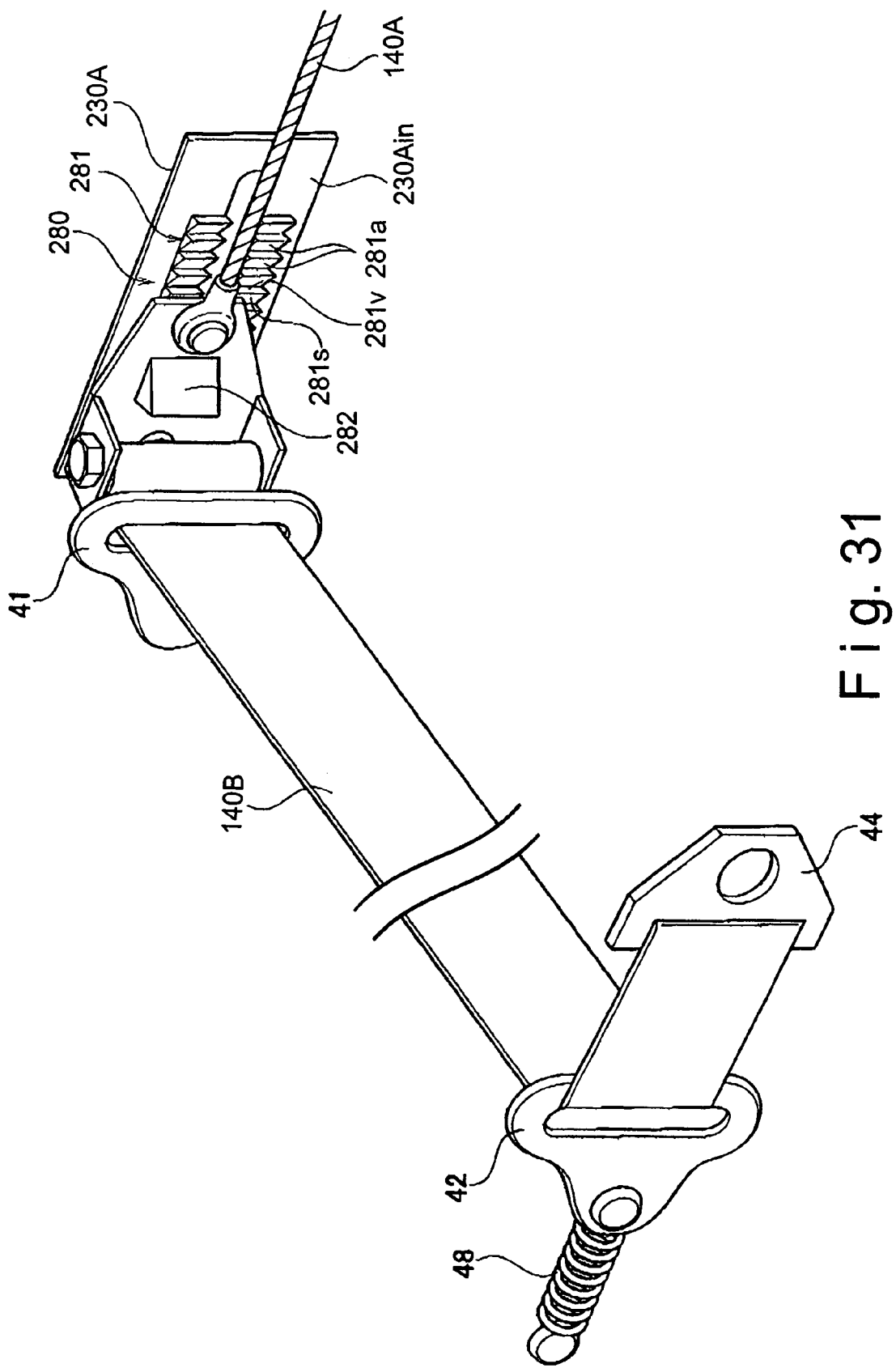
FIG. 31 is an enlarged perspective view illustrating a locking mechanism provided in a inside guide section of the vehicle passenger restraining system in accordance with the third embodiment of the present invention.

Referring now to FIGS. 30 and 31, a vehicle passenger restraining system in accordance with a third embodiment will now be explained. In view of the similarity between the second and third embodiments, the parts of the third embodiment that are identical to the parts of the second embodiment will be given the same reference numerals as the parts of the second embodiment. Moreover, the descriptions of the parts of the third embodiment that are identical to the parts of the second embodiment may be omitted for the sake of brevity.

The vehicle passenger restraining system of the third embodiment is basically identical to the vehicle passenger restraining system of the second embodiment except that each of guide members 230 is provided with a locking mechanism 280 configured and arranged to allow rearward movement of the knee bolster 20 while preventing forward movement of the knee bolster 20. More specifically, the guide members 230 are basically identical to the guide members 30 of the first and second embodiment except that a inside guide section 230A with the locking mechanism 280 is used in the third embodiment instead of the inside guide section 30A of the first and second embodiments.

FIG. 30 is a rear perspective view of a vehicle passenger restraining system installed in the vehicle M in accordance with the third embodiment of the present invention. FIG. 31 is an enlarged perspective view illustrating the locking mechanism 280 provided in the inside guide section 230A of the guide member 230 in accordance with the third embodiment of the present invention.

As shown in FIG. 30, other the constituent features of the vehicle passenger restraining system of the third embodiment are the same as those of the vehicle passenger restraining system of the second embodiment. More specifically, each of the guide members 230 comprises the inside guide section 230A and the outside guide section 30B. The transversely inside end of the belt member 140B passed through the knee bolster 20 is fastened to the inside sliding anchor 41 that is mounted to the inside guide section 230A such that the inside sliding anchor 41 can move freely back and forth with respect to the inside guide section 230A. On the other hand, the transversely outside end of the belt member 140B is passed through the outside sliding anchor 42 that is mounted to the main guide portion 31 of the outside guide section 30B such that the outside sliding anchor 42 can move freely back and forth. After passing through the outside sliding anchor 42, the transversely outside end of the belt member 140B is directed rearward and connected to the stationary anchor 44 that is fastened to a base portion of the main guide portion 31 with the bolt 43 as shown in FIG. 30.

In the third embodiment of the present invention, the locking mechanism 280 is provided with respect to the inside sliding anchor 41 coupled to the inside guide section 230A. More specifically, the locking mechanism 280 comprises a mechanical engaging section 281 (e.g., protrusions and depressions) and a locking piece 282. The mechanical engaging section 281 is formed on a sliding surface 230A in of the inside guide section 230A (i.e., the surface where the inside sliding anchor 41 slides with respect to the inside guide section 230A). The locking piece 282 is provided on the inside sliding anchor 41 and configured such that the locking piece 282 is pressed against the mechanical engaging section 281 such that the locking piece 282 can freely follow the contour of the mechanical engaging section 281 (i.e., such that the locking piece 282 can move in and out).

The mechanical engaging section 281 is provided with a plurality of protrusions 281a arranged as a continuous group. The rearward surface of each protrusion 281a is a perpendicular surface 281v that is perpendicular with respect to the sliding face surface 230A in and the forward surface of each protrusion 281a is a gently slanted surface 281s. Thus, the cross section of each protrusion 281a has the general shape of a saw tooth.

When the inside sliding anchor 41 is pulled and moved rearward by the wire member 140A, the locking piece 282 rides over the slanted surfaces 281s of the protrusions 281a and allows the inside sliding anchor 41 to move rearward. Conversely, when the passenger's knees Cn press against the knee bolster 20 and the inside sliding anchor 41 tries to move forward, the locking piece 282 catches on the perpendicular surface 281v of the protrusion 281a and prohibits forward movement of the inside sliding anchor 41.

Thus, with the vehicle passenger restraining system in accordance with the third embodiment, the inside sliding anchor 41 is provided with the locking mechanism 280 that prevents forward movement of the knee bolster 20 when the passenger's knees Cn impose a large load on the knee bolster 20 toward the front of the vehicle M after the knee bolster 20 has been moved rearward and pressed against the passenger's knees Cn due to a front collision. As a result, forward movement of the passenger's knees Cn can be restrained reliably when the vehicle M undergoes a front collision.

Fourth Embodiment

Figure 32:
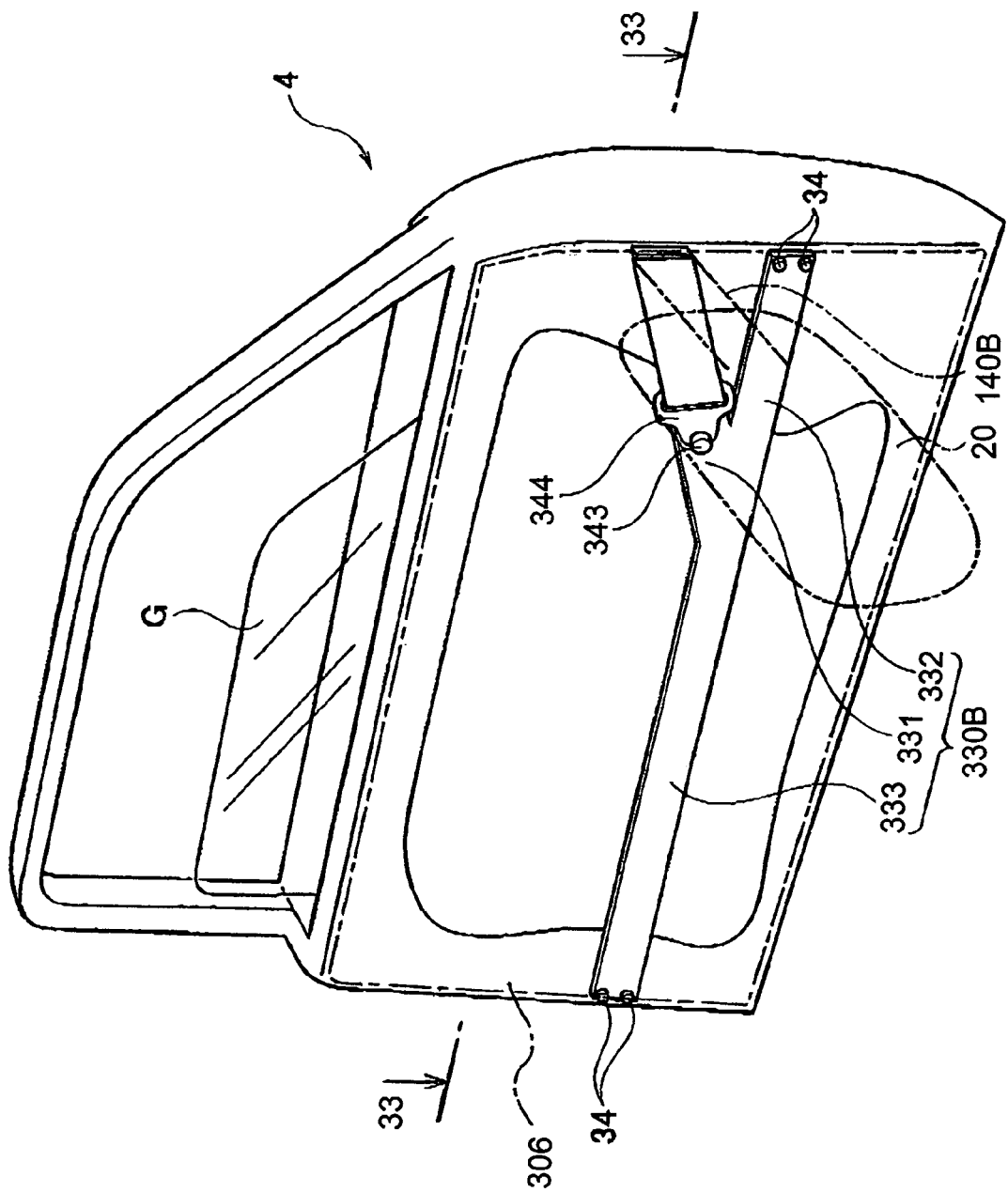
FIG. 32 is a perspective view of an outside guide section of a vehicle passenger restraining system coupled to a front door in accordance with a fourth embodiment of the present invention.
Figure 33:
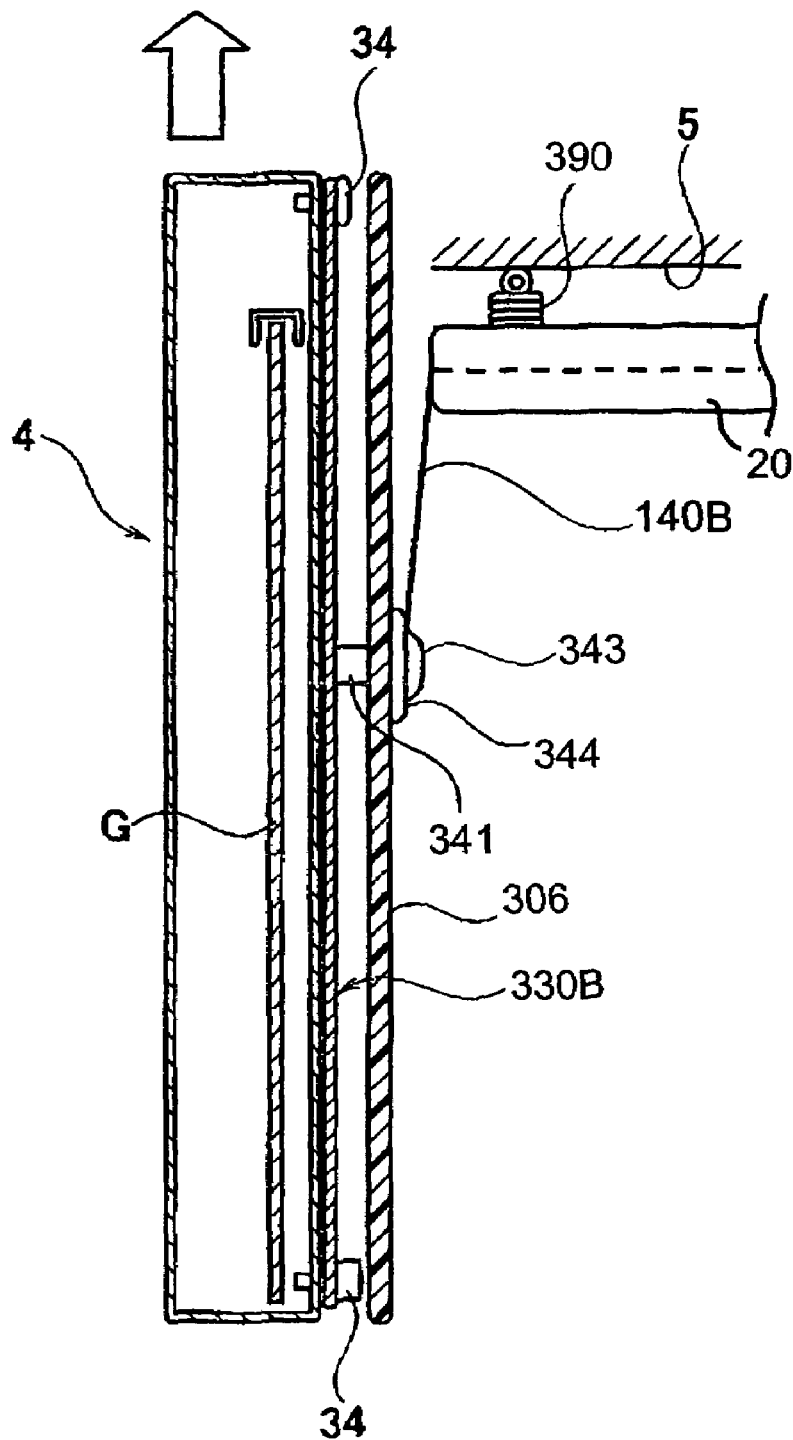
FIG. 33 is a cross sectional view of the outside guide section coupled to the front door taken along a section line 33-33 of FIG. 32 in accordance with the fourth embodiment of the present invention.
Figure 34:
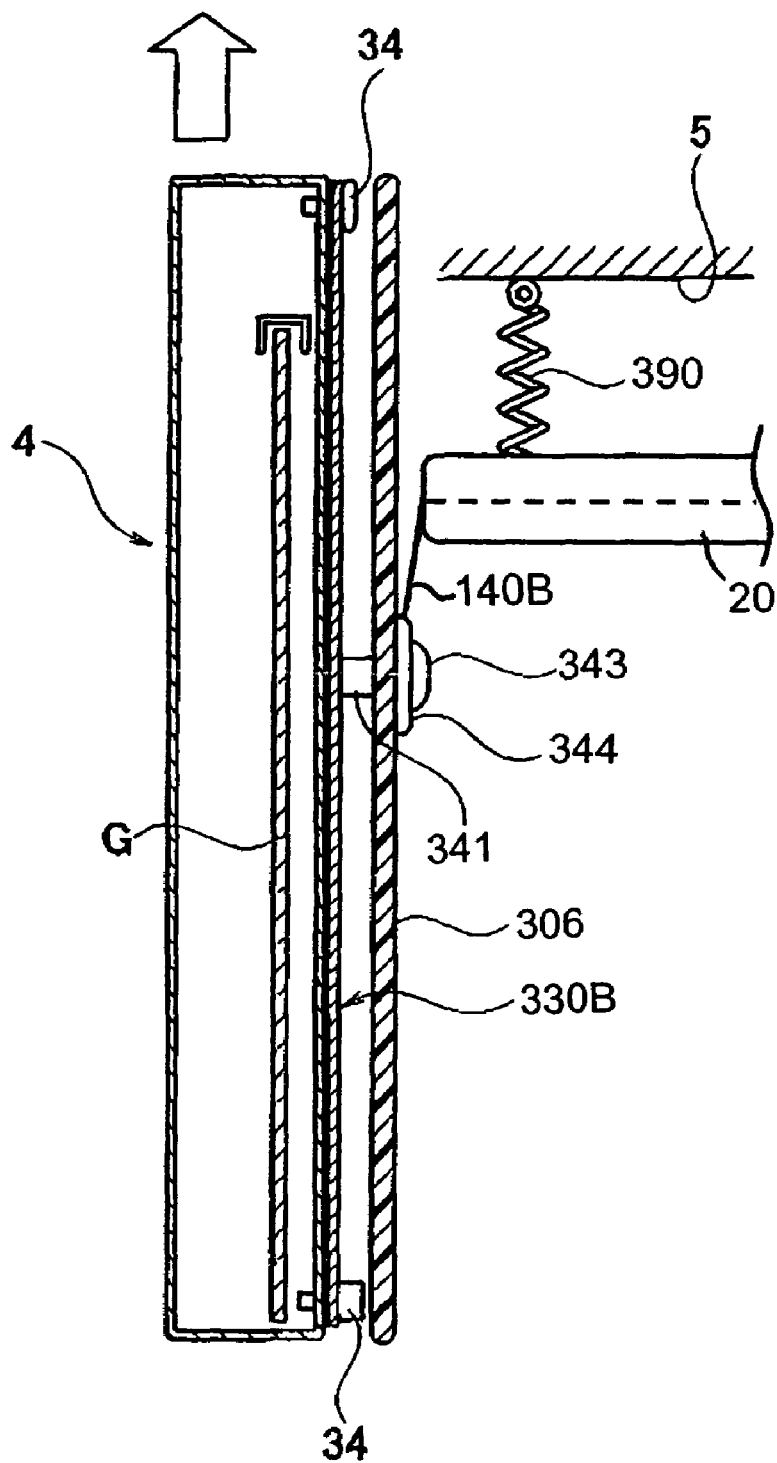
FIG. 34 is a cross sectional view of the outside guide section corresponding to FIG. 33 showing a state in which a knee bolster has been moved rearward in accordance with the fourth embodiment of the present invention.

Referring now to FIGS. 32 to 34, a vehicle passenger restraining system in accordance with a fourth embodiment will now be explained. In view of the similarity between the second and fourth embodiments, the parts of the fourth embodiment that are identical to the parts of the second embodiment will be given the same reference numerals as the parts of the second embodiment. Moreover, the descriptions of the parts of the fourth embodiment that are identical to the parts of the second embodiment may be omitted for the sake of brevity.

The vehicle passenger restraining system of the fourth embodiment is basically identical to the vehicle passenger restraining system of the second embodiment except that that transversely outside end of the belt member 140B is fixed to an outside guide section 330B of a guide member 330 such that the knee bolster 20 itself is spring loaded toward the front of the vehicle M without using the outside sliding anchor 42.

FIG. 32 is a perspective view showing the outside guide section 330B coupled to the front door 4 in accordance with the fourth embodiment of the present invention. FIG. 33 is a cross sectional view of the outside guide section 330B coupled to the front door 4 taken along a section line 33-33 of FIG. 32 in accordance with the fourth embodiment of the present invention. FIG. 34 is a cross sectional view of the outside guide section 330B corresponding to FIG. 33 showing a state in which the knee bolster 20 has been moved rearward in accordance with the fourth embodiment of the present invention.

As shown in FIG. 32, the other constituent features of the vehicle passenger restraining system in the fourth embodiment are the same as those of the vehicle passenger restraining system of the second embodiment. Each of the guide members 330 includes the outside guide section 330B with a main guide portion 331, a lower portion 332, and a rear end portion 333. The main guide portion 331, the lower portion 332 and the rear end portion 333 are each fastened at the respective ends thereof to the inner panel 4a of the front door 4 with the bolts 34 and covered with a trim 306 on the side thereof that faces into the vehicle cabin.

In the fourth embodiment of the present invention, each of the knee bolsters 20 is coupled to the belt member 140B, which is arranged to pass through the knee bolster 20 in a freely sliding manner.

More specifically, as shown in FIG. 33, in the fourth embodiment of the present invention, the knee bolster 20 is spring loaded frontward by at least one tensile spring 390 and the outside guide section 330B and the trim 306 are connected together with a connecting piece 341 at the position where the transversely outside end of the belt member 140B is fastened. A stationary anchor 344 is connected to the connecting piece 341 with a bolt 343 inserted through the trim 306 from the cabin interior and the transversely outside end of the belt member 140B is fastened to the stationary anchor 344.

When the wire member 140A moves the inside sliding anchor 41 (see FIG. 22) rearward in a front collision, the transversely inside end of the belt member 140B is also pulled rearward because it is connected to the inside sliding anchor 41. When this occurs, the belt member 140B is pulled transversely inward while moving relative to the knee bolster 20. Consequently, as shown in FIG. 34, the knee bolster 23 moves rearward while the tensile spring 390 elongates.

With the vehicle passenger restraining system in accordance with the fourth embodiment, it is not necessary to provide the opening 6a (see FIG. 4) for passing the belt member 140B through the trim 6 because the transversely outside end of the belt member 140B is fixed to the outside guide section 330B in such a fashion that the knee bolster 20 itself is spring loaded toward the front of the vehicle M by the tensile spring 390. Thus, the structure of the trim 306 can be simplified.

Fifth Embodiment

Referring now to FIGS. 35 to 38(B), a vehicle passenger restraining system in accordance with a fifth embodiment will now be explained. In view of the similarity between the second and fifth embodiments, the parts of the fifth embodiment that are identical to the parts of the second embodiment will be given the same reference numerals as the parts of the second embodiment. Moreover, the descriptions of the parts of the fifth embodiment that are identical to the parts of the second embodiment may be omitted for the sake of brevity.

The vehicle passenger restraining system of the fifth embodiment is basically identical to the vehicle passenger restraining system of the second embodiment except for the retractor 150 of the second embodiment is replaced with a retractor 450 of the fifth embodiment. More specifically, the retractor 450 of the fifth embodiment differs from the retractor 150 of the second embodiment in that a pulley 400 and a final gear 156a of a wind-in drive unit 456 are fitted onto a cylindrical member 401 that is fitted onto the outside of a winding shaft 451a and a clutch 410 is provided between the pulley 400 and the cylindrical member 401.

Figure 35:
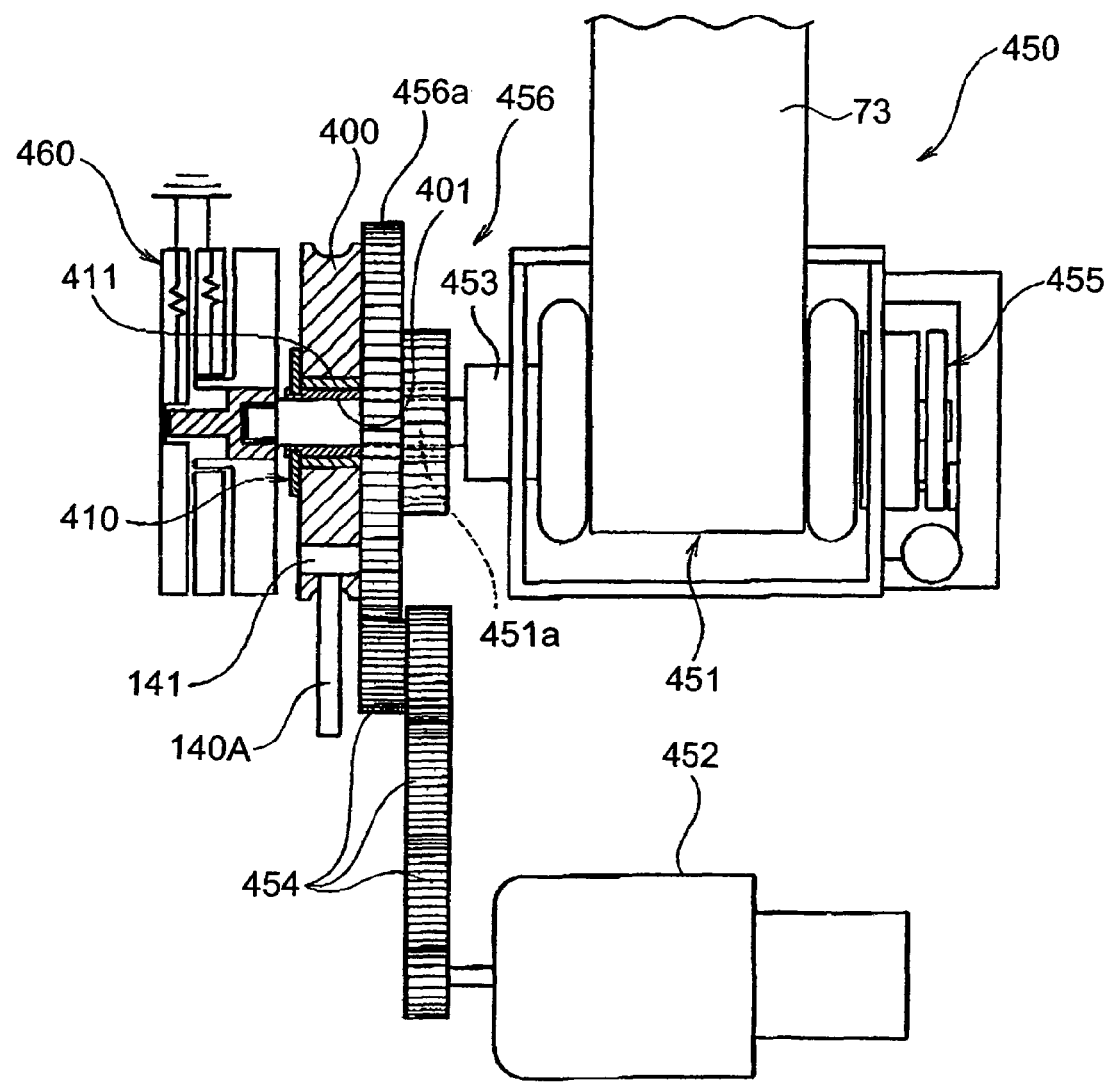
FIG. 35 is an enlarged partial cross sectional view of a retracting device of a vehicle passenger restraining system in accordance with a fifth embodiment of the present invention.
Figure 36:
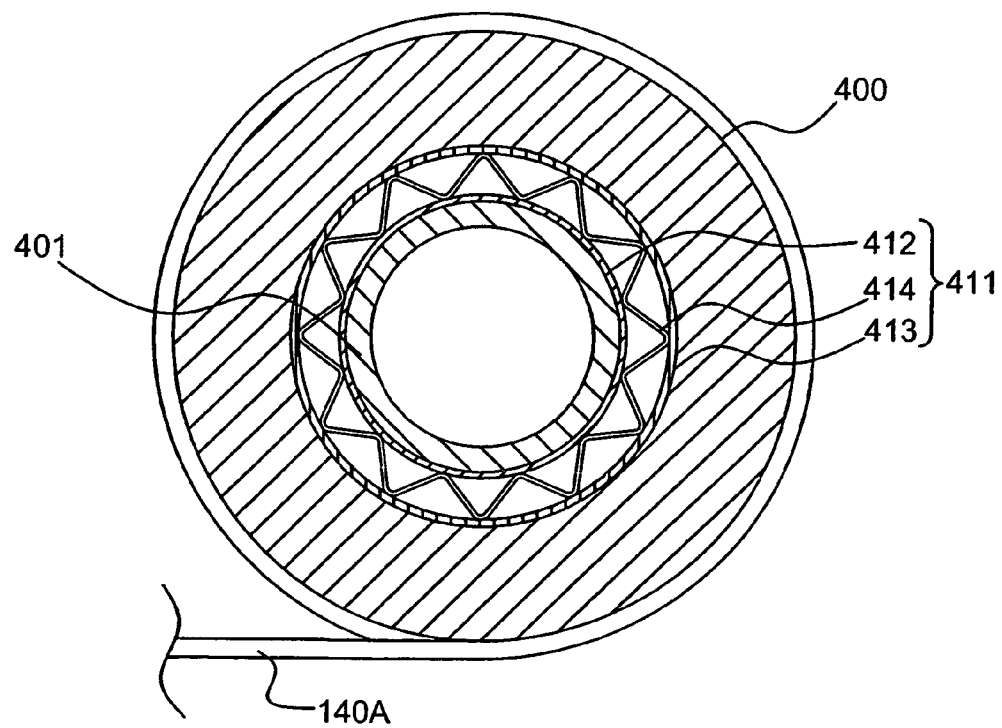
FIG. 36 is a schematic cross sectional view of a clutch of the retracting device in accordance with the fifth embodiment of the present invention.
Figure 37:
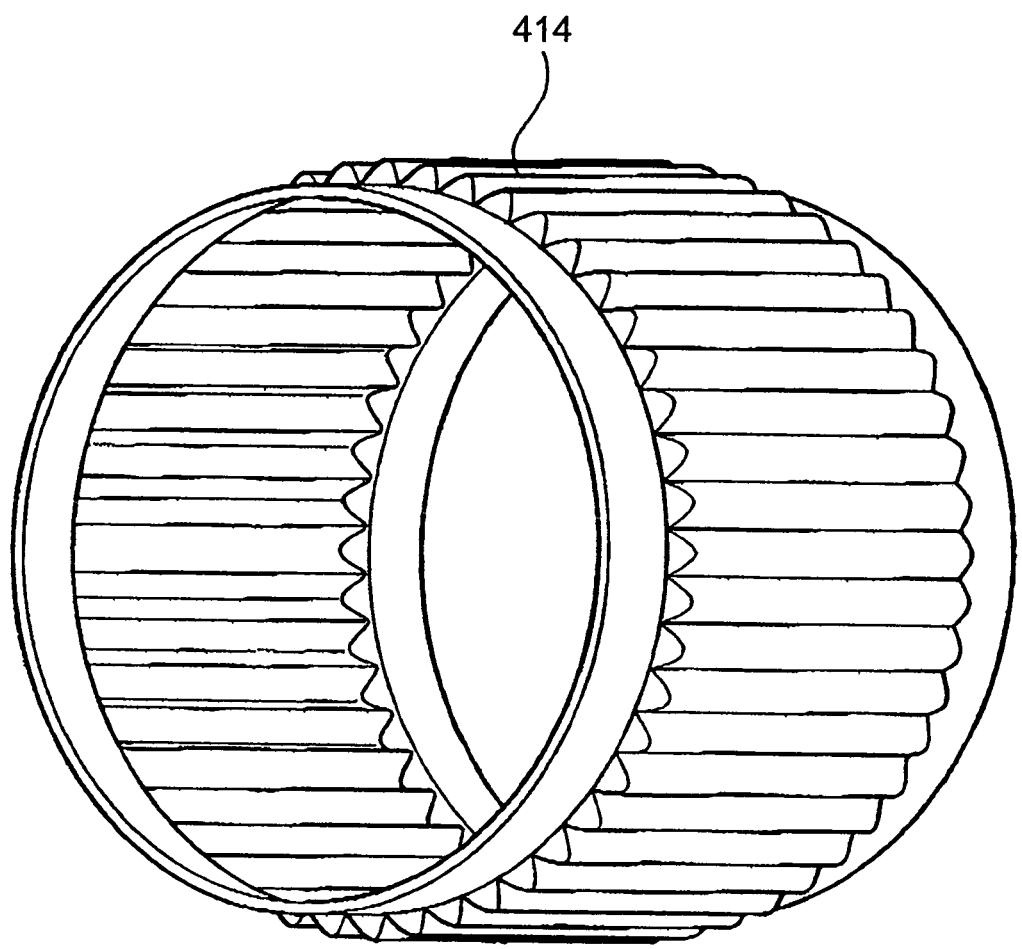
FIG. 37 is a perspective view of a component member of the clutch of the retracting device in accordance with the fifth embodiment of the present invention.

FIG. 35 is an enlarged partial cross sectional view of the retractor 450 in accordance with the fifth embodiment of the present invention. FIG. 36 is a schematic cross sectional view of the clutch 410 of the retractor 450. FIG. 37 is a perspective view of a circumferentially undulated spring 414 of the clutch 410 in accordance with the fifth embodiment of the present invention.

As shown in FIG. 35, the retractor 450 of the fifth embodiment is basically the same as the retractor 150 of the second embodiment in that the retractor 450 includes a webbing winding unit 451, an ELR unit 452, a seat belt length memory unit 460, and the wind-in drive unit 456. Also, the pulley 400 is arranged on the winding shaft 451a between the wind-in drive unit 456 and the seat belt length memory unit 460 in such a manner as to be concentric with the winding shaft 451a, the wind-in drive unit 456, and the seat belt length memory unit 460, and the clutch 410 is arranged between the pulley 400 and the winding shaft 451a.

In the retractor 450 of the fifth embodiment, the clutch 410 is disposed inside the internal circumference of the pulley 400 and comprises a torque limiting cylindrical body 411 provided with the circumferentially undulated spring 414 arranged between an inner cylinder 412 and an outer cylinder 413. The clutch 410 illustrated in FIGS. 36 and 37 functions as a fixed load limiter that is configured to limit the torque transmitted from the winding shaft 451a to the pulley 400 such that the torque transmission amount is held substantially constant.

Similarly to the second embodiment, the inclusion of the clutch 410 between the pulley 400 and the winding shaft 451a enables the retractor 450 of the fifth embodiment to prevent mechanical damage resulting from excessive torque during emergency winding (particularly during the main wind-in executed by an explosive-based gas generating device 453) and prevent the exertion of an excessive retraining force against the passenger C.

Additionally, since the torque limiting cylindrical body 411 that constitutes the clutch 410 comprises the torque 414 provided between the inner cylinder 412 and the outer cylinder 413 in such that the torque transmission amount is held substantially constant, excessive torque can be terminated and a substantially constant torque can be transferred. As a result, the knee bolster 20 can be controlled to restrain the passenger's knees Cn properly.

Figure 38A:
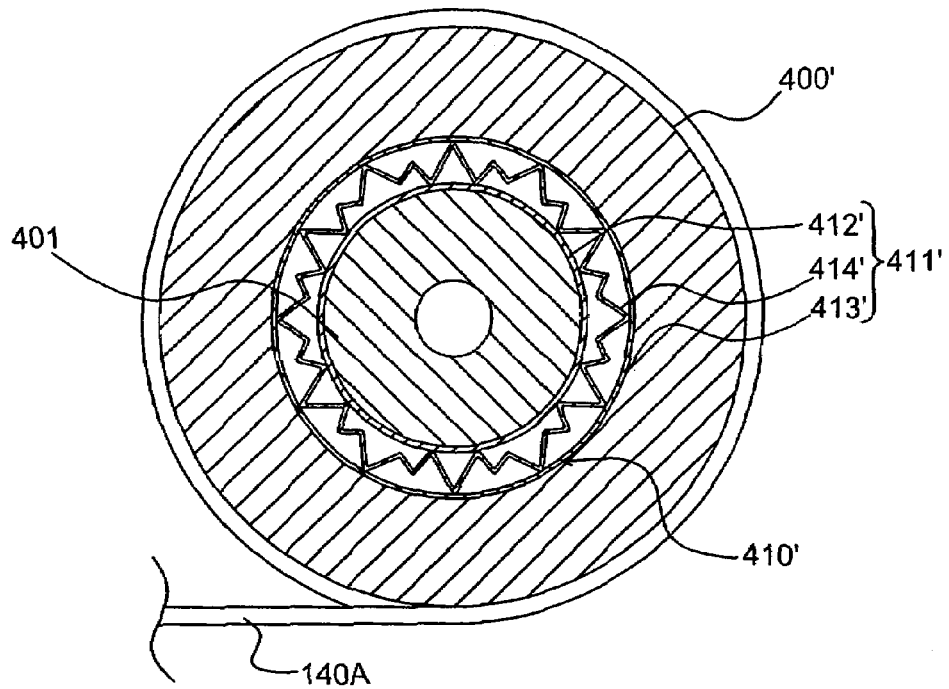
FIG. 38(A) is a schematic cross sectional view of an alternative clutch of the retracting device in accordance with the fifth embodiment of the present invention.
Figure 38B:
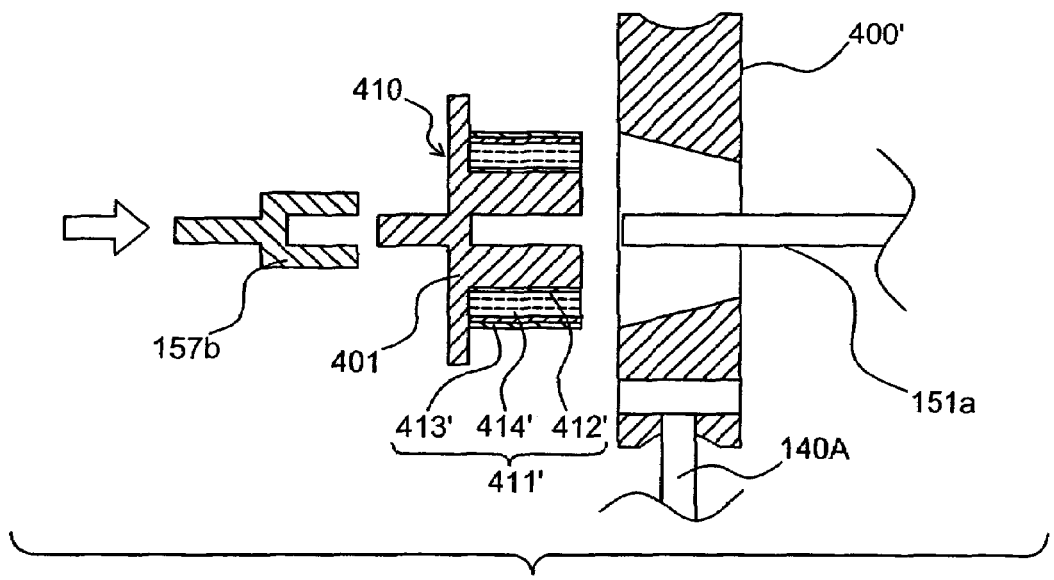
FIG. 38(B) is a schematic partial cross sectional view of the alternative clutch of the retracting device illustrating a state before the clutch is coupled to a pulley of the retracting device in accordance with the fifth embodiment of the present invention.

FIGS. 38(A) and 38(B) illustrate an alternative clutch 410' that can be used in place of the clutch 157 of FIG. 24(A). As seen in FIGS. 38(A) and 38(B), the clutch 410' comprises a torque limiting cylindrical body 411' provided with a circumferentially undulated torque adjusting spring 414' arranged between an inner cylinder 412' and an outer cylinder 413'. In this alternative structure, an inner peripheral surface of a pulley 400' is tapered as shown in FIG. 38(B). The torque adjusting spring 414' of the cylindrical body 411' is configured and arranged such that the torque transmitted between the winding shaft 451a and the pulley 400' is adjusted by changing an insertion amount (insertion torque) of the cylindrical body 411' into the inner peripheral surface of the pulley 400'. When the insertion amount of the cylindrical body 411' into the inner peripheral surface of the pulley 400' increases, the undulated torque adjusting spring 414' is elastically deformed to increase the torque required to cause the clutch 410' to slip. The axial adjustment of the cylindrical body 411' can be accomplished using the cover arrangement (the cover member 158 and the base member 162) shown in FIG. 24(B) as discussed above, when clutch 410' is installed on the winding shaft 151a in place of clutch 157.

Figure 39:
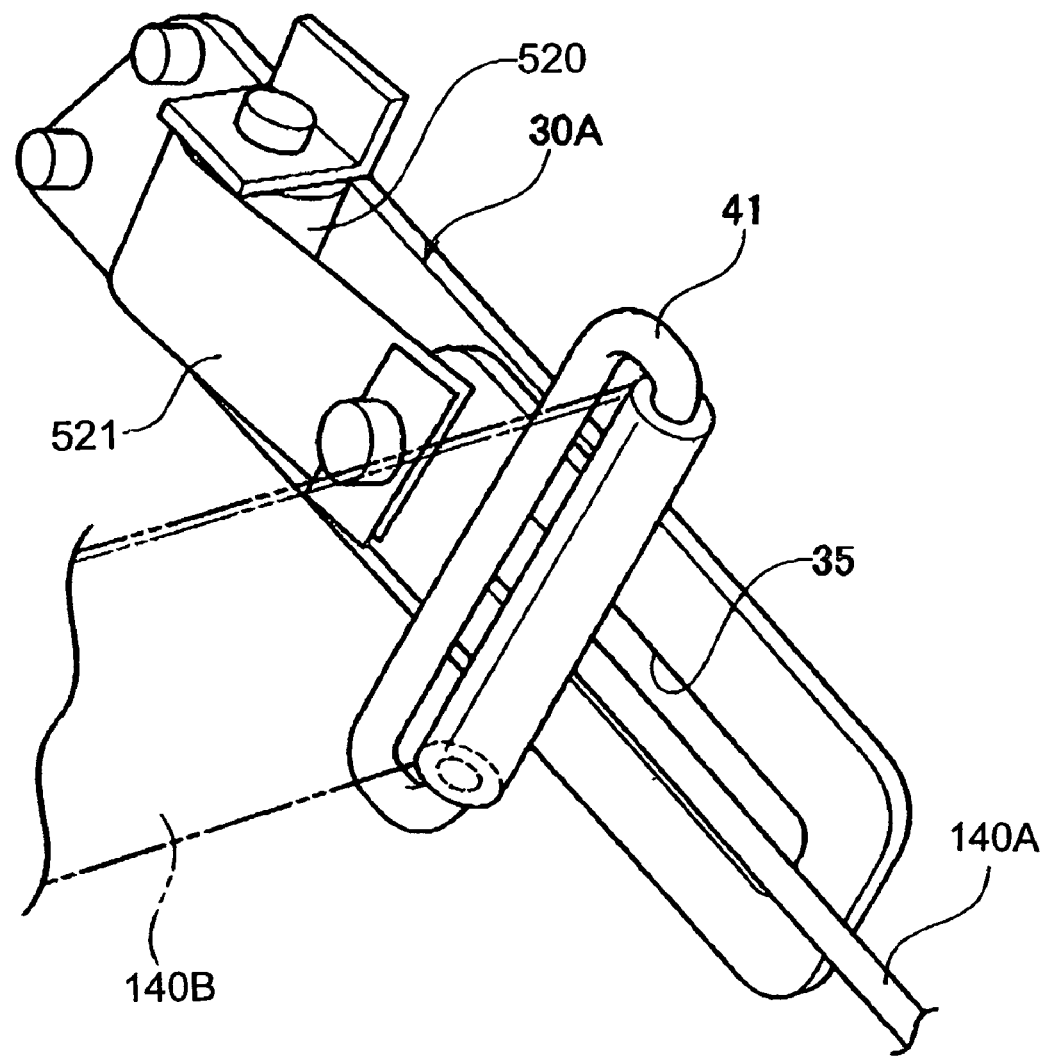
FIG. 39 is an enlarged perspective view of an alternative mounting structure between the pulling member and the inside guide member of the vehicle passenger restraining system in accordance with the present invention.

In the second, third and fifth embodiments, the vehicle passenger restraining system the inside and outside sliding anchors 41 and 42 (which are mounted to the inside and outside guide sections 30A and 30B, respectively, such that they can move back and forth) are spring loaded toward the front of the vehicle using the compression springs 46 and 48. However, the present invention is not limited to such an arrangement for applying biasing force. For example, it is also possible to provide a retractor 520 as shown in FIG. 39 and achieve a similar function by attaching a webbing 521 that can be wound in by the retractor 520 to the inside sliding anchor 41 or the outside sliding anchor 42. Of course, it will be apparent to those skilled in the art from this disclosure that the tensile spring 390 used in the third embodiment explained above may also be replaced by the arrangement using the retractor 520 and the webbing 521.

As used herein to describe the above embodiments, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle passenger restraining system comprising:
   a knee bolster disposed in a portion in front of a seat in a vehicle;
   a bolster movement structure coupled to the knee bolster to selectively apply a rearwardly directed pulling force to each transverse end of the knee bolster, the bolster movement structure including a biasing mechanism that applies a biasing force to the knee bolster toward a front direction of the vehicle against the rearwardly directed pulling force;
   a collision detecting section configured and arranged to detect information relating to a collision of the vehicle and a probability of a collision of the vehicle; and
   a control section configured to operate the bolster movement structure to apply the rearwardly directed pulling force that overcomes the biasing force of the biasing mechanism so that the knee bolster moves towards the seat based on the information from the collision detecting section,
   the bolster movement structure further including a pulling member linking the bolster movement structure and the each transverse end of the knee bolster, and a retracting device coupled to at least one end of the pulling member and disposed in a position rearward of the knee bolster, the retracting device being configured and arranged to pull the pulling member in a rearward direction so that the rearwardly directed pulling force is applied to the each transverse end of the knee bolster.

2. The vehicle passenger restraining system as recited in claim 1, wherein
   the bolster movement structure is configured and arranged to support the knee bolster so that the knee bolster flexibly accommodates left and right knees of a passenger sitting in the seat in the vehicle when the rearwardly directed pulling force is applied to the knee bolster.

3. The vehicle passenger restraining system as recited in claim 1, wherein
   the knee bolster includes a pad portion formed with a cushion material.

4. The vehicle passenger restraining system as recited in claim 1, wherein
   the bolster movement structure includes a guide member along which the rearwardly directed pulling force is applied to the each transverse end of the knee bolster, the guide member including an inside guide section and an outside guide section spaced apart from the inside guide section in a transverse direction of the vehicle such that the knee bolster is disposed between the inside guide section and the outside guide section.

5. The vehicle passenger restraining system as recited in claim 4, wherein
   the outside guide section is disposed inside a door member of the vehicle.

6. The vehicle passenger restraining system as recited in claim 1, further comprising
   a seat belt member configured and arranged to restrain the passenger in the seat,
   the bolster movement structure being operatively coupled to the seat belt member to increase a restraining force of the seat belt member in synchronization with an application of the rearwardly directed pulling force to the each transverse end of the knee bolster.

7. The vehicle passenger restraining system as recited in claim 6, wherein
   the bolster movement structure has a locking mechanism configured and arranged to allow a rearward movement of the knee bolster and to prevent a forward movement of the knee bolster.

8. The vehicle passenger restraining system as recited in claim 6, wherein
   the knee bolster includes a wide core portion configured and arranged to maintain a shape thereof and a pad portion formed with a cushion material coupled to the core portion.

9. A vehicle passenger restraining system comprising:
   a knee bolster disposed in a portion in front of a seat in a vehicle;
   a bolster movement structure coupled to the knee bolster to selectively apply a rearwardly directed pulling force to each transverse end of the knee bolster, the bolster movement structure including a biasing mechanism that applies a biasing force to the knee bolster toward a front direction of the vehicle against the rearwardly directed pulling force;

a collision detecting section configured and arranged to detect information relating to a collision of the vehicle and a probability of a collision of the vehicle; and a control section configured to operate the bolster movement structure to apply the rearwardly directed pulling force that overcomes the biasing force of the biasing mechanism so that the knee bolster moves towards the seat based on the information from the collision detecting section, the bolster movement structure including a guide member along which the rearwardly directed pulling force is applied to the each transverse end of the knee bolster, the guide member including an inside guide section and an outside guide section spaced apart from the inside guide section in a transverse direction of the vehicle such that the knee bolster is disposed between the inside guide section and the outside guide section, the bolster movement structure including a pulling member linking the guide member and the each transverse end of the knee bolster, and a retracting device coupled to at least one end of the pulling member, the retracting device being configured and arranged to pull the pulling member in a rearward direction so that the rearwardly directed pulling force is applied to the each transverse end of the knee bolster, the retracting device including an electric motor configured and arranged to execute a preparatory wind-in against the pulling member when the control section determines a possibility that a collision might occur based on the information from the collision detecting section.

10. The vehicle passenger restraining system as recited in claim 9, wherein
the retracting device includes an explosive-based gas generating device configured and arranged to execute a main wind-in against the pulling member when the control section deterirtines that a collision occurred based on the information from the collision detecting section.

11. A vehicle passenger restraining system comprising:
a knee bolster disposed in a portion in front of a seat in a vehicle;
a bolster movement structure coupled to the knee bolster to selectively apply a rearwardly directed pulling force to each transverse end of the knee bolster, the bolster movement structure including a biasing mechanism that applies a biasing force to the knee bolster toward a front direction of the vehicle against the rearwardly directed pulling force;
a collision detecting section configured and arranged to detect information relating to a collision of the vehicle and a probability of a collision of the vehicle;
a control section configured to operate the bolster movement structure to apply the rearwardly directed pulling force that overcomes the biasing force of the biasing mechanism so that the knee bolster moves towards the seat based on the information from the collision detecting section; and
a seat belt member configured and arranged to restrain the passenger in the seat,
the bolster movement structure being operatively coupled to the seat belt member to increase a restraining force of the seat belt member in synchronization with an application of the rearwardly directed pulling force to the each transverse end of the knee bolster, the bolster movement structure including a pulling member linking the bolster movement structure and the each transverse end of the knee bolster, and a retracting device coupled to the seat belt member and at least one end of the pulling member, the retracting device being configured and arranged to retract the seat belt member to increase the restraining force of the seat belt member when the collision occurs and to pull the pulling member in a rearward direction in synchronization with a retraction of the seat belt member during the collision.

12. The vehicle passenger restraining system as recited in claim 11, wherein
the bolster movement structure includes a guide member along which the rearwardly directed pulling force is applied to the each transverse end of the knee bolster, the guide member including an inside guide section and an outside guide section spaced apart from the inside guide section in a transverse direction of the vehicle such that the knee bolster is disposed between the inside guide section and the outside guide section.

13. The vehicle passenger restraining system as recited in claim 12, wherein
the pulling member having an outer end portion that is fixedly coupled to the outside guide section with the knee bolster being biased in the forward direction of the vehicle.

14. The vehicle passenger restraining system as recited in claim 11, wherein
the pulling member includes at least one of a flexible belt member and a wire member.

15. The vehicle passenger restraining system as recited in claim 11, wherein
the retracting device includes a knee bolster winding section coupled to the pulling member, a seat belt winding section coupled to the seat belt member, and a winding shaft that is operatively coupled to the knee bolster winding section and the seat belt winding section.

16. The vehicle passenger restraining system as recited in claim 15, wherein
the retracting device further includes a clutch disposed between the knee bolster winding section and the winding shaft, the clutch being configured and arranged to adjust an amount of torque transmitted between the winding shaft and the knee bolster winding section.

17. The vehicle passenger restraining system as recited in claim 16, wherein
the clutch of the retracting device includes a flange member fitted onto a tip portion of the winding shaft, a torque adjusting spring disposed between the knee bolster winding section and the flange member, and a cover member covering outside of the clutch such that the amount of torque transmitted between the winding shaft and the knee bolster winding section can be adjusted in accordance with an amount by which the cover member is tightened.

18. The vehicle passenger restraining system as recited in claim 16, wherein
the clutch includes a torque limiting cylindrical body that is arranged within an internal circumference of the knee bolster winding section, the torque limiting cylindrical body having a plurality of torque adjusting springs disposed between an internal circumference and an external circumference of the torque limiting cylindrical body to keep the amount of torque transmitted between the winding shaft and the knee bolster winding section substantially constant.

19. The vehicle passenger restraining system as recited in claim 11, wherein
the retracting device includes an electric motor configured and arranged to execute a preparatory wind-in against the pulling member and the seat belt member when the control section determines a possibility that a collision might occur based on the information from the collision detecting section.

20. The vehicle passenger restraining system as recited in claim 19, wherein
the retracting device includes an explosive-based gas generating device configured and arranged to execute a main wind-in against the pulling member and the seat belt member when the control section determines that a collision occurred based on the information from the collision detecting section.

21. The vehicle passenger restraining system as recited in claim 11, wherein
the retracting device includes an explosive-based gas generating device configured and arranged to execute a main wind-in against the pulling member and the seat belt member when the control section determines that a collision occurred based on the information from the collision detecting section.

22. A vehicle passenger restraining method comprising:
providing a knee bolster in a portion in front of a seat in a vehicle;
detecting collision information of the vehicle relating to a collision of the vehicle and a probability of a collision of the vehicle;
applying a biasing force to the knee bolster toward a front direction of the vehicle; and
selectively applying a rearwardly directed pulling force to each transverse end of the knee bolster that overcomes the biasing force so that the knee bolster moves towards the seat based on the collision information so that a forward movement of knees of a passenger sitting in the seat is suppressed by the knee bolster,
the applying of the rearwardly directed pulling force to the each transverse end of the knee bolster including retracting a pulling member coupled to the each transverse end of the knee bolster from a position rearward of the knee bolster so that the rearwardly directed pulling force is applied to the each transverse end of the knee bolster.

23. The vehicle passenger restraining method as recited in claim 22, further comprising
providing a seat belt member configured and arranged to restrain the passenger in the seat, and
retracting the seat belt member in synchronization with the retracting of the pulling member based on the collision information.

24. A vehicle passenger restraining system comprising:
knee restraining means for suppressing a frontward movement of knees of a passenger sitting in a seat in a vehicle during a collision of the vehicle;
detecting means for detecting collision information of the vehicle relating to a collision of the vehicle and a probability of a collision of the vehicle;
biasing force applying means for applying a biasing force to the knee restraining means toward a front direction of the vehicle; and
rearward force applying means for applying a rearwardly directed pulling force that overcomes the biasing force to each transverse end of the knee restraining means to move the knee restraining means towards the seat based on the collision information so that a forward movement of the knees of the passenger sitting in the seat is suppressed by the knee restraining means,
the rearward force applying means further including a function for retracting a pulling member coupled to the each transverse end of the knee restraining means from a position rearward of the knee restraining means so that the rearwardly directed pulling force is applied to the each transverse end of the knee restraining means.

25. The vehicle passenger restraining system as recited in claim 24, further comprising
passenger restraining means for restraining the passenger in the seat, and
rearward force applying means further includes a function for retracting the passenger restraining means in synchronization with a retraction of the knee restraining means based on the collision information.

26. A vehicle passenger restraining system comprising:
a knee bolster disposed in a portion in front of a seat in a vehicle;
a bolster movement structure coupled to the knee bolster to support the knee bolster in one of a rest position and an extended position such that a position of the knee bolster can be reset from the extended position to the rest position, the bolster movement structure including a biasing mechanism that applies a biasing force to the knee bolster toward a front direction of the vehicle against a rearwardly directed pulling force;
a collision detecting section configured and arranged to detect information relating to a collision of the vehicle and a probability of a collision of the vehicle; and
a control section configured to operate the bolster movement structure to move the knee bolster from the rest position to the extended position against the biasing force of the biasing mechanism so that the knee bolster moves towards the seat based on the information from the collision detecting section,
the bolster movement structure further including a pulling member coupled to the each transverse end of the knee bolster, and a retracting device coupled to at least one end of the pulling member and disposed in a position rearward of the knee bolster, the retracting device being configured and arranged to pull the pulling member in a rearxvard direction so that the rearwardly directed pulling force is applied to the each transverse end of the knee bolster.

27. The vehicle passenger restraining system as recited in claim 26, wherein
the bolster movement structure is configured and arranged to apply the rearwardly directed pulling force to each transverse end of the knee bolster to move the knee bolster fiom the rest position to the extended position when the control section determines a possibility that a collision might occur based on the information from the collision detecting section, the bolster movement structure being further configured and arranged to reset the position of the knee bolster from the extended position to the rest position when the collision is avoided.

* * * * *